(12) United States Patent
Kawasaki et al.

(10) Patent No.: US 10,887,930 B2
(45) Date of Patent: *Jan. 5, 2021

(54) UE, MME, COMMUNICATION CONTROL METHOD OF UE, AND COMMUNICATION CONTROL METHOD OF MME

(71) Applicant: SHARP KABUSHIKI KAISHA, Sakai (JP)

(72) Inventors: Yudai Kawasaki, Sakai (JP); Masafumi Aramoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/728,237

(22) Filed: Dec. 27, 2019

(65) Prior Publication Data

US 2020/0137809 A1    Apr. 30, 2020

Related U.S. Application Data

(63) Continuation of application No. 15/774,923, filed as application No. PCT/JP2016/083365 on Nov. 10, 2016, now Pat. No. 10,531,501.

(30) Foreign Application Priority Data

Nov. 10, 2015    (JP) .................. 2015-220105

(51) Int. Cl.
*H04W 76/10* (2018.01)
*H04W 76/30* (2018.01)
(Continued)

(52) U.S. Cl.
CPC ............. *H04W 76/10* (2018.02); *H04W 4/70* (2018.02); *H04W 8/22* (2013.01);
(Continued)

(58) Field of Classification Search
CPC ..... H04W 76/16; H04W 76/12; H04W 76/28; H04W 72/0406; H04W 76/27;
(Continued)

(56) References Cited

U.S. PATENT DOCUMENTS

2013/0100895 A1    4/2013 Aghili et al.
2013/0227138 A1    8/2013 Cai et al.
(Continued)

FOREIGN PATENT DOCUMENTS

JP    2013-529402 A    7/2013
JP    2015-510371 A    4/2015

OTHER PUBLICATIONS

3GPP TR 23.720 V1.1.0(Oct. 2015); 3rd Generation Partnership Project; Technical Specification Group Services and System Aspects; Architecture enhancements for Cellular Internet of Things (Release 13); Total 90 pages.
(Continued)

*Primary Examiner* — Afshawn M Towfighi
(74) *Attorney, Agent, or Firm* — Birch, Stewart, Kolasch & Birch, LLP

(57) ABSTRACT

First identification information is a detach type for requesting disconnection from a system optimized for Internet of Things (IoT). A procedure includes a step of transmitting a detach request message that includes at least the first identification information to a core network, and a step of receiving a detach accept message from the core network as a response to the detach request message. Thus, a communication procedure such as an attach procedure suitable for a CIoT terminal is provided.

8 Claims, 26 Drawing Sheets

(51) Int. Cl.
*H04W 8/22* (2009.01)
*H04W 4/70* (2018.01)
*H04W 76/12* (2018.01)
*H04W 76/28* (2018.01)
*H04W 76/16* (2018.01)
*H04W 76/27* (2018.01)
*H04W 36/00* (2009.01)
*H04W 72/04* (2009.01)
*H04W 88/16* (2009.01)
*H04W 84/12* (2009.01)

(52) U.S. Cl.
CPC ... *H04W 36/0022* (2013.01); *H04W 72/0406* (2013.01); *H04W 76/12* (2018.02); *H04W 76/16* (2018.02); *H04W 76/27* (2018.02); *H04W 76/28* (2018.02); *H04W 76/30* (2018.02); *H04W 88/16* (2013.01); *H04W 84/12* (2013.01)

(58) Field of Classification Search
CPC . H04W 88/16; H04W 36/0022; H04W 76/30; H04W 84/12
See application file for complete search history.

(56) References Cited

U.S. PATENT DOCUMENTS

2016/0066231 A1* 3/2016 Zembutsu ............ H04W 24/02
370/331
2016/0345261 A1* 11/2016 Walldeen ............. H04W 76/27

OTHER PUBLICATIONS

International Preliminary Report on Patentability issued in International Application No. PCT/JP2016/083365 dated May 24, 2018.
International Search Report (PCT/ISA/210) issued in PCT/JP216/083365, dated Jan. 31, 2017.
Notice of Allowance issued in U.S. Appl. No. 15/774,923, dated Aug. 19, 2019.
SA WG2 Meeting #111, S2-153283, Chengdu, P.R. China, Oct. 19-23, 2015, pp. 1-14.
SA WG2 Meeting #111, S2-153693, Oct. 19-23, 2015, Chengdu, China, pp. 1-6.
Written Opinion of the International Searching Authority (PCT/ISA/237) issued in PCT/JP2016/083365, dated Jan. 31, 2017.

* cited by examiner (b)

| |
|---|
| IMSI |
| IMSI-unauthenticated-indicator |
| MSISDN |
| MM State |
| GUTI |
| ME Identity |
| Tracking Area List |
| TAI of last TAU |
| ECGI |
| E-UTRAN Cell Identity Age |
| CSG ID |
| CSG membership |
| Access mode |
| Authentication Vector |
| UE Radio Access Capability |
| MS Classmark 2 |
| MS Classmark 3 |
| Supported Codecs |
| UE Network Capability |
| MS Network Capability |
| UE Specific DRX Parameters |
| Selected NAS Algorithm |
| eKSI |
| K_ASME |
| NAS Keys and COUNT |
| Selected CN operator id |

| |
|---|
| Recovery |
| Access Restriction |
| ODB for PS parameters |
| APN-OI Replacement |
| MME IP address for S11 |
| MME TEID for S11 |
| S-GW IP address for S11/S4 |
| S-GW TEID for S11/S4 |
| SGSN IP address for S3 |
| SGSN TEID for S3 |
| eNodeB Address in Use for S1-MME |
| eNB UE S1AP ID |
| UE S1AP ID |
| Subscribed UE-AMBR |
| UE-AMBR |
| EPS Subscribed Charging Characteristics |
| Subscribed RFSP Index |
| RFSP Index in Use |
| Trace reference |
| Trace type |
| Trigger id |
| OMC identity |
| URRP-MME |
| CSG Subscription Data |
| LIPA Allowed |

| MPS CS priority |
| MPS EPS priority |
| Voice Support Match Indicator |
| Homogenous Support of IMS Voice over PS Sessions |

| |
|---|
| APN in Use |
| APN Restriction |
| APN Subscribed |
| PDN Type |
| IP Address(es) |
| EPS PDN Charging Characteristic |
| APN-OI Replacement |
| SIPTO permissions |
| Local Home Network ID |
| LIPA permissions |
| WLAN offloadability |
| VPLMN Address Allowed |
| PDN GW Address in Use (CONTROL INFORMATION) |
| PDN GW TEID for S5/S8 (CONTROL INFORMATION) |
| MS Info Change Reporting Action |
| CSG Information Reporting Action |
| Presence Reporting Area Action |
| EPS subscribed QoS profile |
| Subscribed APN-AMBR |
| APN-AMBR |
| PDN GW GRE Key for uplink traffic (USER DATA) |
| Default bearer |
| low access priority |

| EPS Bearer ID |
| --- |
| TI |
| S-GW IP address for S1-u |
| S-GW TEID for S1u |
| PDN GW TEID for S5/S8 (user plane) |
| PDN GW IP address for S5/S8 (user plane) |
| EPS bearer QoS |
| TFT |

FIG. 11

(e)
| EPS AS SECURITY CONTEXT |
| --- |
| EPS NAS SECURITY CONTEXT |

(f)
| cryptographic key |
| --- |
| Next Hop parameter (NH) |
| Next Hop Chaining Counter parameter (NCC) |
| identifiers of the selected AS level cryptographic algorithms |

(g)
| K_ASME |
| --- |
| UE security capabilitie |
| NAS COUNT |

(h)
| Emergency Access Point Name (em APN) |
| --- |
| Emergency QoS profile |
| Emergency APN-AMBR |
| Emergency PDN GW identity |
| Non-3GPP HO Emergency PDN GW identity |

| IMSI |
|---|
| IMSI-unauthenticated-indicator |
| ME Identity |
| MSISDN |
| Selected CN operator id |
| MME TEID for S11 |
| MME IP address for S11 |
| S-GW TEID for S11/S4 |
| S-GW IP address for S11/S4 |
| SGSN IP address for S4 |
| SGSN TEID for S4 |
| Trace reference |
| Trace type |
| Trigger ID |
| OMC identity |
| Last known Cell ID |
| Last known Cell ID age |

| APN in Use |
|---|
| EPS PDN Charging Characteristics |
| P-GW Address in Use (CONTROL INFORMATION) |
| P-GW TEID for S5/S8 (CONTROL INFORMATION) |
| P-GW Address in Use (USER DATA) |
| P-GW GRE Key for uplink traffic (USER DATA) |
| S-GW IP address for S5/S8 (CONTROL INFORMATION) |
| S-GW TEID for S5/S8 (CONTROL INFORMATION) |
| S-GW Address in Use (USER DATA) |
| S-GW GRE Key for downlink traffic (USER DATA) |
| Default Bearer |

(d)

| EPS Bearer Id |
|---|
| TFT |
| P-GW Address in Use (user plane) |
| S-GW IP address for S5/S8 (user plane) |
| S-GW TEID for S5/S8 (user plane) |
| S-GW IP address for S1-u, S12 and S4 (user plane) |
| S-GW TEID for S1-u, S12 and S4 (user plane) |
| eNodeB IP address for S1-u |
| eNodeB TEID for S1-u |
| RNC IP address for S12 |
| RNC TEID for S12 |
| SGSN IP address for S4 (user plane) |
| SGSN TEID for S4 (user plane) |
| EPS Bearer QoS |
| Charging Id |

FIG. 15

(a)
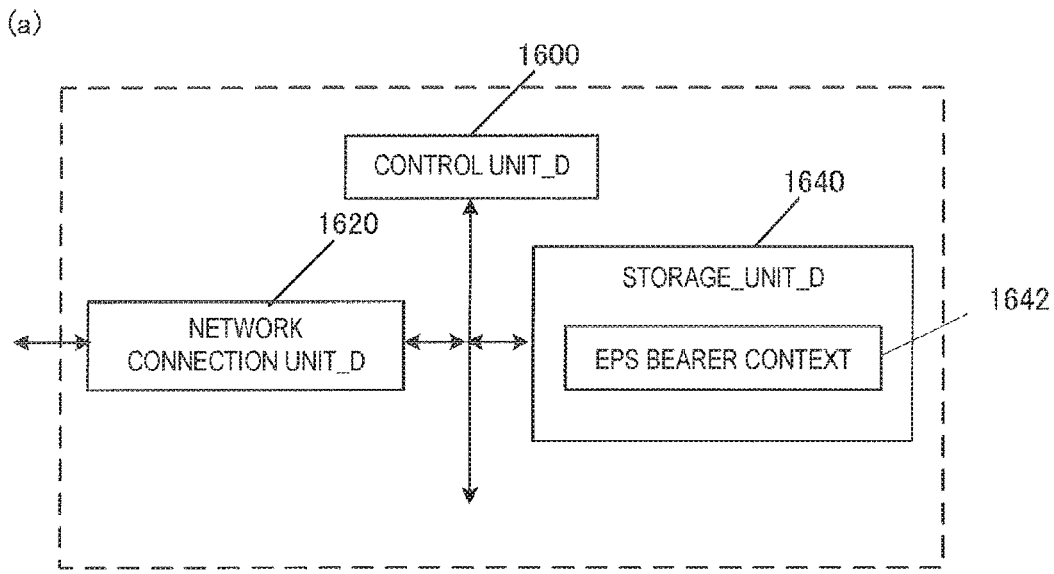
FIG. 16
(b)
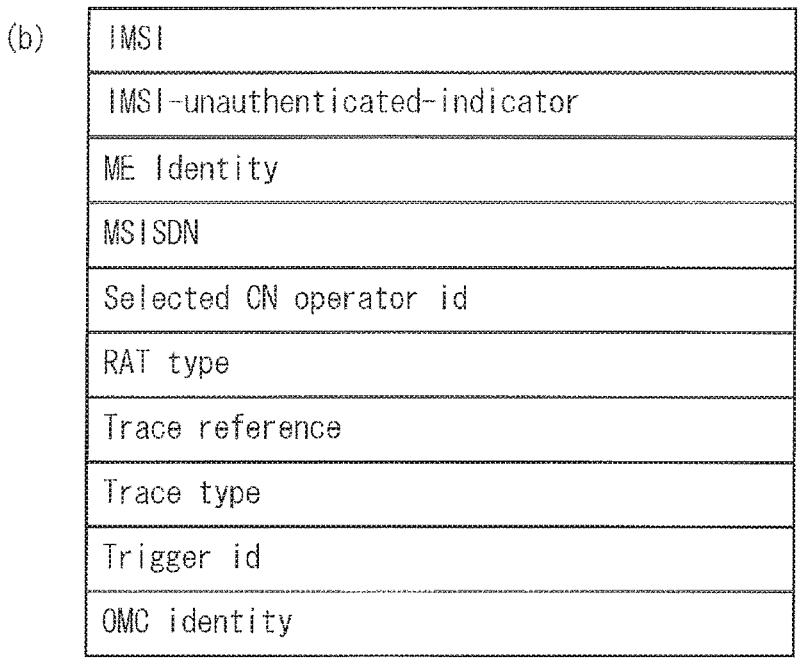
(c)
FIG. 17

(d)

| |
|---|
| IP Address |
| PDN type |
| S-GW Address in Use (CONTROL INFORMATION) |
| S-GW TEID for S5/S8 (CONTROL INFORMATION) |
| S-GW Address in Use (USER DATA) |
| S-GW GRE Key for downlink traffic (USER DATA) |
| P-GW IP address for S5/S8 (CONTROL INFORMATION) |
| P-GW TEID for S5/S8 (CONTROL INFORMATION) |
| P-GW Address in Use (USER DATA) |
| P-GW GRE Key for uplink traffic (USER DATA) |
| MS Info Change Reporting support indication |
| MS Info Change Reporting Action |
| CSG Information Reporting Action |
| Presence Reporting Area Action |
| BCM |
| Default Bearer |
| Default BearerEPS PDN Charging Characteristics |

(e)

| |
|---|
| EPS Bearer Id |
| TFT |
| S-GW Address in Use (USER DATA) |
| S-GW TEID for S5/S8 (USER DATA) |
| P-GW IP address for S5/S8 (USER DATA) |
| P-GW TEID for S5/S8 (USER DATA) |
| EPS Bearer QoS |
| Charging Id |

| IMSI |
|---|
| EMM State |
| GUTI |
| ME Identity |
| Tracking Area List |
| last visited TAI |
| Selected NAS Algorithm |
| Selected AS Algorithm |
| eKSI |
| K_ASME |
| NAS Keys and COUNT |
| Temporary Identity used in Next update (TIN) |
| UE Specific DRX Parameters |
| Allowed CSG list |
| Operator CSG list |

(c)

| APN in Use |
|---|
| APN-AMBR |
| Assigned PDN Type |
| IP Address(es) |
| Default Bearer |
| WLAN offloadability |

(d)

| EPS Bearer ID |
|---|
| TI |
| EPS bearer QoS |
| TFT |

FIG. 21

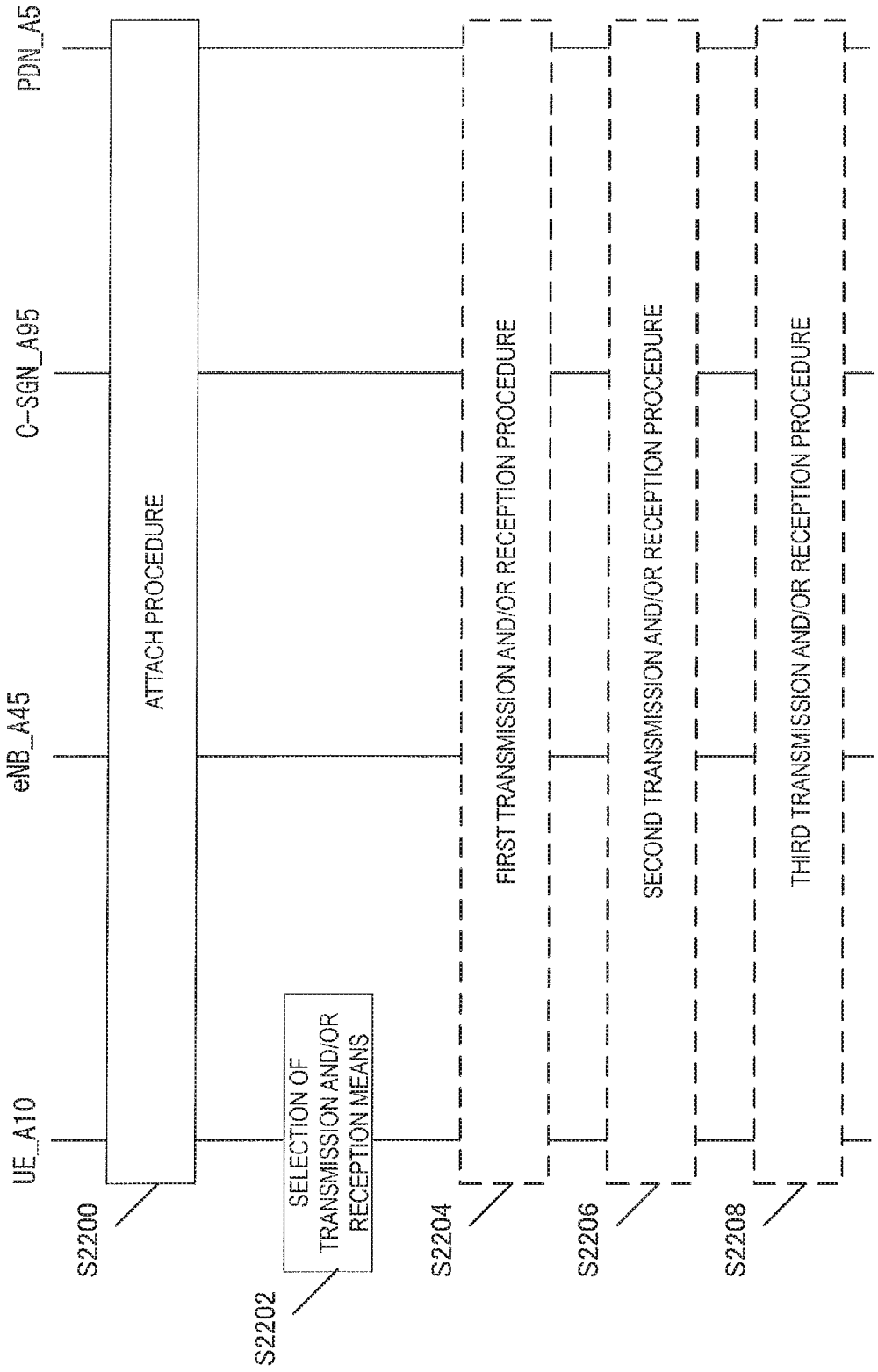

UE, MME, COMMUNICATION CONTROL METHOD OF UE, AND COMMUNICATION CONTROL METHOD OF MME

CROSS-REFERENCE TO RELATED APPLICATION

This application is a Continuation of copending application Ser. No. 15/774,923, filed on May 9, 2018, which was filed as PCT International Application No. PCT/JP2016/083365 on Nov. 10, 2016, which claims the benefit under 35 U.S.C. § 119(a) to Patent Application No. 2015-220105, filed in Japan on Nov. 10, 2015, all of which are hereby expressly incorporated by reference into the present application.

TECHNICAL FIELD

The present invention relates to a UE, an MME, a communication control method of a UE, and a communication control method of an MME. This application claims priority based on JP 2015-220105 filed on Nov. 10, 2015 in Japan, the contents of which are incorporated herein in its entirety by reference.

BACKGROUND ART

The 3rd Generation Partnership Project (3GPP), which undertakes activities for standardizing recent mobile communication systems, discusses System Architecture Enhancement (SAE), which is system architecture of the Long Term Evolution (LTE). 3GPP is in the process of creating specifications for the Evolved Packet System (EPS), which realizes an all-IP architecture. Note that a core network of LTE is called an Evolved Packet Core (EPC).

Furthermore, 3GPP recently discusses a Machine to Machine (M2M) communication technology. Note that the M2M communication may be machine-machine type communication. 3GPP discusses a Cellular Internet of Things (CIoT), in particular, as a technology for supporting Internet of Things (IoT) in a cellular network of 3GPP.

The IoT includes a mobile phone terminal such as a smartphone, and indicates various IT devices such as a personal computer and a sensor device. In CIoT, technical problems for connecting such various terminal devices to a cellular network are extracted, and solutions are standardized.

For example, CIoT is demanded to optimize communication procedures for a terminal needed to increase the efficiency of power consumption so that a battery can be maintained for several years, to cope with communication in an indoor or underground state, and to provide connectivity to a large amount of terminals produced by inexpensive mass production. Furthermore, in CIoT, supporting low data rate communication with a simple end node is cited as a required condition.

Note that terminals allowed to connect to a 3GPP core network are referred to CIoT terminals herein.

CITATION LIST

Non Patent Literature

NPL 1: 3rd Generation Partnership Project: Technical Specification Group Services and System Aspects; Architecture enhancements for Cellular Internet of Things; (Release 13)

SUMMARY OF INVENTION

Technical Problem

As for CIoT, in order to increase the efficiency of a control signal, including a function unit having multiple functions in the core network is discussed. Specifically, providing a CIoT Serving Gateway Node (C-SGN) responsible for functions of known MME, SGW, and PGW in the core network is discussed.

3GPP discusses that a CIoT terminal is connected to the core network through an access network of CIoT.

Note that the core network to which the CIoT terminal is connected may be a known core network accommodating mobile phone terminals such as smartphones, may be a logically-divided core network for accommodating CIoT terminals, or may be a core network physically different from the known core network. However, a connection method to these core networks and a procedure for data transmission and/or reception to/from these core networks have not been made clear.

The present invention has been made in view of the above described situations, and an object is to provide a communication procedure such as an attach procedure suitable for a CIoT terminal.

Solution to Problem

In order to achieve the above-described object, a User Equipment (UE) according to one aspect of the present invention includes: a transmission and/or reception unit configured to perform an attach procedure; and a control unit. In the attach procedure, the transmission and/or reception unit is configured to: transmit an attach request message to a Mobility Management Entity (MME); be capable of receiving, as a response to the attach request message, an attach accept message or an attach reject message from the MME; and notify that the UE supports a mode A and the UE requests the mode A, based on transmission of the attach request message, the attach accept message includes network capability information indicating that the mode A is supported, the attach reject message includes network capability information indicating that the mode A is not supported, the control unit is configured to: interpret that the mode A is accepted by receiving the network capability information indicating that the mode A is supported, in a case that the attach accept message is received; and be capable of performing at least a first process after completion of the attach procedure, based on acceptance of the mode A, and the first process is a process for entering an idle mode to keep a UE context in a case that a message to suspend an RRC connection is received from a base station device.

A Mobility Management Entity (MME) according to one aspect of the present invention includes: a transmission and/or reception unit configured to perform an attach procedure; and a control unit. In the attach procedure, the transmission and/or reception unit is configured to: receive an attach request message from a User Equipment (UE), be capable of transmitting, as a response to the attach request message, an attach accept message or an attach reject message: acquire that the UE supports a mode A and the UE requests the mode A, based on reception of the attach request message; transmit to the UE the attach accept message including network capability information indicating that the mode A is supported, in a case of accepting the attach request message: and transmit to the UE the attach reject message including network capability information indicating that the mode A is not supported, in a case of rejecting the attach request message, the network capability information included in the attach accept message and indicating that the mode A is supported is used by the UE for interpreting that the mode A is accepted, and the control unit is capable of performing at least a first process after completion of the attach procedure, based on acceptance of the mode A. and the first process is a process for entering an idle mode to keep a bearer context in a case that an S1AP message is received from a base station device.

A communication control method for a User Equipment (UE) according to one aspect of the present invention includes: a transmission and/or reception step performing an attach procedure; and a control step. In the attach procedure, the transmission and/or reception step includes: transmitting an attach request message to a Mobility Management Entity (MME), being capable of receiving, as a response to the attach request message, an attach accept message or an attach reject message from the MME, and notifying that the UE supports a mode A and the UE requests the mode A, based on transmission of the attach request message, the attach accept message includes network capability information indicating that the mode A is supported, and the attach reject message includes network capability information indicating that the mode A is not supported. The control step includes: interpreting that the mode A is accepted by receiving the network capability information indicating that the mode A is supported, in a case that the attach accept message is received, and being capable of performing at least a first process after completion of the attach procedure, based on acceptance of the mode A, and the first process is a process for entering an idle mode to keep a UE context in a case that a message to suspend an RRC connection is received from a base station device.

A communication control method for a Mobility Management Entity (MME), the communication control method including: a transmission and/or reception step performing an attach procedure; and a control step. In the attach procedure, the transmission and/or reception step includes: receiving an attach request message from a User Equipment (UE); being capable of transmitting, as a response to the attach request message, an attach accept message or an attach reject message; acquiring that the UE supports a mode A and the UE requests the mode A, based on reception of the attach request message, transmitting to the UE the attach accept message including network capability information indicating that the mode A is supported, in a case of accepting the attach request message, and transmitting to the UE the attach reject message including network capability information indicating that the mode A is not supported, in a case of rejecting the attach request message. The network capability information included in the attach accept message and indicating that the mode A is supported is used by the UE for interpreting that the mode A is accepted, and the control step is capable of performing at least a first process after completion of the attach procedure, based on acceptance of the mode A. and the first process is a process for entering an idle mode to keep a bearer context in a case that an S1 Application Protocol (SLAP) message is received from a base station device.

Advantageous Effects of Invention

According to the present invention, a CIoT terminal can attach and/or detach a core network which can provide multiple transmission methods including a user data transmission method optimized for the CIoT terminal, to communicate with the core network.

BRIEF DESCRIPTION OF DRAWINGS

FIG. 2 is a diagram illustrating an example of a configuration of an IP mobile communication network, and the like.

FIG. 3 is a diagram illustrating an example of a configuration of an IP mobile communication network, and the like.

FIG. 7 is a diagram illustrating a storage unit of the MME.

FIG. 8 is a diagram illustrating the storage unit of the MME.

FIG. 9 is a diagram illustrating the storage unit of the MME.

FIG. 10 is a diagram illustrating the storage unit of the MME.

FIG. 11 is a diagram illustrating the storage unit of the MME.

FIG. 12 is a diagram illustrating the storage unit of the MME.

FIG. 14 is a diagram illustrating a storage unit of the SGW.

FIG. 15 is a diagram illustrating the storage unit of the SGW.

FIG. 16 is a diagram illustrating a device configuration of a PGW.

FIG. 17 is a diagram illustrating a storage unit of the PGW.

FIG. 18 is a diagram illustrating the storage unit of the PGW.

FIG. 21 is a diagram illustrating a storage unit of the UE.

FIG. 22 is a diagram illustrating an overview of a communication procedure.

DESCRIPTION OF EMBODIMENTS

Hereinafter, a preferred embodiment for carrying out the present invention will be described with reference to the drawings. Note that as an example, the present embodiment describes an embodiment of a mobile communication system to which the present invention is applied.

1. Embodiments

1.1. System Overview

Figure 1:
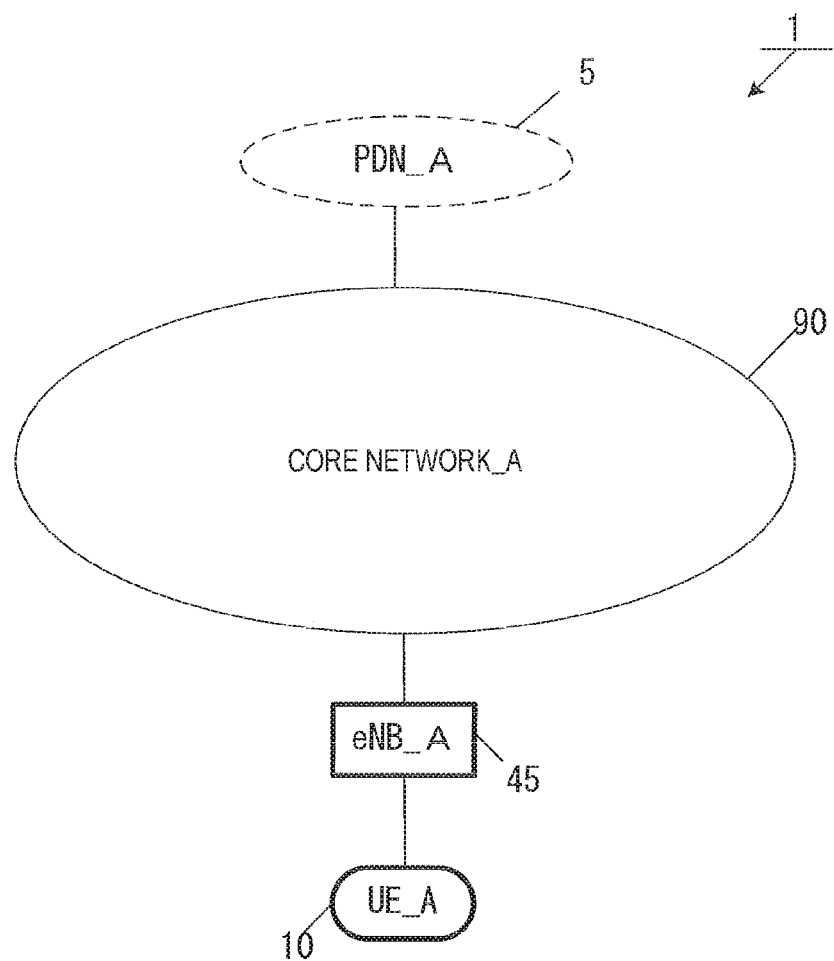
FIG. 1 is a diagram illustrating an overview of a mobile communication system.

FIG. 1 is a diagram illustrating an overview of a mobile communication system according to the present embodiment. As illustrated in FIG. 1, a mobile communication system 1 includes a mobile terminal device UE_A 10, an eNB_A 45, a core network_A 90, and a PDN_A 5.

Here, the UE_A 10 may be any wirelessly connectable terminal device, and may be a User equipment (UE), a Mobile equipment (ME), or a Mobile Station (MS).

The UE_A 10 may be a CIoT terminal. Note that the CIoT terminal is an IoT terminal connectable with a core network A 90, the IoT terminal includes a mobile phone terminal such as a smartphone, and may be various IT devices such as a personal computer and a sensor device.

In other words, in a case that the UE_A 10 is the CIoT terminal, the UE_A 10 may request a connection optimized for the CIoT terminal based on a policy of the UE_A 10 or a request from the network, or may request the known connection. Alternatively, the UE_A 10 may be configured as a terminal device which connects to the core network_A 90 only by a communication procedure optimized in advance for the CIoT terminal at the time when the UE_A 10 is shipped.

Here, the core network_A 90 refers to an IP mobile communication network run by a Mobile Operator.

For example, the core network_A 90 may be a core network for the mobile operator that runs and manages the mobile communication system 1, or may be a core network for a virtual mobile operator such as a Mobile Virtual Network Operator (MVNO). Alternatively, the core network_A 90 may be a core network for accommodating the CIoT terminal.

Additionally, the eNB_A 45 is a base station constituting a radio access network used by the UE_A 10 to connect to the core network_A 90. In other words, the UE_A 10 connects to the core network_A 90 using the eNB_A 45.

Additionally, the core network_A 90 is connected to the PDN_A 5. The PDN_A 5 is a packet data service network which provides a communication service to the UE_A 10, and may be configured for each service. A communication terminal is connected to the PDN, the UE_A 10 can transmit and/or receive user data to/from the communication terminal located in the PDN_A 5.

Next, an example of a configuration of the core network_A 90 will be described. In the present embodiment, two configuration examples of the core network_A 90 will be described.

Figure 2:
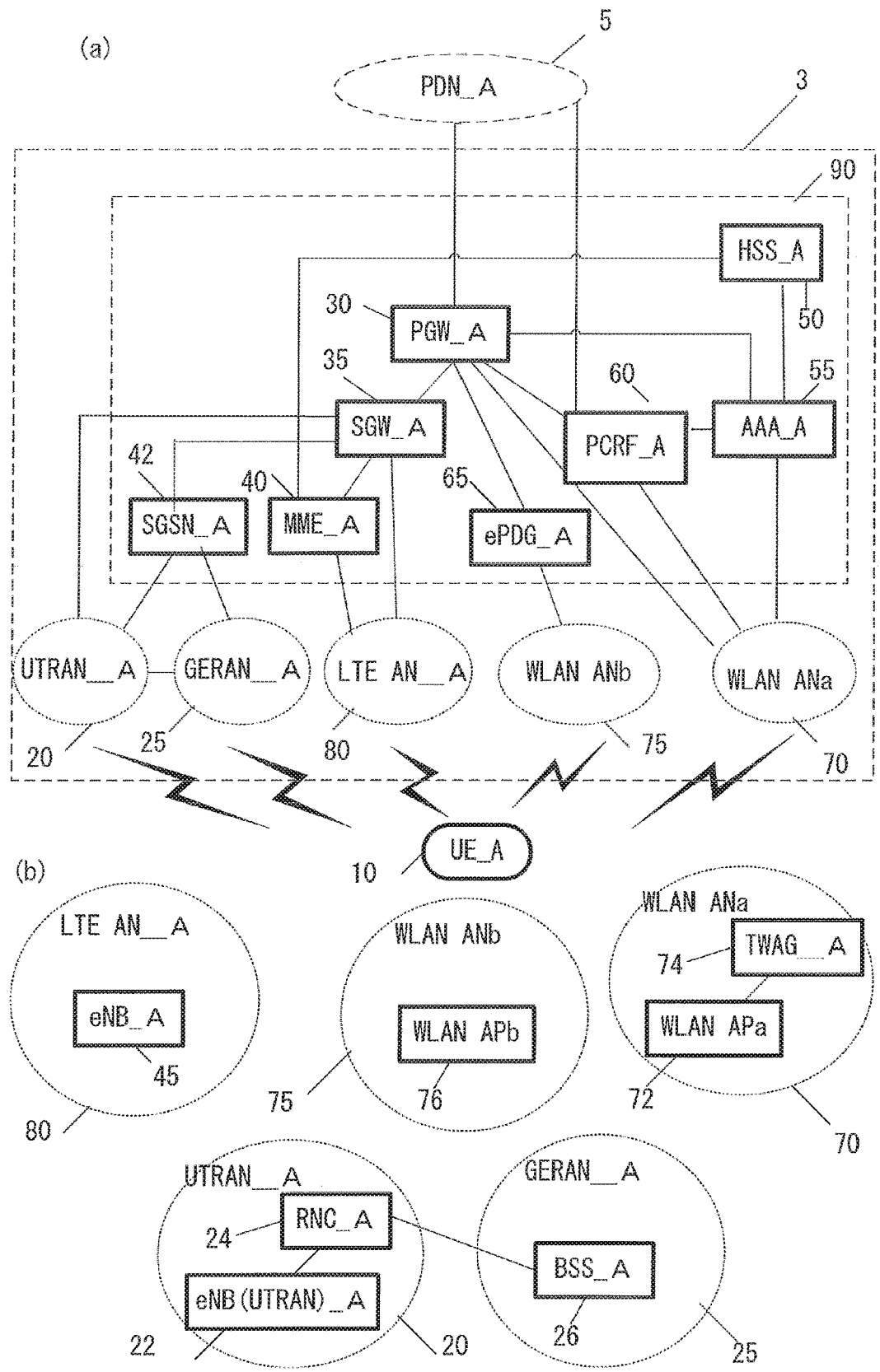

FIG. 2 illustrates a first example of the configuration of the core network_90. The core network_A 90 in FIG. 2(a) includes a Home Subscriber Server (HSS)_A 50, an Authentication. Authorization, Accounting (AAA)_A 55, a Policy and Charging Rules Function (PCRF)_A 60, a Packet Data Network Gateway (PGW)_A 30, an enhanced Packet Data Gateway (ePDG)_A 65, a Serving Gateway (SGW)_A 35, a Mobility Management Entity (MME)_A 40, and a Serving GPRS Support Node (SGSN)_A 42.

Furthermore, the core network_A 90 is capable of connecting to multiple radio access networks (an LTE AN_A 80, a WLAN ANb 75, a WLAN ANa 70, a UTRAN_A 20, and a GERAN_A 25).

Such a radio access network may be configured by connecting to multiple different access networks, or may be configured by connecting to either one of the access networks. Moreover, the UE_A 10 is capable of wirelessly connecting to the radio access network.

Moreover, a WLAN Access Network b (WLAN ANb 75) that connects to the core network via the ePDG_A 65 and a WLAN Access Network a (WLAN ANa 75) that connects to the PGW_A, the PCRF_A 60, and the AAA_A 55 can be configured as access networks connectable in a WLAN access system.

Note that each device has a similar configuration to those of the devices of the related art in a mobile communication system using EPS, and thus detailed descriptions thereof will be omitted. Each device will be described briefly hereinafter.

The PGW_A 30 is connected to the PDN_A 5, the SGW_A 35, the ePDG_A 65, the WLAN Ana 70, the PCRF_A 60, and the AAA_A 55, and serves as a relay device configured to transfer user data by functioning as a gateway device between the PDN_A 5 and the core network_A 90.

The SGW_A 35 is connected to the PGW 30, the MME_A 40, the LTE AN 80, the SGSN_A 42, and the UTRAN_A 20, and serves as a relay device configured to transfer user data by functioning as a gateway device between the core network_A 90 and the 3GPP access network (the UTRAN_A 20, the GERAN_A 25, the LTE AN_A 80).

The MME_A 40 is connected to the SGW_A 35, the LTE AN 80, and the HSS_A 50, and serves as an access control device configured to perform location information management and access control for the UE_A 10 via the LTE AN 80. Furthermore, the core network_A 90 may include multiple location management devices. For example, a location management device different from the MME_A 40 may be configured. As with the MME_A 40, the location management device different from the MME_A 40 may be connected to the SGW_A 35, the LTE AN 80, and the HSS_A 50.

Furthermore, in a case that multiple MMEs are included in the core network_A 90, the MMEs may be connected to each other. With this configuration, the context of the UE_A 10 may be transmitted and/or received between the MMEs.

The HSS_A 50 is connected to the MME_A 40 and the AAA_A 55 and serves as a managing node that manages subscriber information. The subscriber information of the HSS_A 50 is referred to during MME_A 40 access control, for example. Moreover, the HSS_A 50 may be connected to the location management device different from the MME_A 40.

The AAA_A 55 is connected to the PGW 30, the HSS_A 50, the PCRF_A 60, and the WLAN ANa 70, and is configured to perform access control for the UE_A 10 connected via the WLAN ANa 70.

The PCRF_A 60 is connected to the PGW_A 30, the WLAN ANa 75, the AAA_A 55, and the PDN_A 5, and is configured to perform QoS management on data delivery. For example, the PCRF_A 60 manages QoS of a communication path between the UE_A 10 and the PDN_A 5.

The ePDG_A 65 is connected to the PGW 30 and the WLAN ANb 75 and is configured to deliver user data by functioning as a gateway device between the core network_A 90 and the WLAN ANb 75.

The SGSN_A 42 is connected to the UTRAN_A 20, the GERAN_A 25, and the SGW_A 35 and is a control device for location management between a 3G/2G access network (UTRAN/GERAN) and the LTE access network (E-UTRAN). In addition, the SGSN_A 42 has functions of: selecting the PGW and the SGW; managing a time zone of the UE; and selecting the MME at the time of handover to the E-UTRAN.

Additionally, as illustrated in FIG. 2(b), each radio access network includes devices to which the UE_A 10 is actually connected (such as a base station device and an access point device), and the like. The devices used in these connections can be thought of as devices adapted to the radio access networks.

In the present embodiment, the LTE AN 80 includes the eNB_A 45. The eNB_A 45 is a radio base station to which the UE_A 10 connects in an LTE access system, and the LTE AN_A 80 may include one or multiple radio base stations.

The WLAN ANa 70 includes a WLAN APa 72 and a TWAG_A 74. The WLAN APa 72 is a radio base station to which the UE_A 10 connects in the WLAN access system trusted by the operator running the core network_A 90, and the WLAN ANa 70 may include one or multiple radio base stations. The TWAG_A 74 serves as a gateway device between the core network_A 90 and the WLAN ANa 70. The WLAN APa 72 and the TWAG_A 74 may be configured as a single device.

Even in a case that the operator running the core network_A 90 and the operator running the WLAN ANa 70 are different, such a configuration can be implemented through contracts and agreements between the operators.

Furthermore, the WLAN ANb 75 is configured to include a WLAN APb 76. The WLAN APb 76 is a radio base station to which the UE_A 10 connects in the WLAN access system in a case that no trusting relationship is established with the operator running the core network_A 90, and the WLAN ANb 75 may include one or multiple radio base stations.

In this manner, the WLAN ANb 75 is connected to the core network_A 90 via the ePDG_A 65, which is a device included in the core network_A 90, serving as a gateway. The ePDG_A 65 has a security function for ensuring security.

The UTRAN_A 20 includes a Radio Network Controller (RNC)_A 24 and an eNB (UTRAN)_A 22. The eNB (UTRAN)_A 22 is a radio base station to which the UE_A 10 connects through a UMTS Terrestrial Radio Access (UTRA), and the UTRAN_A 20 may include one or multiple radio base stations. Furthermore, the RNC_A 24 is a control unit configured to connect the core network_A 90 and the eNB (UTRAN)_A 22, and the UTRAN_A 20 may include one or multiple RNCs. Moreover, the RNC_A 24 may be connected to one or multiple eNBs (UTRANs)_A 22. In addition, the RNC_A 24 may be connected to a radio base station (Base Station Subsystem (BSS)_A 26) included in the GERAN_A 25.

The GERAN_A 25 includes the BSS_A 26. The BSS_A 26 is a radio base station to which the UE_A 10 connects through GSM (trade name)/EDGE Radio Access (GERA), and the GERAN_A 25 may be constituted of one or multiple radio base station BSSs. Furthermore, the multiple BSSs may be connected to each other. Moreover, the BSS_A 26 may be connected to the RNC_A 24.

Next, a second example of a configuration of the core network_A 90 will be described. For example, in a case that the UE_A 10 is a CIoT terminal, the core network_A 90 may be configured as illustrated in FIG. 3(a). The core network_A 90 in FIG. 3(a) includes a CIoT Serving Gateway Node (C-SGN)_A 95 and the HSS_A 50. Note that in the same manner as FIGS. 2A and 2B, in order for the core network_A 90 to provide connectivity to an access network other than LTE, the core network_A 90 may include the AAA_A 55 and/or the PCRF_A 60 and/or the ePDG_A 65 and/or SGSN_A 42.

A C-SGN_A 95 may be a node that has roles of the MME_A 40, the SGW_A 35, and the PGW_A 30 in FIGS. 2A and 2B. The C-SGN_A 95 may be a node for the CIoT terminal.

In other words, the C-SGN_A 95 may have a gateway device function between the PDN_A and the core network_A 90, a gateway device function between the core network_A 90 and a CIOT AN_A 100, and a location management function of the UE_A 10.

As illustrated in the drawing, the UE_A 10 connects to the core network_A 90 through the radio access network CIOT AN_A 100.

FIG. 3(b) illustrates the configuration of the CIOT AN_A 100. As illustrated in the drawing, the CIOT AN_A 100 may be configured including the eNB_A 45. The eNB_A 45 included in the CIOT AN_A 100 may be the same base station as the eNB_A 45 included in the LTE AN_A 80. Alternatively, the eNB_A 45 included in the CIOT AN_A 100 may be a base station for CIoT, which is different from the eNB_A 45 included in the LTE AN_A 80.

A first core network and/or a second core network may be constituted by a system optimized for IoT.

Note that herein, the UE_A 10 being connected to radio access networks refers to the UE_A 10 being connected to a base station device, an access point, or the like included in each of the radio access networks, and data, signals, and the like being transmitted and/or received also pass through those base station devices, access points, or the like.

1.2. Device Configuration

The configuration of each device will be described below.

1.2.1. eNB Configuration

Figure 4:
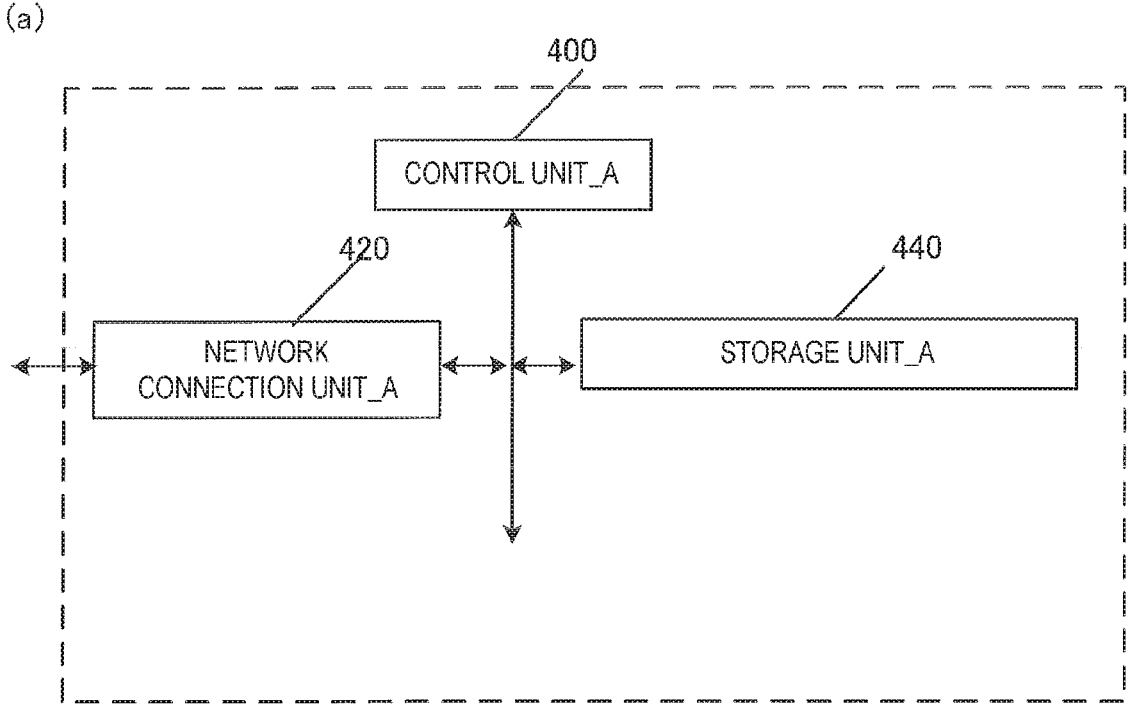
FIG. 4 is a diagram illustrating a device configuration of an eNB.

The configuration of the eNB_A 45 will be described below. FIG. 4(a) illustrates the device configuration of the eNB_A 45. As illustrated in the drawing, the eNB_A 45 includes a network connection unit_A 420, a control unit_A 400, and a storage unit_A 440. The network connection unit_A 420 and the storage unit_A 440 are connected to the control unit_A 400 via a bus.

The control unit_A 400 is a function unit for controlling the eNB_A 45. The control unit_A 400 implements various processes by reading out various programs stored in the storage unit_A 440 and executing the programs.

The network connection unit_A 420 is a function unit through which the eNB_A 45 connects to the MME_A 40 and/or the SGW_A 35 or the C-SGN_A 95. Furthermore, the network connection unit_A 420 is a transmission and/or reception function unit through which the eNB_A 45 transmits and/or receives the user data and/or control data to or from the MME_A 40 and/or the SGW_A 35 or the C-SGN_A 95.

The storage unit_A 440 is a function unit for storing programs, data, and the like necessary for each operation of the eNB_A 45. A storage unit 640 is constituted of, for example, a semiconductor memory, a Hard Disk Drive (HDD), or the like.

The storage unit_A 440 may store at least identification information and/or control information and/or a flag and/or a parameter included in a control message transmitted and/or received in an attach procedure and a data transmission procedure, which will be described in 1.3 and 1.4.

Furthermore, the eNB_A 45 includes a transmission and/or reception unit transmitting and/or receiving to or from the UE_A 10 the control information and/or the user data. Furthermore, an external antenna is connected to the transmission and/or reception unit.

1.2.2. MME Configuration

Figure 6:
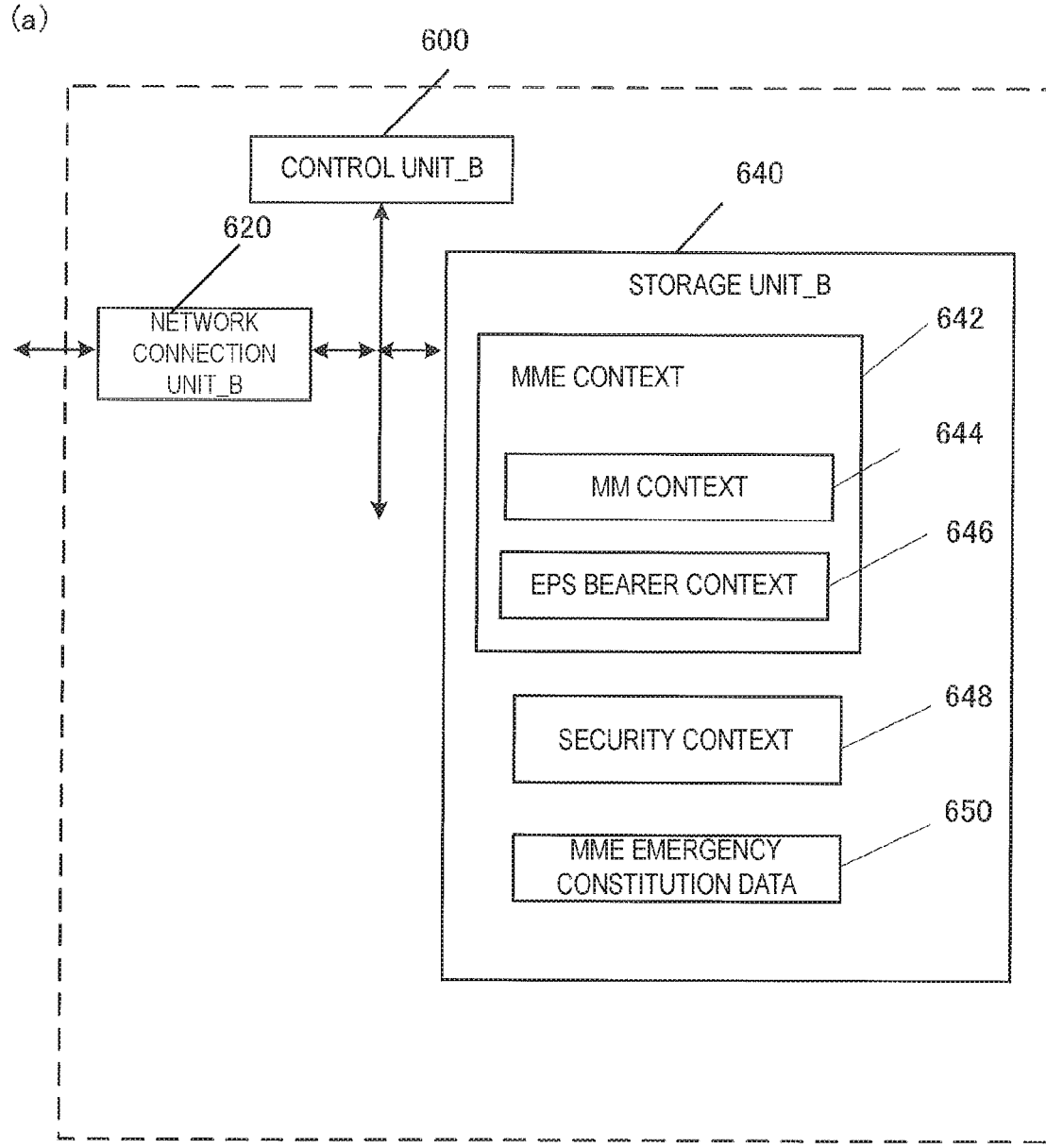
FIG. 6 is a diagram illustrating a device configuration of an MME.

The configuration of the MME_A 40 will be described below. FIG. 6(*a*) illustrates the device configuration of the MME_A 40. As illustrated in the drawing, the MME_A 40 includes a network connection unit_B 620, a control unit_B 600, and a storage unit_B 640. The network connection unit_B 620 and the storage unit_B 640 are connected to the control unit_B 600 via a bus.

The control unit_B 600 is a function unit for controlling the MME_A 40. The control unit_B 600 implements various processes by reading out and executing various programs stored in the storage unit_B 640.

The network connection unit_B 620 is a function unit through which the MME_A 40 connects to the HSS_A 50 and/or the SGW_A 35. Furthermore, the network connection unit_B 620 is a transmission and/or reception function unit through which the MME_A 40 transmits and/or receives to or from the HSS_A 50 and/or the SGW_A 35 the user data and/or control data.

The storage unit_B 640 is a function unit for storing programs, data, and the like necessary for each operation of the MME_A 40. The storage unit_B 640 is constituted of, for example, a semiconductor memory, a Hard Disk Drive (HDD), or the like.

The storage unit_B 640 may store at least the identification information and/or the control information and/or the flag and/or the parameter included in the control message transmitted and/or received in the attach procedure and the data transmission procedure, which will be described in 1.3 and 1.4.

As illustrated in the drawing, the storage unit_B 640 stores an MME context 642, a security context 648, and MME emergency configuration data 650. Note that the MME context includes an MM context and an EPS bearer context. Alternatively, the MME context may include an EMM context and an ESM context. The MM context may be the EMM context, the EPS bearer context may be the ESM context.

FIG. 7(*b*), FIG. 8(*b*), and FIG. 9(*b*) illustrate information elements of the MME context stored for each UE. As illustrated in the drawings, the MME context stored for each UE includes an IMSI, an IMSI-unauthenticated-indicator, an MSISDN, an MM State, a GUTI, an ME Identity, a Tracking Area List, a TAI of last TAU, an E-UTRAN Cell Global Identity (ECGI), an E-UTRAN Cell Identity Age, a CSG ID, a CSG membership, an Access mode, an Authentication Vector, a UE Radio Access Capability, MS Classmark 2, MS Classmark 3, Supported Codecs, a UE Network Capability, an MS Network Capability, UE Specific DRX Parameters, a Selected NAS Algorithm, an eKSI, a K_ASME, NAS Keys and COUNT, a Selected CN operator ID, a Recovery, an Access Restriction, an ODB for PS parameters, an APN-OI Replacement, an MME IP address for S11, an MME TEID for S11, an S-GW IP address for S11/S4, an S GW TEID for S11/S4, an SGSN IP address for S3, an SGSN TEID for S3, an eNodeB Address in Use for S1-MME, an eNB UE S1AP ID, an MME UE S1AP ID, a Subscribed UE-AMBR, a UE-AMBR, EPS Subscribed Charging Characteristics, a Subscribed RFSP Index, an RFSP Index in Use, a Trace reference, a Trace type, a Trigger ID, an OMC identity, a URRP-MME, CSG Subscription Data, a LIPA Allowed, a Subscribed Periodic RAU/TAU Timer, an MPS CS priority, an MPS EPS priority, a Voice Support Match Indicator, and a Homogenous Support of IMS Voice over PS Sessions.

The IMSI is permanent identification information of a user. The IMSI is identical to the IMSI stored in the HSS_A 50.

The IMSI-unauthenticated-indicator is instruction information indicating that this IMSI is not authenticated.

MSISDN represents the phone number of UE. The MSISDN is indicated by the storage unit of the HSS_A 50.

The MM State indicates a mobility management state of the MME. This management information indicates an ECM-IDLE state in which a connection between the eNB and the core network is released, an ECM-CONNECTED state in which the connection between the eNB and the core network is not released, or an EMM-DEREGISTERED state in which the MME does not store the location information of the UE.

The Globally Unique Temporary Identity (GUTI) is temporary identification information about the UE. The GUTI includes the identification information about the MME (Globally Unique MME Identifier (GUMMEI)) and the identification information about the UE in a specific MME (M-TMSI).

The ME Identity is an ID of the UE, and may be the IMEI/IMISV, for example.

The Tracking Area List is a list of the tracking area identification information which is assigned to the UE.

The TAI of last TAU is the tracking area identification information indicated by a recent tracking area update procedure.

The ECGI is cell identification information of the recent UE known by the MME_A 40.

The E-UTRAN Cell Identity Age indicates the elapsed time since the MME acquires the ECGI.

The CSG ID is identification information of a Closed Subscriber Group (CSG), in which the UE recently operates, known by the MME.

The CSG membership is member information of the CSG of the recent UE known by the MME. The CSG membership indicates whether the UE is the CSG member.

The Access mode is an access mode of a cell identified by the ECGI, may be identification information indicating that the ECGI is a hybrid which allows access to both the UEs which is the CSG and is not the CSG The Authentication Vector indicates a temporary Authentication and Key Agreement (AKA) of a specific UE followed by the MME. The Authentication Vector includes a random value RAND used for authentication, an expectation response XRES, a key K_ASME, and a language (token) AUTN authenticated by the network.

The UE Radio Access Capability is identification information indicating a radio access capability of the UE.

MS Classmark 2 is a classification symbol (Classmark) of a core network of a CS domain of 3G/2G (UTRAN/GERAN). MS Classmark 2 is used in a case that the UE supports a Single Radio Voice Call Continuit (SRVCC) for the GERAN or the UTRAN.

MS Classmark 3 is a classification symbol (Classmark) of a radio network of the CS domain of the GERAN. MS Classmark 3 is used in a case that the UE supports the Single Radio Voice Call Continuit (SRVCC) for the GERAN.

The Supported Codecs are a code list supported by the CS domain. This list is used in a case that the UE supports SRVCC for the GERAN or the UTRAN.

The UE Network Capability includes an algorithm of security supported by the UE and a key derivative function.

The MS Network Capability is information including at least one kind of information necessary for the SGSN to the UE having the GERAN and/or UTRAN function.

The UE Specific DRX Parameters are parameters used for determining a Discontinuous Reception (DRX) cycle length of the UE. Here, DRX is a function for changing the UE to a low-power-consumption mode in a case that there is no communication in a certain period of time, in order to reduce power consumption of a battery of the UE as much as possible.

The Selected NAS Algorithm is a selected security algorithm of a Non-Access Stream (NAS).

The eKSI is a key set indicating the K_ASME. The eKSI may indicate whether a security key acquired by a security authentication of the UTRAN or the E-UTRAN is used.

The K_ASME is a key for E-UTRAN key hierarchy generated based on a Cipher Key (CK) and an Integrity Key (IK).

The NAS Keys and COUNT includes a key K_NASint, a key K_NASenc, and a NAS COUNT parameter. The key K_NASint is a key for encryption between the UE and the MME, the key K_NASenc is a key for security protection between the UE and the MME. Additionally, the NAS COUNT is a count which starts a count in a case that a new key by which security between the UE and the MME is established is configured.

The Selected CN operator ID is identification information, which is used for sharing the network among operators, of a selected core network operator.

The Recovery is identification information indicating whether the HSS performs database recovery.

The Access Restriction is registration information for access restriction.

The ODB for PS parameters indicates a state of an operator determined barring (ODB). Here, ODB is an access rule determined by the network operator (operator).

The APN-OI Replacement is a domain name substituting for APN when PGW FQDN is constructed in order to execute a DNS resolution. This substitute domain name is applied to all APNs.

The MME IP address for S11 is an IP address of the MME used for an interface with the SGW.

The MME TEID for S11 is a Tunnel Endpoint Identifier (TEID) used for the interface with the SGW.

The S-GW IP address for S11/S4 is an IP address of the SGW used for an interface between the MME and the SGW or between the SGSN and the MME.

The S GW TEID for S11/S4 is a TEID of the SGW used for the interface between the MME and the SGW or between the SGSN and the MME.

The SGSN IP address for S3 is an IP address of the SGSN used for the interface between the MME and the SGSN.

The SGSN TEID for S3 is a TEID of the SGSN used for the interface between the MME and the SGSN.

The eNodeB Address in Use for S1-MME is an IP address of the eNB recently used for an interface between the MME and the eNB.

The eNB UE S1AP ID is identification information of the UE in the eNB.

The MME UE S1AP ID is identification information of the UE in the MME.

The Subscribed UE-AMBR indicates the maximum value of a Maximum Bit Rate (MBR) of uplink communication and downlink communication for sharing all Non-Guaranteed Bit Rate (GBR) bearers (non-guaranteed bearers) in accordance with user registration information.

The UE-AMBR indicates the maximum value of the MBR of the uplink communication and the downlink communication which are recently used for sharing all the Non-GBR bearers (non-guaranteed bearers).

The EPS Subscribed Charging Characteristics indicate a charging performance of the UE. For example, the EPS Subscribed Charging Characteristics may indicate registration information such as normal, prepaid, a flat rate, hot billing, or the like.

The Subscribed RFSP Index is an index for a specific RRM configuration in the E-UTRAN acquired from the HSS.

The RFSP Index in Use is an index for the specific RRM configuration in the E-UTRAN which is recently used.

The Trace reference is identification information for identifying a specific trace record or a record set.

The Trace type indicates a type of the trace. For example, the Trace type may indicate a type traced by the HSS and/or a type traced by the MME, the SGW, or the PGW.

The Trigger ID is identification information for identifying a constituent element for which the trace starts.

The OMC Identity is identification information for identifying the OMC which receives the record of the trace.

The URRP-MME is identification information indicating that the HSS requests UE activity notification from the MME.

The CSG Subscription Data are a relevant list of a PLMN (VPLMN) CSG ID of a roaming destination and an equivalent PLMN of the roaming destination. The CSG Subscription Data may be associated with an expiration date indicating an expiration date of the CSG ID and an absent expiration date indicating that there is no expiration date for each CSG ID. The CSG ID may be used for a specific PDN connection through LIPA.

The LIPA Allowed indicates whether the UE is allowed to use LIPA in this PLMN. The Subscribed Periodic RAU/TAU Timer is a timer of a periodic RAU and/or TAU.

The MPS CS priority indicates that the UE is registered in eMLPP or a 1×RTT priority service in the CS domain.

The MPS EPS priority is identification information indicating that the UE is registered in MPS in the EPS domain.

The Voice Support Match Indicator indicates whether a radio capability of the UE is compatible with the network configuration. For example, the Voice Support Match Indicator indicates whether the SRVCC support by the UE matches the support for voice call by the network.

The Homogenous Support of IMS Voice over PS Sessions for MME is instruction information indicating, for each UE, whether an IMS voice call on a PS session is supported. The Homogenous Support of IMS Voice over PS Sessions for MME includes "Supported" in which an IP Multimedia Subsystem (IMS) voice call on a Packet Switched (PS: line switching) session in all the Tracking Areas (TAs) managed by the MME is supported, and "Not Supported" indicating a case where there is no TA in which the IMS voice call on the PS session is supported. Additionally, the MME does not notify the HSS of this instruction information, in a case that the IMS voice call on the PS session is not uniformly supported (the TA in which the support is performed and the TA in which the support is not performed are both present in the MME), and in a case that it is not clear whether it is supported.

FIG. 10(c) illustrates information elements included in the MME context stored in a transmittable and/or receivable state. The transmittable and/or receivable state is described later. At the time of establishing a PDN connection, the MME to be stored in the transmittable and/or receivable state may be stored for each PDN connection. As illustrated in the drawing, the MME context stored in the transmittable and/or receivable state includes an APN in Use, an APN Restriction, an APN Subscribed, a PDN Type, an IP Address, EPS PDN Charging Characteristics, an APN-OI Replacement, SIPTO permissions, a Local Home Network ID, LIPA permissions, a WLAN offloadability, a VPLMN Address Allowed, a PDN GW Address in Use (control information), a PDN GW TEID for S5/S8 (control information), an MS Info Change Reporting Action, a CSG Information Reporting Action, a Presence Reporting Area Action, an EPS subscribed QoS profile, a Subscribed APN-AMBR, an APN-AMBR, a PDN GW GRE Key for uplink traffic (user data), a Default bearer, and a low access priority.

The APN in Use indicates APN which is recently used. This APN includes identification information about the APN network and identification information about a default operator.

The APN Restriction indicates a restriction on a combination of an APN type to APN associated with this bearer context. In other words, the APN Restriction is information for restricting the number of APNs and the type of APNs which can be established.

The APN Subscribed refers to a registration APN received from the HSS.

The PDN Type indicates the type of the IP address. The PDN Type indicates IPv4, IPv6, or IPv4v6, for example.

The IP Address indicates an IPv4 address or an IPv6 Prefix. Note that the IP address may store both the IPv4 and IPv6 prefixes.

The EPS PDN Charging Characteristics indicate a charging performance. The EPS PDN Charging Characteristics may indicate, for example, normal, prepaid, a flat rate, or hot billing.

The APN-OI Replacement is a proxy domain name of APN having the same role as that of the APN-OI Replacement, registered for each UE. Note that the APN-OI Replacement has a higher priority than that of the APN-OI Replacement for each UE.

The SIPTO permissions indicate permission information to a Selected IP Traffic Offload (SIPTO) of traffic using this APN. Specifically, the SIPTO permissions identify a prohibition of the use of SIPTO, permission of the use of SIPTO in the network excluding the local network, permission of the use of SIPTO in the network including the local network, or permission of the use of SIPTO only in the local network.

The Local Home Network ID indicates identification information of a home network to which the base station belongs, in a case that SIPTO (SIPTO@LN) using the local network can be used.

The LIPA permissions are identification information indicating whether this PDN can access through LIPA. Specifically, the LIPA permissions may be an LIPA-prohibited which does not allow LIPA, an LIPA-only which allows only LIPA, or an LIPA-conditional which allows LIPA depending on a condition.

The WLAN offload ability is identification information indicating whether traffic connected through this APN can perform offload to the wireless LAN by utilizing a cooperative function between the wireless LAN and 3GPP, or maintains the 3GPP connection. The WLAN offload ability may vary for each RAT type. Specifically, different WLAN offload abilities may be present for LTE (E-UTRA) and 3G (UTRA).

The VPLMN Address Allowed indicates whether a connection in which the UE uses this APN is allowed to use only an HPLMN domain (IP address) PGW in PLMN (VPLMN) of the roaming destination or allowed to use additionally the PGW in the VPLMN domain. The PDN GW Address in Use (control information) indicates a recent IP address of the PGW. This address is used when a control signal is transmitted.

The PDN GW TEID for S5/S8 (control information) is a TEID used for transmission and/or reception of the control information in an interface (S5/S8) between the SGW and the PGW.

The MS Info Change Reporting Action is an information element indicating that it is necessary to notify the PGW of user location information being changed.

The CSG Information Reporting Action is an information element indicating that it is necessary to notify the PGW of CSG information being changed.

The Presence Reporting Area Action indicates necessity of notification of the change as to whether the UE is present in a Presence Reporting Area. This information element separates into identification information of the presence reporting area and an element included in the presence reporting area.

The EPS subscribed QoS profile indicates a QoS parameter to a default bearer at a bearer level.

The Subscribed APN-AMBR indicates the maximum value of the Maximum Bit Rate (MBR) of the uplink communication and the downlink communication for sharing all the Non-GBR bearers (non-guaranteed bearers) established for this APN in accordance with the user registration information.

The APN-AMBR indicates the maximum value of the Maximum Bit Rate (MBR) of the uplink communication and the downlink communication for sharing all the Non-GBR bearers (non-guaranteed bearers) established for this APN, which has been determined by the PGW.

The PDN GW GRE Key for uplink traffic (user data) is a Generic Routing Encapsulation (GRE) key for the uplink communication of the user data of the interface between the SGW and the PGW.

The Default bearer is EPS bearer identification information for identifying a default bearer in the PDN connection.

The low access priority indicates that the UE requests a low access priority, when the PDN connection is opened.

FIG. 11(d) illustrates the MME context stored for each bearer. As illustrated in the drawing, the MME context stored for each bearer includes an EPS Bearer ID, a TI, an S-GW IP address for S1-u, an S-GW TEID for S1u, a PDN GW TEID for S5/S8, a PDN GW IP address for S5/S8, an EPS bearer QoS, and a TFT.

The EPS Bearer ID is the only identification information for identifying the EPS bearer for a UE connection via the E-UTRAN.

The TI is an abbreviation of a "Transaction Identifier", and is identification information identifying a bidirectional message flow (Transaction).

The S-GW IP address for S1-u is an IP address of the SGW used for an interface between the eNB and the SGW.

The S-GW TEID for S1u is a TEID of the SGW used for the interface between the eNB and the SGW.

The PDN GW TEID for S5/S8 is a TEID of the PGW for user data transmission in the interface between the SGW and the PGW.

The PDN GW IP address for S5/S8 is an IP address of the PGW for user data transmission in the interface between the SGW and the PGW.

The EPS bearer QoS includes a QoS Class Identifier (QCI) and an Allocation and Retention Priority (ARP). QCI indicates a class to which the QoS belongs. QoS can be classified in accordance with presence or absence of band control, an allowable delay time, a packet loss rate, or the like. The QCI includes information indicating the priority. ARP is information representing a priority relating to maintaining the bearer.

The TFT is an abbreviation of a "Traffic Flow Template", and indicates all packet filters associated with the EPS bearer.

Here, the information elements included in the MME context illustrated in FIG. 7 to FIG. 11 are included in either the MM context 644 or the EPS bearer context 646. For example, the MME context for each bearer illustrated in FIG. 11(d) may be stored in the EPS bearer context, and the other information elements may be stored in the MM context. Alternatively, the MME context stored in the transmittable and/or receivable state as illustrated in FIG. 10(c) and the MME context for each bearer illustrated in FIG. 11(d) may be stored in the EPS bearer context, and the other information elements may be stored in the MM context.

As illustrated in FIG. 6(a), the storage unit_B 640 of the MME may store the security context 648. FIG. 12(e) illustrates information elements included in the security context 648.

As illustrated in the drawing, the security context includes an EPS AS security context and an EPS NAS security context. The EPS AS security context is a context relating to security of an access stratum (Access Stream (AS)), the EPS NAS security context is a context relating to security of a non-access stratum (Non-Access Stream (NAS)).

FIG. 12(f) illustrates information elements included in the EPS AS security context. As illustrated in the drawing, the EPS AS security context includes a cryptographic key, a Next Hop parameter (NH), a Next Hop Chaining Counter parameter (NCC), and identifiers of the selected AS level cryptographic algorithms.

The cryptographic key is an encryption key in an access stratum.

The NH is an information element determined from the K_ASME. The NH is an information element for enabling a forward security.

The NCC is an information element associated with the NH. The NCC represents the number of occurrences of handovers in a vertical direction changing the network.

The identifiers of the selected AS level cryptographic algorithms are identification information of a selected encryption algorithm.

FIG. 12(g) illustrates information elements included in the EPS NAS security context. As illustrated in the drawing, the EPS NAS security context may include the K_ASME, a UE Security capabilitie, and the NAS COUNT.

The K_ASME is a key for E-UTRAN key hierarchy generated based on the keys CK and IK.

The UE Security capabilitie is a set of identification information corresponding to a cipher and an algorithm used by the UE. This information includes information for the access stratum and information for the non-access stratum. Furthermore, in a case that the UE supports access to the UTRAN/GERAN, this information includes information for the UTRAN/GERAN.

The NAS COUN is a counter indicating the time during which the K_ASME is operating.

The security context 648 may be included in the MME context 642. Additionally, as illustrated in FIG. 6(a), the security context 648 and the MME context 642 may be separately present.

FIG. 12(h) illustrates information elements stored in the MME emergency configuration data 650. The MME emergency configuration data are information which is used instead of registration information of the UE acquired from the HSS. As illustrated in the drawing, the MME emergency configuration data 650 include an Emergency Access Point Name (em APN), an Emergency QoS profile, an Emergency APN-AMBR, an Emergency PDN GW identity, and a Non-3GPP HO Emergency PDN GW identity.

The em APN indicates an access point name used for the PDN connection for emergency.

The Emergency QoS profile indicates QoS of the default bearer of em APN at a bearer level.

The Emergency APN-AMBR indicates the maximum value of the MBR of the uplink communication and the downlink communication for sharing the Non-GBR bearers (non-guaranteed bearers) established for em APN. This value is determined by the PGW.

The Emergency PDN GW identity is identification information of the PGW statically configured to em APN. This identification information may be an FQDN or an IP address.

The Non-3GPP HO Emergency PDN GW identity is identification information of the PGW statically configured to em APN, in a case that the PLMN supports a handover to an access network other than 3GPP. This identification information may be an FQDN or an IP address.

Furthermore, the MME_A 40 may manage a connection state with respect to the UE while synchronizing with the UE.

1.2.3. SGW Configuration Hereinafter, the configuration of the SGW_A 35 will be described. FIG. 13(a) illustrates the device configuration of the SGW_A 35. As illustrated in the drawing, the SGW_A 35 includes a network connection unit_C 1320, a control unit_C 1300, and a storage unit_C 1340. The network connection unit_C 1320 and the storage unit_C 1340 are connected to the control unit_C 1300 via a bus.

The control unit_C 1300 is a function unit for controlling the SGW_A 35. The control unit_C 1300 implements various processes by reading out and executing various programs stored in the storage unit_C 1340.

The network connection unit_C 1320 is a function unit through which the SGW_A 35 connects to the MME_A 40 and/or the PGW_A 30 and/or SGSN_A 42. Furthermore, the network connection unit_C 1320 is a transmission and/or reception function unit through which the SGW_A 35 transmits and/or receives to or from the MME_A 40 and/or the PGW_A 30 and/or SGSN_A 42 the user data and/or control data.

The storage unit_C 1340 is a function unit for storing programs, data, and the like necessary for each operation of the SGW_A 35. The storage unit_C 1340 is constituted of, for example, a semiconductor memory, a Hard Disk Drive (HDD), or the like.

The storage unit_C 1340 may store at least the identification information and/or the control information and/or the flag and/or the parameter included in the control message transmitted and/or received in the attach procedure and the data transmission procedure, which will be described in 1.3 and 1.4.

As illustrated in the drawing, the storage unit_C 1340 stores an EPS bearer context 1342. Note that the EPS bearer context includes an EPS bearer context stored for each UE, an EPS bearer context stored for each PDN, and an EPS bearer context stored for each bearer.

FIG. 14(b) illustrates information elements of the EPS bearer context stored for each UE. As illustrated in FIG. 14(b), the EPS bearer context stored for each UE includes an IMSI, an MSI-unauthenticated-indicator, an ME Identity, an MSISDN, a Selected CN operator id, an MME TEID for S11, an MME IP address for S11, an S-GW TEID for S11/S4, an S-GW IP address for S11/S4, an SGSN IP address for S4, an SGSN TEID for S4, a Trace reference, a Trace type, a Trigger ID, an OMC identity, a Last known Cell Id, and a Last known Cell Id age.

The IMSI is permanent identification information of a user. The IMSI is identical to the IMSI in the HSS_A 50.

The IMSI-unauthenticated-indicator is instruction information indicating that this IMSI is not authenticated.

The ME Identity is identification information of the UE, and may be the IMEI/IMISV, for example.

The MSISDN represents a basic phone number of the UE. The MSISDN is indicated by the storage unit of the HSS_A 50.

The Selected CN operator id is identification information, which is used for sharing the network among operators, of a selected core network operator.

The MME TEID for S11 is a TEID of the MME used for the interface between the MME and the SGW.

The MME IP address for S11 is an IP address of the MME used for the interface between the MME and the SGW.

The S-GW TEID for S11/S4 is a TEID of the SGW used for the interface between the MME and the SGW, or the interface between the SGSN and the SGW.

The S-GW IP address for S11/S4 is an IP address of the SGW used for the interface between the MME and the SGW, or the interface between the SGSN and the SGW.

The SGSN IP address for S4 is an IP address of the SGSN used for the interface between the SGSN and the SGW.

The SGSN TEID for S4 is a TEID of the SGSN used for the interface between the SGSN and the SGW.

The Trace reference is identification information for identifying a specific trace record or a record set.

The Trace Type indicates a type of the trace. For example, the Trace type may indicate a type traced by the HSS and/or a type traced by the MME, the SGW, or the PGW.

The Trigger ID is identification information for identifying a constituent element for which the trace starts.

The OMC Identity is identification information for identifying the OMC which receives the record of the trace.

The Last known Cell ID is recent location information of the UE notified by the network.

The Last known Cell ID age is information indicating the period from the time when the Last known Cell ID is stored to the present.

Furthermore, the EPS bearer context includes an EPS bearer context stored in the transmittable and/or receivable state. The transmittable and/or receivable state is described later. At the time of establishing a PDN connection, the EPS bearer context to be stored in the transmittable and/or receivable state may be stored for each PDN connection. FIG. 15(*c*) illustrates the EPS bearer context stored in the transmittable and/or receivable state. As illustrated in the drawing, the EPS bearer context stored in the transmittable and/or receivable state includes an APN in Use, EPS PDN Charging Characteristics, a P-GW Address in Use (control information), a P-GW TEID for S5/S8 (control information), a P-GW Address in Use (user data), a P-GW GRE Key for uplink (user data), an S-GW IP address for S5/S8 (control information), an S-GW TEID for S5/S8 (control information), an S GW Address in Use (user data), a S-GW GRE Key for downlink traffic (user data), and a Default Bearer.

The APN in Use indicates APN which is recently used. This APN includes identification information about the APN network and identification information about a default operator. Additionally, this information is information acquired from the MME or the SGSN.

The EPS PDN Charging Characteristics indicate a charging performance. The EPS PDN Charging Characteristics may indicate, for example, normal, prepaid, a flat rate, or hot billing.

The P-GW Address in Use (control information) is an IP address of the PGW used when the SGW recently transmits the control information.

The P-GW TEID for S5/S8 (control information) is a TEID of the PGW used for transmission of the control information in the interface between the SGW and the PGW.

The P-GW Address in Use (user data) is an IP address of the PGW used when the SGW recently transmits the user data.

The P-GW GRE Key for uplink (user data) is the GRE key for the uplink communication of the user data of the interface between the SGW and the PGW.

The S-GW IP address for S5/S8 (control information) is an IP address of the SGW used for the interface of the control information between the SGW and the PGW.

The S-GW TEID for S5/S8 (control information) is a TEID of the SGW used for the interface of the control information between the GW and the PGW.

The S GW Address in Use (user data) is an IP address of the SGW which is recently used when the SGW transmits the user data.

The S-GW GRE Key for downlink traffic (user data) is the GRE key of the uplink communication used for the interface of the user data between the SGW and the PGW.

The Default Bearer is identification information for identifying a default bearer in the PDN connection at the time of establishing the PDN connection.

Furthermore, the EPS bearer context of the SGW includes the EPS bearer context for each bearer. FIG. 15(*d*) illustrates the EPS bearer context for each bearer. As illustrated in the drawing, the EPS bearer context for each bearer includes an EPS Bearer Id, a TFT, a P-GW Address in Use (user data), a P-GW TEID for S5/S8 (user data), an S-GW IP address for S5/S8 (user data), an S-GW TEID for S5/S8 (user data), an S-GW IP address for S1-u, S12 and S4 (user data), an S-GW TEID for S1-u, S12 and S4 (user data), an eNodeB IP address for S1-u, an eNodeB TEID for S1-u, an RNC IP address for S12, an RNC TEID for S12, an SGSN IP address for S4 (user data), an SGSN TEID for S4 (user data), an EPS Bearer QoS, and a Charging Id.

The EPS Bearer Id is the only identification information identifying the EPS bearer for the UE connection via the E-UTRAN. That is, the EPS Bearer Id is identification information for identifying the bearer.

The TFT indicates all the packet filters associated with the EPS bearer.

The P-GW Address in Use (user data) is an IP address of the PGW which is recently used for transmission of the user data in the interface between the SGW and the PGW.

The P-GW TEID for S5/S8 (user data) is a TEID of the PGW for the interface of the user data between the SGW and the PGW.

The S-GW IP address for S5/S8 (user data) is an IP address of the SGW for the user data received from the PGW.

The S-GW TEID for S5/S8 (user data) is a TEID of the SGW for the interface of the user data between the SGW and the PGW.

The S-GW IP address for S1-u, S12 and S4 (user data) is an IP address of the SGW used for the interface between the SGW and the 3GPP access network (the LTE access network or GERAN/UTRAN).

The S-GW TEID for S1-u, S12 and S4 (user data) is a TEID of the SGW used for the interface between the SGW and the 3GPP access network (the LTE access network or GERAN/UTRAN).

The eNodeB IP address for S1-u is an IP address of the eNB used for transmission between the SGW and the eNB.

The eNodeB TEID for S1-u is a TEID of the eNB used for the transmission between the SGW and the eNB.

The RNC IP address for S12 is an IP address of the RNC used for the interface between the SGW and the UTRAN.

The RNC TEID for S12 is a TEID of the RNC used for the interface between the SGW and the UTRAN.

The SGSN IP address for S4 (user data) is an IP address of the SGSN used for transmission of the user data between the SGW and the SGSN.

The SGSN TEID for S4 (user data) is a TEID of the SGSN used for the transmission of the user data between the SGW and the SGSN.

The EPS Bearer QoS represents the QoS of this bearer, and may include an ARP, a GBR, an MBR, and a QCI. Here, the ARP is information representing the priority relating to maintaining the bearer. Additionally, the Guaranteed Bit Rate (GBR) represents a band guaranteed bit rate, and the Maximum Bit Rate (MBR) represents the maximum bit rate. The QCI can be classified in accordance with presence or absence of band control, an allowable delay time, a packet loss rate, or the like. The QCI includes information indicating the priority.

The Charging Id is identification information for recording charging generated in the SGW and the PGW.

1.2.4. PGW Configuration

Hereinafter, the configuration of the PGW_A 30 will be described. FIG. 16(a) illustrates the device configuration of the PGW_A 30. As illustrated in the drawing, the PGW_A 30 includes a network connection unit_D 1620, a control unit_D 1600, and a storage unit_D 1640. The network connection unit_D 1620 and the storage unit_D 1640 are connected to the control unit_D 1600 via a bus.

The control unit_D 1600 is a function unit for controlling the PGW_A 30. The control unit_D 1600 implements various processes by reading out and executing various programs stored in the storage unit_D 1640.

The network connection unit_D 1620 is a function unit through which the PGW_A 30 is connected to the SGW_A 35 and/or the PCRF_A 60 and/or the ePDG_A 65 and/or the AAA_A 55 and/or the GW_A 74. The network connection unit_D 1620 is a transmission and/or reception function unit through which the PGW_A 30 transmits and/or receives to or from the SGW_A 35 and/or the PCRF_A 60 and/or the ePDG_A 65 and/or the AAA_A 55 and/or the GW_A 74 the user data and/or control data.

The storage unit_D 1640 is a function unit for storing programs, data, and the like necessary for each operation of the PGW_A 30. The storage unit_D 1640 is constituted of, for example, a semiconductor memory, a Hard Disk Drive (HDD), or the like.

The storage unit_D 1640 may store at least the identification information and/or the control information and/or the flag and/or the parameter included in the control message transmitted and/or received in the attach procedure and the data transmission procedure, which will be described later.

As illustrated in the drawing, the storage unit_D 1640 stores an EPS bearer context 1642. Note that the EPS bearer context may be stored in such a manner that an EPS bearer context stored for each UE, an EPS bearer context stored for each APN, an EPS bearer context stored in the transmittable and/or receivable state, and an EPS bearer context stored for each bearer are separately stored.

FIG. 17(b) illustrates information elements included in the EPS bearer context stored for each UE. As illustrated in the drawing, the EPS bearer context stored for each UE includes an IMSI, an IMSI-unauthenticated-indicator, an ME Identity, an MSISDN, a Selected CN operator id, an RAT type, a Trace reference, a Trace type, a Trigger id, and an OMC identity.

The IMSI is identification information to be assigned to a user using the UE.

The IMSI-unauthenticated-indicator is instruction information indicating that this IMSI is not authenticated.

The ME Identity is an ID of the UE, and may be the IMEI/IMISV, for example.

The MSISDN represents a basic phone number of the UE. The MSISDN is indicated by the storage unit of the HSS_A 50.

The Selected CN operator ID is identification information, which is used for sharing the network among operators, of a selected core network operator.

The RAT type indicates a recent Radio Access Technology (RAT) of the UE. The RAT type may be, for example, the E-UTRA (LTE), the UTRA, or the like.

The Trace reference is identification information for identifying a specific trace record or a record set.

The Trace type indicates a type of the trace. For example, the Trace type may indicate a type traced by the HSS and/or a type traced by the MME, the SGW, or the PGW.

The Trigger ID is identification information for identifying a constituent element for which the trace starts.

The OMC Identity is identification information for identifying the OMC which receives the record of the trace.

Next, FIG. 17(c) illustrates the EPS bearer context stored for each APN. As illustrated in the drawing, the EPS bearer context stored for each APN of the PGW storage unit includes an APN in use and an APN-AMBR.

The APN in Use indicates APN which is recently used. This APN includes identification information about the APN network and identification information about a default operator. This information is acquired from the SGW.

The APN-AMBR indicates the maximum value of the Maximum Bit Rate (MBR) of the uplink communication and the downlink communication for sharing all the Non-GBR bearers (non-guaranteed bearers) established for this APN.

FIG. 18(d) illustrates the EPS bearer context stored in the transmittable and/or receivable state. The transmittable and/or receivable state is described later. At the time of establishing a PDN connection, the EPS bearer context to be stored in the transmittable and/or receivable state may be stored for each PDN connection. As illustrated in the drawing, the EPS bearer context stored in the transmittable and/or receivable state includes an IP Address, a PDN type, an S-GW Address in Use (control information), an S-GW TEID for S5/S8 (control information), an S-GW Address in Use (user data), an S-GW GRE Key for downlink traffic (user data), a P-GW IP address for S5/S8 (control information), a P-GW TEID for S5/S8 (control information), a P-GW Address in Use (user data), a P-GW GRE Key for uplink traffic (user data), an MS Info Change Reporting support indication, an MS Info Change Reporting Action, a CSG Information Reporting Action, a Presence Reporting Area Action, a BCM, a Default Bearer, and EPS PDN Charging Characteristics.

The IP Address indicates an IP address assigned to the UE in the transmittable and/or receivable state. The IP address may be an IPv4 and/or IPv6 prefix.

The PDN type indicates the type of the IP address. The PDN type indicates IPv4. IPv6, or IPv4v6, for example.

The S-GW Address in Use (control information) is an IP address of the SGW which is recently used for transmission of the control information.

The S-GW TEID for S5/S8 (control information) is a TEID of the SGW used for transmission and/or reception of the control information between the SGW and the PGW.

The S-GW Address in Use (user data) is an IP address of the SGW which is recently used for transmission of the user data in the interface between the SGW and the PGW.

The S-GW GRE Key for downlink traffic (user data) is the GRE key which is assigned to be used in the downlink communication of the user data from the PGW to the SGW at the interface between the SGW and the PGW.

The P-GW IP address for S5/S8 (control information) is an IP address of the PGW used for communication of the control information.

The P-GW TEID for S5/S8 (control information) is a TEID of the PGW for communication of the control information which uses the interface between the SGW and the PGW.

The P-GW Address in Use (user data) is an IP address of the PGW which is recently used for transmission of the user data which uses the interface between the SGW and the PGW.

The P-GW GRE Key for uplink traffic (user data) is the GRE key which is assigned for the uplink communication of the user data between the SGW and the PGW, that is, transmission of the user data from the SGW to the PGW.

The MS Info Change Reporting support indication indicates that the MME and/or the SGSN supports a notification process of user location information and/or user CSG information.

The MS Info Change Reporting Action is information indicating whether the MME and/or the SGSN is requested to transmit a change in the user location information.

The CSG Information Reporting Action is information indicating whether the MME and/or the SGSN is requested to transmit a change in the user CSG information. This information is separately indicated (a) for a CSG cell, (b) for a hybrid cell in which a user is a CSG member, (c) for a hybrid cell in which the user is not the CSG member, or for a combination thereof.

The Presence Reporting Area Action indicates necessity of notification of the change as to whether the UE is present in a Presence Reporting Area. This information element separates into identification information of the presence reporting area and an element included in the presence reporting area.

The Bearer Control Mode (BCM) indicates a control state of a bearer negotiated with respect to the GERAN/UTRAN.

The Default Bearer is identification information for identifying a default bearer included in the PDN connection at the time of establishing the PDN connection.

The EPS PDN Charging Characteristics are a charging performance. The charging performance may indicate, for example, normal, prepaid, a flat rate, hot billing.

Furthermore, FIG. 18(*e*) illustrates the EPS bearer context stored for each EPS bearer. As illustrated in the drawing, the EPS bearer context includes an EPS Bearer Id, a TFT, an S-GW Address in Use (user data), an S-GW TEID for S5/S8 (user data), a P-GW IP address for S5/S8 (user data), a P-GW TEID for S5/S8 (user data), an EPS Bearer QoS, and a Charging Id.

The EPS Bearer Id is identification information identifying the access of the UE via the E-UTRAN.

The TFT is an abbreviation of a "Traffic Flow Template", and indicates all packet filters associated with the EPS bearer.

The S-GW Address in Use (user data) is an IP address of the SGW which is recently used for transmission of the user data.

The S-GW TEID for S5/S8 (user data) is a TEID of the SGW for communication of the user data which uses the interface between the SGW and the PGW.

The P-GW IP address for S5/S8 (user data) is an IP address of the PGW for the user data received from the PGW.

The P-GW TEID for S5/S8 (user data) is a TEID of the PGW for communication of the user data between the SGW and the PGW.

The EPS Bearer QoS indicates the QoS of the bearer, and may include an ARP, a GBR, an MBR, and a QCI. Here, the ARP is information representing the priority relating to maintaining the bearer. Additionally, the Guaranteed Bit Rate (GBR) represents a band guaranteed bit rate, and the Maximum Bit Rate (MBR) represents the maximum bit rate. The QCI can be classified in accordance with presence or absence of band control, an allowable delay time, a packet loss rate, or the like. The QCI includes information indicating the priority.

The Charging Id is charging identification information for identifying the record relating to charging generated in the SGW and the PGW.

1.2.5. C-SGN Configuration

Figure 19:
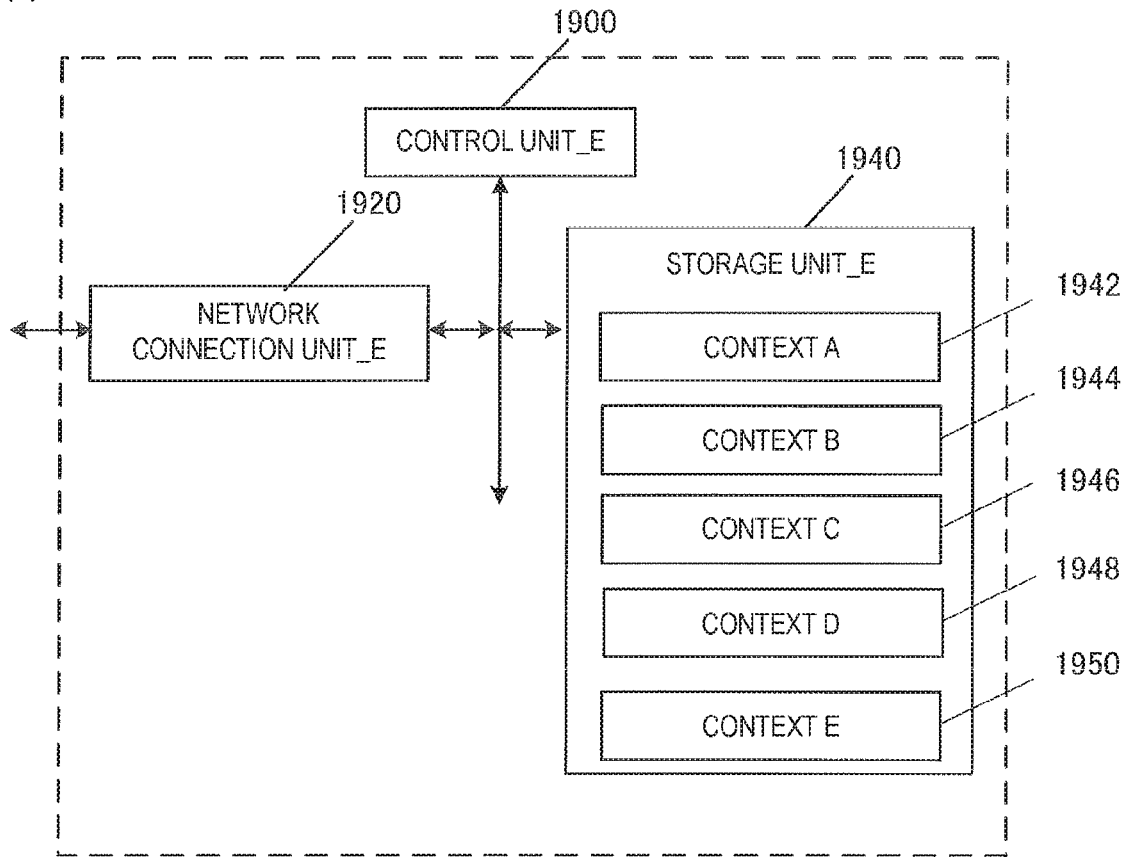
FIG. 19 is a diagram illustrating a device configuration of a C-SGN.

Hereinafter, the device configuration of the C-SGN_A 95 will be described. FIG. 19(*a*) illustrates the device configuration of the C-SGN_A 95. As illustrated in the drawing, the C-SGN_A 95 includes a network connection unit_E 1920, a control unit_E 1900, and a storage unit_E 1940. The network connection unit_E 1920 and the storage unit_E 1940 are connected to the control unit_E 1900 via a bus.

The control unit_E 1900 is a function unit for controlling the C-SGN_A 95. The control unit_E 1900 implements various processes by reading out and executing various programs stored in the storage unit_E 1940.

The network connection unit_E 1920 is a function unit through which the C-SGN_A 95 connects to the eNB_A 45 and/or the HSS_A 50 and/or the PDN_A 5. The network connection unit_E 1920 is a transmission and/or reception function unit through which the C-SGN_A 95 transmits and/or receives to or from the eNB_A 45 and/or the HSS_A 50 and/or the PDN_A 5 the user data and/or control data.

The storage unit_E 1940 is a function unit for storing programs, data, and the like necessary for each operation of the C-SGN_A 95. The storage unit_E 1940 is constituted of, for example, a semiconductor memory, a Hard Disk Drive (HDD), or the like.

The storage unit_E 1940 may store at least the identification information and/or the control information and/or the flag and/or the parameter included in the control message transmitted and/or received in the attach procedure and the data transmission procedure, which will be described in 1.3 and 1.4.

The storage unit_E 1940 stores a context A 1942, a context B 1944, a context C 1946, and a context D 1948 as illustrated in the drawing.

The context A 1942 may be the MME context 642 illustrated in FIG. 6(*a*). Additionally, the context B 1944 may be the security context 648 illustrated in FIG. 6(*a*). Additionally, the context C 1946 may be the MME emergency configuration data 650 illustrated in FIG. 6(*a*).

Figure 13:
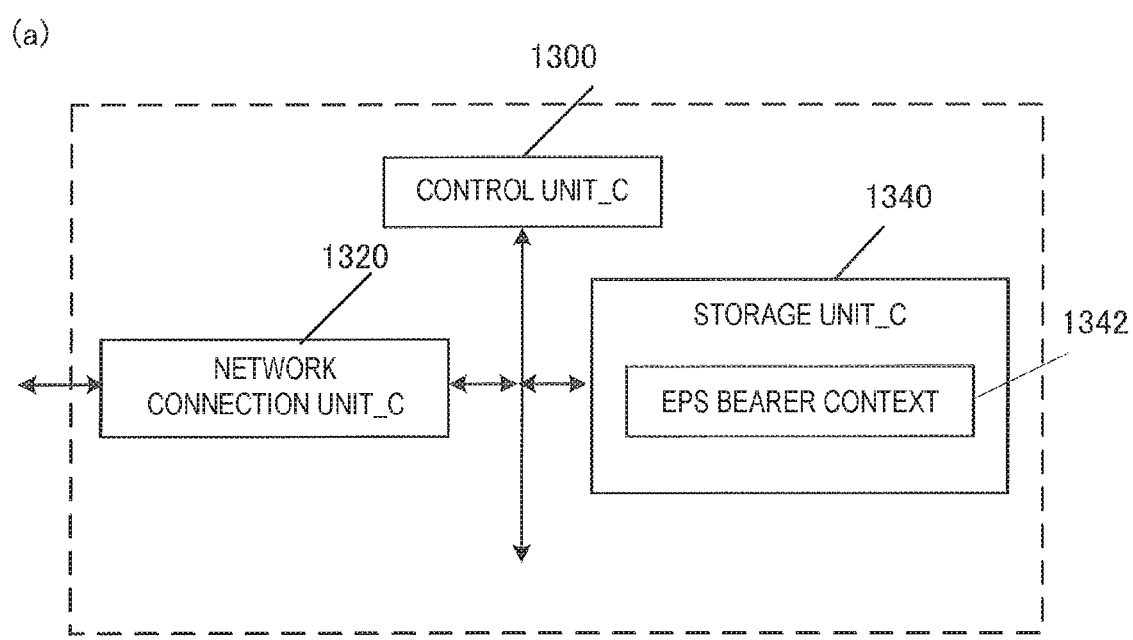
FIG. 13 is a diagram illustrating a device configuration of a SGW.

Additionally, the context D 1948 may be the EPS bearer context 1342 illustrated in FIG. 13(*a*). Additionally, the context E 1950 may be the EPS bearer context 1642 illustrated in FIG. 16(*a*).

Note that in a case that the context A 1942 to the context E 1950 include the same information element, such information element may not necessarily be redundantly stored in the storage unit_E 1940, and may be stored in any context at least.

Specifically, for example, the IMSI may be included in each of the context A 1942, the context D 1948, and the context E 1950, or may be stored in any context.

1.2.6. UE Configuration

Figure 20:
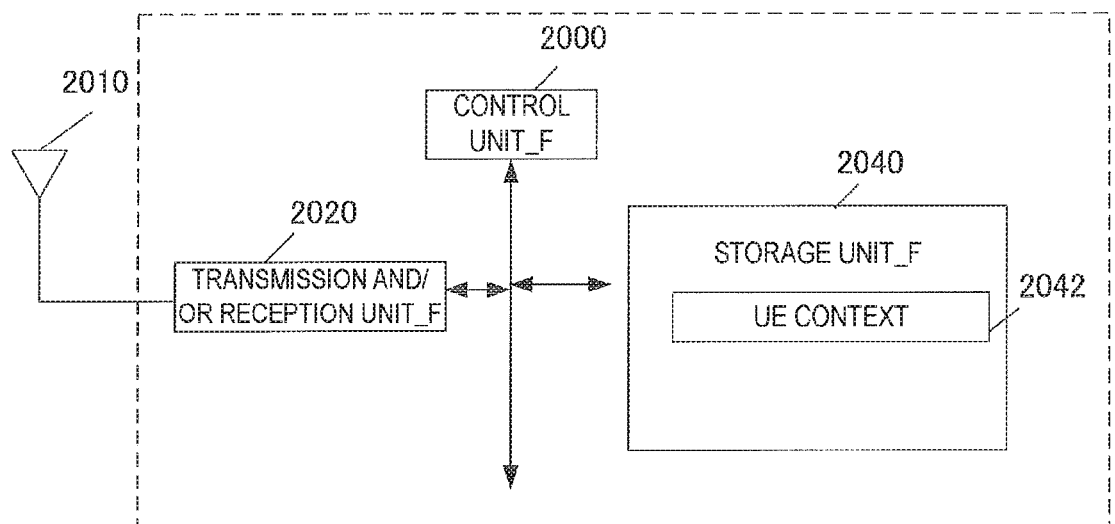
FIG. 20 is a diagram illustrating a device configuration of a UE.

FIG. 20(*a*) illustrates a device configuration of the UE_A 10. As illustrated in the drawing, the UE_A 10 includes a transmission and/or reception unit 2020, a control unit 2000, and a storage unit 2040. The transmission and/or reception unit 2020 and the storage unit 2040 are connected to the control unit 2000 via a bus.

The control unit 2000 is a function unit for controlling the UE_A 10. The control unit 2000 implements various processes by reading out and executing various programs stored in the storage unit 2040.

The transmission and/or reception unit 2020 is a function unit through which the UE_A 10 connects to an IP access network via an LTE base station. Furthermore, the external antenna 2010 is connected to the transmission and/or reception unit 2020.

The storage unit 2040 is a function unit for storing programs, data, and the like necessary for each operation of the UE_A 10. The storage unit 2040 is constituted of, for example, a semiconductor memory, a Hard Disk Drive (HDD), or the like.

As illustrated in the drawing, the storage unit 2040 stores a UE context 2042. Hereinafter, information elements stored in the storage unit 2040 will be described.

FIG. 21(*b*) illustrates information elements included in the UE context stored for each UE. As illustrated in the drawing, the UE context stored for each UE includes an IMSI, an EMM State, a GUTI, an ME Identity, a Tracking Area List, a last visited TAI, a Selected NAS Algorithm, a Selected AS Algorithm, an eKSI, K_ASME. NAS Keys and COUNT, a TIN. UE Specific DRX Parameters, an Allowed CSG list, and an Operator CSG list.

The IMSI is permanent identification information of a subscriber.

The EMM State indicates a mobility management state of the UE. For example, the EMM State may be EMM-REGISTERED in which the UE is registered with the network (registered state) or EMM-DEREGISTERD in which the UE is not registered with the network (deregistered state).

GUTI is an abbreviation of "Globally Unique Temporary Identity", and is temporary identification information on the UE. The GUTI includes the identification information about the MME (Globally Unique MME Identifier (GUMMEI)) and the identification information about the UE in a specific MME (M-TMSI).

The ME identity is an ID of an ME, and may be the IMEI/IMISV, for example.

The Tracking Area List is a list of the tracking area identification information which is assigned to the UE.

The last visited TAI is the tracking area identification information included in the Tracking Area List, and is identification information of the latest tracking area that the UE visits.

The Selected NAS Algorithm is a selected security algorithm of the NAS.

The Selected AS Algorithm is a selected security algorithm of the AS.

The eKSI is a key set indicating the K_ASME. The eKSI may indicate whether a security key acquired by a security authentication of the UTRAN or the E-UTRAN is used.

The K_ASME is a key for E-UTRAN key hierarchy generated based on the keys CK and IK.

The NAS Keys and COUNT includes the key K_NASint, the key K_NASenc, and the NAS COUNT. The K_NASint is a key for encryption between the UE and the MME, the K_NASenc is a key for safety protection between the UE and the MME. Additionally, the NAS COUNT is a count which starts a count in a case that a new key by which security between the UE and the MME is established is configured.

The Temporary Identity used in Next update (TIN) is temporary identification information used in the UE in an attach procedure or a location information update procedure (RAU/TAU).

The UE Specific DRX Parameters denote a Discontinuous Reception (DRX) cycle length of the selected UE.

The Allowed CSG list is a list of the PLMN associated with a CSG ID of a member to which the allowed UE belongs, under the control of both the user and the operator.

The Operator CSG list is a list of the PLMN associated with the CSG ID of a member to which the allowed UE belongs, under the control of only the operator.

Next. FIG. 21(*c*) illustrates the UE context stored in the transmittable and/or receivable state. The transmittable and/or receivable state is described later. At the time of establishing a PDN connection, the UE context to be stored in the transmittable and/or receivable state may be stored for each PDN connection. As illustrated in the drawing, the UE context in the transmittable and/or receivable state includes an APN in Use, an APN-AMBR, an Assigned PDN Type, an IP Address, a Default Bearer, and a WLAN offloadability.

The APN in Use is APN recently utilized. This APN may include identification information about the network and identification information about a default operator.

The APN-AMBR indicates the maximum value of the MBR of the uplink communication and the downlink communication for sharing the Non-GBR bearers (non-guaranteed bearers). The APN-AMBR is established for each APN.

The Assigned PDN Type is a type of the PDN assigned from the network. The Assigned PDN Type may be IPv4, IPv6, or IPv4v6, for example.

The IP Address is an IP address assigned to the UE, and may be an IPv4 address or an IPv6 prefix.

The Default Bearer is EPS bearer identification information for identifying a default bearer in the PDN connection at the time of establishing the PDN connection.

The WLAN offloadability is WLAN offload permission information indicating whether offload to the WLAN using an interworking function between the WLAN and the 3GPP is allowed, or the 3GPP access is maintained.

FIG. 21(*d*) illustrates the UE context for each bearer stored in the storage unit of the UE. As illustrated in the drawing, the UE context for each bearer includes an EPS Bearer ID, a TI, an EPS bearer QoS, and a TFT.

The EPS Bearer ID is identification information of the bearer.

The TI is an abbreviation of a "Transaction Identifier", and is identification information identifying a bidirectional message flow (Transaction).

The TFT is an abbreviation of a "Traffic Flow Template", and indicates all packet filters associated with the EPS bearer.

1.3. Description of Communication Procedure

Next, a communication procedure according to the present embodiment will be described using FIG. 22.

The communication procedure according to the present embodiment may include an attach procedure (S2200), selection processing of a transmission and/or reception means (S2202), a first transmission and/or reception procedure (S2204), a second transmission and/or reception procedure (S2206), and a third transmission and/or reception procedure (S2208).

The first transmission and/or reception procedure (S2204), the second transmission and/or reception procedure (S2206), and/or the third transmission and/or reception procedure (S2208) can be omitted according to conditions. The details of the conditions for each procedure to be performed and processing are described below.

Here, before describing the detailed steps of each procedure, in order to avoid redundant descriptions, terminology specific to the present embodiment and primary identification information used in each procedure will be described beforehand.

The connectionless communication in the present embodiment may be communication at least performing a process in which the UE_A 10 transmits a Non Access Stratum (NAS) message including data packet to the eNB_A 45 by including in a Radio Rsource Control (RRC) message. Additionally/Alternatively, the connectionless communication may be communication transmitting and/or receiving the data packet between the UE_A 10 and the eNB_A 45 without establishing the RRC connection. Additionally/Alternatively, the connectionless communication may be communication transmitting and/or receiving the data packet during the UE_A 10 being in the idle state.

The active mode in the present embodiment may be a mode indicating a state in which the UE_A 10 and/or the eNB_A 45 and/or the C-SGN_A 95 establish the Data Radio Bearer (DRB) and/or the Default Bearer and/or the PDN connection, and are capable of transmitting and/or receiving the user data.

Note that the DRB in the present embodiment may be a communication path such as a radio bearer established for transmission and/or reception of the user data.

The PDN connection in the present embodiment may be a connection for transmission and/or reception of the user data, the connection being established between the UE_A 10 and the C-SGN_A 95.

The idle mode in the present embodiment may be a mode indicating a state in which the UE_A 10 and/or the eNB_A 45 and/or the C-SGN_A 95 release the resource of the DRB and/or the Default Bearer and/or the PDN connection, and are not capable of transmitting and/or receiving the user data. Note that the idle mode in the present embodiment may be a mode indicating that the UE_A 10 and/or the eNB_A 45 and/or the C-SGN_A 95 keep the context for the DRB and/or the Default Bearer and/or the PDN connection.

The transmittable and/or receivable state in the present embodiment is a state capable of transmitting and/or receiving the user data between the UE_A 10 and the PDN_A 5.

In more detail, the transmittable and/or receivable state may be a state in which the UE_A 10 and/or the PDN_A 5 and/or the eNB_A 45 and/or the C-SGN_A 95 transmit and/or receive the user data.

The transmittable and/or receivable state may include a first mode, a second mode, a third mode, and a fourth mode.

The first mode may be a mode in which the UE_A 10 and/or the eNB_A 45 and/or the C-SGN_A 95 transmit and/or receive the user data with connectionless.

Furthermore, the first mode may be a mode in which the UE_A 10 and/or the eNB_A 45 transmit and/or receive the user data without establishing an RRC connection.

Furthermore, the first mode may be a mode in which the UE_A 10 and/or the C-SGN_A 95 transmit and/or receive the user data while being included in the NAS message.

Furthermore, the first mode may be a mode in which the UE_A 10 and/or the eNB_A 45 transmit and/or receive the user data while being included in the RRC message.

Furthermore, the first mode may be a mode in which the UE_A 10 and/or the eNB_A 45 transmit and/or receive a NAS Packet Data Unit (PDU) while being included in the RRC message. Note that the NAS PDU may be a control message in which the user data is included in the NAS message.

Furthermore, the first mode may be a mode in which the UE_A 10 and/or the eNB_A 45 transmit and/or receive the user data by using Signalling Radio Bearer (SRB).

Furthermore, the first mode may be a mode in which the UE_A 10 and/or the eNB_A 45 transmit and/or receive the user data by using Control Signalling Radio Bearer (CRB).

Each of the SRB and the CRB may be a communication path such as a radio bearer used for transmission and/or reception of a control message.

Furthermore, the first mode may be a mode in which the UE_A 10 and/or the eNB_A 45 and/or the C-SGN_A 95 transmit and/or receive the user data by using a bearer for transmitting and/or receiving control information.

Note that, in a case of the first mode, the UE_A 10 and/or the eNB_A 45 and/or the C-SGN_A 95 may transmit and/or receive the user data through the first transmission and/or reception procedure.

The second mode may be a mode in which the UE_A 10 and/or the eNB_A 45 and/or the C-SGN_A 95 establish a connection to transmit and/or receive the user data.

Furthermore, the second mode may be a mode in which the UE_A 10 and/or the eNB_A 45 establish an RRC connection to transmit and/or receive the user data.

Furthermore, the second mode may be a mode in which the UE_A 10 and/or the eNB_A 45 and/or the C-SGN_A 95 establish a PDN connection to transmit and/or receive the user data.

Furthermore, the second mode may be a mode in which the UE_A 10 and/or the eNB_A 45 transmit and/or receive the user data by using Data Radio Bearer (DRB).

Furthermore, the second mode may be a mode in which the UE_A 10 and/or the eNB_A 45 and/or the C-SGN_A 95 establish a bearer for transmitting and/or receiving the user data to transmit and/or receive the user data.

Furthermore, the second mode may be a mode in which the UE_A 10 and/or the eNB_A 45 and/or the C-SGN_A 95 establish a default bearer to transmit and/or receive the user data.

Furthermore, the second mode may be a mode in which the UE_A 10 and/or the eNB_A 45 and/or the C-SGN_A 95 keep the context even after entering the idle mode.

Furthermore, the second mode may be a mode in which the UE_A 10 and/or the eNB_A 45 can transmit and/or receive the NAS message while being included in a third message in an RRC.

Note that, in a case of the second mode, the UE_A 10 and/or the eNB_A 45 and/or the C-SGN_A 95 may transmit and/or receive the user data through the second transmission and/or reception procedure.

The third mode may be a mode in which the UE_A 10 and/or the eNB_A 45 and/or the C-SGN_A 95 transmit and/or receive the user data with connectionless, or may be a mode in which the UE_A 10 and/or the eNB_A 45 and/or the C-SGN_A 95 establish a connection to transmit and/or receive the user data.

Furthermore, the third mode may be a mode in which the UE_A 10 and/or the eNB_A 45 transmit and/or receive the user data without establishing an RRC connection.

Furthermore, the third mode may be a mode in which the UE_A 10 and/or the C-SGN_A 95 transmit and/or receive the user data while being included in the NAS message.

Furthermore, the third mode may be a mode in which the UE_A 10 and/or the eNB_A 45 transmit and/or receive the user data while being included in the RRC message.

Furthermore, the first mode may be a mode in which the UE_A 10 and/or the eNB_A 45 transmit and/or receive the NAS Packet Data Unit (PDU) while being included in the RRC message.

Furthermore, the third mode may be a mode in which the UE_A 10 and/or the eNB_A 45 transmit and/or receive the user data by using Signalling Radio Bearer (SRB).

Furthermore, the third mode may be a mode in which the UE_A 10 and/or the eNB_A 45 transmit and/or receive the user data by using Control Signalling Radio Bearer (CRB).

Furthermore, the third mode may be a mode in which the UE_A 10 and/or the eNB_A 45 and/or the C-SGN_A 95 transmit and/or receive the user data by using a bearer for transmitting and/or receiving control information.

Furthermore, the third mode may be a mode in which the UE_A 10 and/or the eNB_A 45 establish an RRC connection to transmit and/or receive the user data.

Furthermore, the third mode may be a mode in which the UE_A 10 and/or the eNB_A 45 and/or the C-SGN_A 95 establish a PDN connection to transmit and/or receive the user data.

Furthermore, the third mode may be a mode in which the UE_A 10 and/or the eNB_A 45 transmit and/or receive the user data by using Data Radio Bearer (DRB).

Furthermore, the third mode may be a mode in which the UE_A 10 and/or the eNB_A 45 and/or the C-SGN_A 95 establish a bearer for transmitting and/or receiving the user data to transmit and/or receive the user data.

Furthermore, the third mode may be a mode in which the UE_A 10 and/or the eNB_A 45 and/or the C-SGN_A 95 establish a default bearer to transmit and/or receive the user data.

Furthermore, the third mode may be a mode in which the UE_A 10 and/or the eNB_A 45 and/or the C-SGN_A 95 keep the context even after entering the idle mode.

Furthermore, the third mode may be a mode in which the UE_A 10 and/or the eNB_A 45 can transmit and/or receive the NAS message while being included in the third message in the RRC.

Note that, in a case of the third mode, the UE_A 10 and/or the eNB_A 45 and/or the C-SGN_A 95 may transmit and/or receive the user data through the first transmission and/or reception procedure and/or the second transmission and/or reception procedure.

The fourth mode may be a mode in which the UE_A 10 and/or the eNB_A 45 and/or the C-SGN_A 95 establish a connection to transmit and/or receive the user data.

Furthermore, the fourth mode may be a mode in which the UE_A 10 and/or the eNB_A 45 establish an RRC connection to transmit and/or receive the user data.

Furthermore, the fourth mode may be a mode in which the UE_A 10 and/or the eNB_A 45 and/or the C-SGN_A 95 establish a PDN connection to transmit and/or receive the user data.

Furthermore, the fourth mode may be a mode in which the UE_A 10 and/or the eNB_A 45 transmit and/or receive the user data by using the DRB.

Furthermore, the fourth mode may be a mode in which the UE_A 10 and/or the eNB_A 45 and/or the C-SGN_A 95 establish a bearer for transmitting and/or receiving the user data to transmit and/or receive the user data.

Furthermore, the fourth mode may be a mode in which the UE_A 10 and/or the eNB_A 45 and/or the C-SGN_A 95 establish a default bearer to transmit and/or receive the user data.

Furthermore, the fourth mode may be a mode in which the UE_A 10 and/or the eNB_A 45 and/or the C-SGN_A 95 establish two or more default bearers to transmit and/or receive the user data.

Furthermore, the fourth mode may be a mode in which the UE_A 10 and/or the eNB_A 45 and/or the C-SGN_A 95 delete the context after entering the idle mode.

Furthermore, the fourth mode may be a mode in which the UE_A 10 and/or the eNB_A 45 cannot transmit and/or receive the NAS message while being included in the third message in the RRC.

Note that, in a case of the fourth mode, the UE_A 10 and/or the eNB_A 45 and/or the C-SGN_A 95 may transmit and/or receive the user data through the third transmission and/or reception procedure.

The first identification information in the present embodiment may be information indicating that the UE_A 10 performing the attach procedure is a Cellular Internet of Things (CIoT) terminal.

Additionally/Alternatively, the first identification information may be information indicating a type of attach that indicates an attach by the CIoT terminal. Note that the information indicating the type of attach may be an Attach type. Moreover, an attach type indicating the attach by the CIoT terminal may be a CIoT attach. Additionally/Alternatively, the attach type may be information that indicates an attach type requesting a connection to a system optimized for Internet of Things (IoT).

The attach by the CIoT terminal may be an attach for the purpose that the eNB_A 45 selects the C-SGN_A 95 optimized for CIoT and the UE_A 10 connects to the selected C-SGN_A 95.

Additionally/Alternatively, the first identification information may be information indicating that the UE_A 10 requests to connect to the system optimized for CIoT and/or IoT.

Additionally/Alternatively, the first identification information may be information indicating that the UE_A 10 includes capability of the CIoT terminal. Note that the information indicating that the UE_A 10 includes the capability of the CIoT terminal may be UE Capability.

Additionally/Alternatively, the first identification information may be information indicating that a terminal includes terminal capability for transmitting the user data by using a radio bearer for transmitting and/or receiving a control message.

Additionally/Alternatively, the first identification information may be information indicating that the UE_A 10 transmits and/or receives the user data, based on the first transmission and/or reception procedure.

Additionally/Alternatively, the first identification information may be information indicating a request to transmit the user data by using the radio bearer for transmitting and/or receiving the control message. In more detail, the first identification information may be information indicating that the UE_A 10 requests to UE_A 10 transmission and/or reception of the user data based on the first transmission and/or reception procedure.

Additionally/Alternatively, the first identification information may be information indicating that the UE_A 10 requests to transmit and/or receive the user data, based on the first transmission and/or reception procedure.

Additionally/Alternatively, the first identification information may be information indicating that the user data is transmitted and/or received while being included in the NAS message. Additionally/Alternatively, the first identification information may be information indicating a request to transmit and/or receive the user data while being included in the NAS message.

Additionally/Alternatively, the first identification information may be information indicating that the user data is transmitted and/or received while being included in the RRC message.

Additionally/Alternatively, the first identification information may be information indicating a request to transmit and/or receive the user data while being included in the RRC message.

Additionally/Alternatively, the first identification information may be information indicating that the UE_A 10 and/or the eNB_A 45 transmit and/or receive the NAS Packet Data Unit (PDU) while being included in the RRC message.

Additionally/Alternatively, the first identification information may be information indicating that the UE_A 10 and/or the eNB_A 45 request to transmit and/or receive the NAS Packet Data Unit (PDU) while being included in the RRC message.

Note that the NAS PDU may be a control message in which the user data is included in the NAS message.

The second identification information in the present embodiment may be information indicating that an attach using information indicating a type of attach that indicates an attach by the CIoT terminal is allowed.

Additionally/Alternatively, the second identification information may be Network Capability Information indicating that network capability is included by which the user data can be transmitted and/or received using a radio bearer for transmitting and/or receiving the control message. In more detail, the second identification information may be information indicating that the C-SGN_A 95 and/or the core network_A 90 include capability of connecting to the CIoT terminal. Note that the information indicating that the C-SGN_A 95 and/or the core network_A 90 include capability of connecting to the CIoT terminal may be NW Capability.

Additionally/Alternatively, the second identification information may be information indicating that the C-SGN_A 95 transmits and/or receives the user data, based on the first transmission and/or reception procedure.

Additionally/Alternatively, the second identification information may be information indicating that user data is transmitted by using the radio bearer for transmitting and/or receiving the control message is allowed. In more detail, the second identification information may be information indicating that the C-SGN_A 95 allows transmission and/or reception of the user data based on the first transmission and/or reception procedure.

Additionally/Alternatively, the second identification information may be information indicating that a connection to the system optimized for IoT is established.

The third identification information in the present embodiment may be UE Capability Information indicating that network capability is included by which the user data can be transmitted and/or received by establishing a radio bearer for transmitting and/or receiving the user data. In more detail, the third identification information may be the UE Capability Information indicating that the UE_A 10 includes capability for transmission and/or reception of the user data based on the second transmission and/or reception procedure.

Additionally/Alternatively, the third identification information may be information indicating that the UE_A 10 transmits and/or receives the user data, based on the second transmission and/or reception procedure.

Additionally/Alternatively, the third identification information may be information indicating a request to transmit and/or receive the user data by establishing the radio bearer for transmitting and/or receiving the user data. In more detail, the third identification information may be information indicating that the UE_A 10 requests to allow transmission and/or reception of the user data based on the second transmission and/or reception procedure.

Additionally/Alternatively, the third identification information may be information indicating that the UE_A 10 requests to transmit and/or receive the user data, based on the second transmission and/or reception procedure.

Additionally/Alternatively, the third identification information may be information indicating that the terminal capability is included by which the first state transition can be performed, and/or information indicating a request to perform the first state transition. Note that the first state transition may be a state transition by which a state is changed between the active state and the idle state, based on a Resume ID described later.

The fourth identification information in the present embodiment may be Network Capability Information indicating that network capability is included by which the user data can be transmitted and/or received by establishing a radio bearer for transmitting and/or receiving the user data. In more detail, the fourth identification information may be the Network Capability Information indicating that the C-SGN_A 95 and/or the core network_A 90 include capability for transmission and/or reception of the user data based on the second transmission and/or reception procedure.

Additionally/Alternatively, the fourth identification information may be information indicating that the C-SGN_A 95 transmits and/or receives the user data, based on the second transmission and/or reception procedure.

Additionally/Alternatively, the fourth identification information may be information indicating that user data is transmitted and/or received by establishing the radio bearer for transmitting and/or receiving the user data is allowed. In more detail, the fourth identification information may be information indicating that the C-SGN_A 95 allows transmission and/or reception of the user data based on the second transmission and/or reception procedure.

Additionally/Alternatively, the fourth identification information may be information indicating that the network capability is included by which the first state transition can be allowed, and/or information indicating that performing the first state transition is allowed. Note that the first state transition may be a state transition by which a state is changed between the active state and the idle state, based on the Resume ID described later.

The fifth identification information in the present embodiment may be information indicating that the eNB_A 45 includes capability for transmission and/or reception of the user data based on the second transmission and/or reception procedure. Note that the information indicating that the eNB_A 45 includes capability for transmission and/or reception of the user data based on the second transmission and/or reception procedure may be eNB Capability.

Additionally/Alternatively, the fifth identification information may be information indicating that the eNB_A 45 transmits and/or receives the user data, based on the second transmission and/or reception procedure.

Additionally/Alternatively, the fifth identification information may be information indicating that the eNB_A 45 allows to transmit and/or receive the user data, based on the second transmission and/or reception procedure.

Additionally/Alternatively, the fifth identification information may be information indicating that the eNB_A 45 requests to transmit and/or receive the user data, based on the second transmission and/or reception procedure.

The sixth identification information in the present embodiment may be information indicating a type of PDN Address requested by the UE_A 10 to be assigned. The information indicating the type of PDN Address may be a PDN Type. The PDN type may be information indicating an IPv4, may be information indicating an IPv6, and may be information indicating an IPv4v6.

Additionally/Alternatively, the sixth identification information may be information indicating that the Data Radio Bearer (DRB) and/or Default Bearer are requested to be established in the attach procedure.

The seventh identification information in the present embodiment may be information indicating the PDN Address assigned by the C-SGN_A 95 to the UE_A 10. The PDN address may be an IPv4 Address, or may be an Interface Identifier (Interface ID) indicated by lower 64 bit information of an IPv6 Address, or may include both the IPv4 address and the interface ID of the IPv6.

In more detail, the PDN address may be constituted by an IPv4 address field including the IPv4 address and/or an IPv6 address field including the interface ID of the IPv6.

In a case that the PDN address assigned to the UE_A 10 includes an IPv4 address with all elements indicated by zero such as 0.0.0.0, and/or any interface ID of the IPv6, the seventh identification information may be used as information indicating that establishing the Data Radio Bearer (DRB) and/or the Default Bearer in the attach procedure is allowed, in order that the UE_A 10 acquires an IP address.

Moreover, in a case that the PDN address assigned to the UE_A 10 is not an address with all elements indicated by zero such as 0.0.0.0 but includes an IPv4 address used by the UE_A 10, and does not include any interface ID of the IPv6, the seventh identification information may be used as information indicating that the Data Radio Bearer (DRB) and/or the Default Bearer are not established in the attach procedure, in order that the UE_A 10 acquires an IP address. In this case, the seventh identification information may be used as information indicating that acquisition of the IP address is not required after completion of the attach procedure.

In a case that all the IPv4 address field of the PDN address includes zero such as 0.0.0.0, the seventh identification information may be used as information indicating or requesting acquisition of the IPv4 address by using DHCP after completion of the attach procedure for the UE_A 10.

In a case that the IPv6 address field of the PDN address includes any interface ID of the IPv6, the seventh identification information may be used as information indicating or requesting acquisition of an IPv6 prefix indicated by upper 64 bit information of an IPv6 address for creating and/or acquiring the IPv6 address by using a stateless address configuration procedure or the like after completion of the attach procedure for the UE_A 10.

The eighth identification information in the present embodiment may be information indicating that the C-SGN_A 95 and/or the core network_A 90 do not include capability for transmission and/or reception of the user data based on the second transmission and/or reception procedure. Note that the information indicating that the C-SGN_A 95 and/or the core network_A 90 do not include capability for transmission and/or reception of the user data based on the second transmission and/or reception procedure may be NW Capability.

Additionally/Alternatively, the eighth identification information may be information indicating that the C-SGN_A 95 does not perform transmission and/or reception of the user data based on the second transmission and/or reception procedure.

Additionally/Alternatively, the eighth identification information may be information indicating that the C-SGN_A 95 does not allow the transmission and/or reception of the user data based on the second transmission and/or reception procedure to be performed.

The ninth identification information in the present embodiment may be information indicating a reason why the C-SGN_A 95 determines not to perform the transmission and/or reception of the user data based on the second transmission and/or reception procedure.

Additionally/Alternatively, the eighth identification information may be information indicating a reason why the C-SGN_A 95 determines not to allow the transmission and/or reception of the user data based on the second transmission and/or reception procedure to be performed.

Note that the reasons for determination not to perform the transmission and/or reception of the user data based on the second transmission and/or reception procedure, and/or not to allow the transmission and/or reception to be performed may be included in EMM cause.

The tenth identification information in the present embodiment may be information indicating that the UE_A 10 performing the detach procedure is the CIoT terminal.

Additionally/Alternatively, the tenth identification information may be information indicating a type of detach that indicates a detach by the CIoT terminal. Note that the information indicating the type of detach may be a Detach type. Moreover, a detach type indicating the detach by the CIoT terminal may be a CIoT detach.

Additionally/Alternatively, the eleventh identification information may be the detach type requesting that a connection to the system optimized for IoT is released.

Additionally/Alternatively, the detach by the CIoT terminal may be a detach for the purpose of releasing the connection of the UE_A 10 connected for the CIoT terminal.

Additionally/Alternatively, the tenth identification information may be information indicating that the UE_A 10 releases the connection in which the user data is transmitted and/or received based on the first transmission and/or reception procedure and/or the second transmission and/or reception procedure.

Additionally/Alternatively, the tenth identification information may be information indicating that the UE_A 10 requests to release the connection in which the user data is transmitted and/or received based on the first transmission and/or reception procedure and/or the second transmission and/or reception procedure.

Additionally/Alternatively, the tenth identification information may be information indicating that the UE_A 10 requests to release the connection to the system optimized for CIoT and/or IoT.

The transmittable and/or receivable state of the UE_A 10 performing the detach procedure may be information indicating the first mode and/or the second mode and/or the third mode.

The eleventh identification information in the present embodiment may be information indicating that the C-SGN_A 95 performing the detach procedure is connected to the CIoT terminal.

Additionally/Alternatively, the eleventh identification information may be information indicating a type of detach that indicates a detach by the CIoT terminal. Note that the information indicating the type of detach may be the Detach type. Moreover, the detach type indicating the detach by the CIoT terminal may be the CIoT detach.

Note that the detach by the CIoT terminal may be a detach for the purpose of releasing the connection of the UE_A 10 serving as the CIoT terminal.

Additionally/Alternatively, the eleventh identification information may be the detach type requesting that a connection to the system optimized for IoT is released.

Additionally/Alternatively, the eleventh identification information may be information indicating that the C-SGN_A 95 releases the connection in which the user data is transmitted and/or received based on the first transmission and/or reception procedure and/or the second transmission and/or reception procedure.

Additionally/Alternatively, the eleventh identification information may be information indicating that the C-SGN_A 95 requests to release the connection in which the user data is transmitted and/or received based on the first transmission and/or reception procedure and/or the second transmission and/or reception procedure.

The transmittable and/or receivable state of the C-SGN_A 95 performing the detach procedure may be information indicating the first mode and/or the second mode and/or the third mode.

The twelfth identification information in the present embodiment may be information indicating a reason why the C-SGN_A 95 determines to perform the detach procedure.

For example, a reason for the determination to perform the detach procedure may be information indicating that the UE_A 10, the C-SGN_A 95, and/or the eNB_A 45 are prohibited from being in the first mode and/or the second mode and/or the third mode of the transmittable and/or receivable state, based on a change of subscriber information, an operator policy, or the like. In other words, the reason may be information indicating that the UE_A 10, the C-SGN_A 95, and/or the eNB_A 45 are prohibited from transmitting and/or receiving the user data through the first transmission and/or reception procedure and/or the second transmission and/or reception procedure, based on a change of subscriber information, an operator policy, or the like.

Additionally/Alternatively, the twelfth identification information may be information indicating a reason why the transmission and/or reception of the user data based on the first transmission and/or reception procedure and/or the second transmission and/or reception procedure are prohibited.

The reason why the C-SGN_A 95 determines to perform the detach procedure, and/or the reason why the transmission and/or reception of the user data based on the first transmission and/or reception procedure and/or the second transmission and/or reception procedure are prohibited may be included in the EMM cause.

Further, in the present embodiment, in a case that two or more kinds of identification information among the first to twelfth identification information are transmitted while being included in the same control message, each kind of identification information may be included and transmitted, or one kind of identification information having meanings indicated by each kind of identification information may be included in the control message. Note that the identification information may be an information element configured as the flag or the parameter.

1.3.1. Attach Procedure Example

First, an example of an attach procedure will be described. Note that the attach procedure is a procedure which is started on the initiative of the UE_A 10. In the attach procedure of a normal case, the attach procedure is a procedure for the UE_A 10 to connect to a network. In other words, the attach procedure of the normal case is a procedure for connecting to an access network including the eNB 45, and is a procedure for further connecting to a core network through the access network. The UE_A 10 establishes a communication path through which the user data is transmitted and/or received with the PDN_A 5 by the attach procedure of the normal case.

A trigger when the UE_A 10 starts the attach procedure may be a time when the terminal is switched on, or the like. Additionally, the UE_A 10 may start at an arbitrary timing in a case that the UE_A 10 is not connected to the core network_A 90 regardless of the above. The UE_A 10 may enter the transmittable and/or receivable state, based on connecting to the core network_A 90 network, and/or completion of the attach procedure.

Hereinafter, the details of the attach procedure of a normal case are described as a first attach procedure example.

In the attach procedure of an abnormal case, the attach procedure is a procedure in which the UE_A 10 has not established a connection to a network at the time of completion of the attach procedure. In other words, the attach procedure of an abnormal case is a procedure in which an attempt to connect to the network by the UE_A 10 fails finally, and a procedure in which the UE_A 10 and/or the C-SGN_A 95 reject that the UE_A 10 connects to the network. The details of an attach procedure example of an abnormal case are described as a second attach procedure example and a third attach procedure example.

1.3.1.1. First Attach Procedure Example

Hereinafter, an example of the steps of a first attach procedure will be described using FIG. 23.

First, the UE_A 10 transmits an attach request message to the C-SGN_A 95 (S2300). Note that the UE_A 10 may transmit the attach request message to the eNB_A 45, and the transmitted attach request message may be transferred to the C-SGN_A 95 via the eNB_A 45.

Additionally, the UE_A 10 may transmit a PDN connectivity request message with the attach request message. Hereinafter, in the description of the present embodiment, the attach request message is described as a message in which the attach request message and the PDN connectivity request message are combined. Furthermore, in the description of the present embodiment, in a case that an expression "identification information is included in the attach request message" is used, the expression means that the identification information is included in the attach request message and/or the PDN connectivity request message.

The UE_A 10 may include at least the first identification information and/or the third identification information and/or the sixth identification information in the attach request message. The UE_A 10 may request a transition to the transmittable and/or receivable state by transmitting the attach request message including the first identification information and/or the third identification information. The eNB_A 45 may include the fifth identification information in the attach request message and/or a message for transferring the attach request message. The eNB_A 45 may request a transition to the transmittable and/or receivable state by transmitting the fifth identification information while being included in the attach request message and/or the message for transferring the attach request message.

Here, the first identification information and/or the third identification information and/or the sixth identification information may not be transmitted to the C-SGN_A 95 by being included in the attach request message, and may instead be transmitted while being included in a control message different from the attach request in the attach procedure.

For example, after transmitting the attach request message, the UE_A 10 may perform a request of EPS Session Management (ESM) information, and a transmission and/or reception procedure of a control message which responds based on the request (S2302).

To be more specific, the C-SGN_A 95 transmits an ESM request message to the UE_A 10. The UE_A 10 receives the ESM request message, and transmits a response message to the C-SGN_A 95. At this time, the UE_A 10 may transmit the first identification information and/or the third identification information and/or the sixth identification information while being included in the response message.

Here, the UE_A 10 may encrypt and transmit the ESM response message. Furthermore, the UE_A 10 may receive information for encrypting the ESM response message from the C-SGN_A 95. The C-SGN_A 95 may transmit information for encrypting the NAS message to the UE_A 10 with the reception of the attach request message. Note that the NAS message for which the information for encrypting the NAS message is transmitted may be a Security Mode Command message.

The C-SGN_A 95 receives the attach request message. Furthermore, the C-SGN_A 95 acquires the first identification information and/or the third identification information and/or the fifth identification information and/or the sixth identification information, based on the reception of the attach request message or the reception of the ESM response message.

The C-SGN_A 95 may determine to enter the transmittable and/or receivable state for the UE_A 10, based on information included in the attach request message, subscriber information, and identification information held by the C-SGN. The transmittable and/or receivable state which is a destination of the transition may be determined, based on the first identification information, and/or the third identification information, and/or the fifth identification information, and/or the sixth identification information, and/or the subscriber information, and/or the second identification information, and/or the fourth identification information.

For example, the C-SGN_A 95 approves and determines the transmittable and/or receivable state which is a destination of the transition, based on the presence or absence of the first identification information, and/or the third identification information, and/or the fifth identification information, and/or the second identification information, and/or the fourth identification information. In more detail, the C-SGN_A 95 may approve and determine whether the transmittable and/or receivable state which is a destination of the transition is the first mode, the second mode, the third mode or the fourth mode, based on the first identification information, and/or the third identification information, and/or the fifth identification information, and/or the second identification information, and/or the fourth identification information. Hereinafter, the approval and determination process described above is referred to as a first determination and described.

In more detail, the C-SGN_A 95 may enter the transmittable and/or receivable state in the first mode in a case that the attach request includes the first identification information, and the third identification information, and the fifth identification information and that the C-SGN_A 95 holds the second identification information and does not hold the fourth identification information.

Moreover, the C-SGN_A 95 may enter the transmittable and/or receivable state in the first mode in a case that the attach request includes the first identification information, and that the attach request does not include the third identification information and/or the fifth identification information, and that the C-SGN_A 95 holds the second identification information.

The C-SGN_A 95 may enter the transmittable and/or receivable state in the second mode in a case that the attach request includes the first identification information, and the third identification information, and the fifth identification information and that the C-SGN_A 95 does not hold the second identification information and holds the fourth identification information.

The C-SGN_A 95 may enter the transmittable and/or receivable state in the third mode in a case that the attach request includes the first identification information, the third identification information, and the fifth identification information, and that the C-SGN_A 95 holds the second identification information and the fourth identification information.

The C-SGN_A 95 may enter the transmittable and/or receivable state in the fourth mode in a case that the attach request does not include the first identification information.

The C-SGN_A 95 may enter the transmittable and/or receivable state in the fourth mode in a case that the C-SGN_A 95 does not hold the second identification information and the fourth identification information.

Note that the conditions of the transition to the transmittable and/or receivable state in each mode are not limited above.

In a case of determining to enter the transmittable and/or receivable state other than the first mode, the C-SGN_A 95 starts an IP-CAN session update procedure (S2304). The IP-CAN session update procedure may be the same as the known procedure, and therefore detailed descriptions thereof will be omitted.

The C-SGN_A 95 may assign an IP address to the UE_A 10 as usual. In more detail, the C-SGN_A 95 may assign the IP address of the UE_A 10 and include the IP address in the seventh identification information.

The C-SGN_A 95 transmits an attach accept message to the eNB_A 45 with completion of the IP-CAN session update procedure (S2306).

Additionally, the C-SGN_A 95 may transmit an Activate default EPS bearer context request message with the attach accept message. Hereinafter, in the description of the present embodiment, the attach accept message is described as a message in which the attach accept message and the Activate default EPS bearer context request message are combined. Furthermore, in the description of the present embodiment, in a case that an expression "identification information is included in the attach accept message" is used, the expression means that the identification information is included in the attach accept message and/or the Activate default EPS bearer context request message.

The C-SGN_A 95 may include at least the second identification information and/or the fourth identification information and/or the seventh identification information in the attach accept message.

Note that the C-SGN_A 95 may make a connection state for the UE_A 10 the idle mode with the transmission of the attach accept message based on the first determination. In other words, the C-SGN_A 95 may make the connection state for the UE_A 10 the idle mode, based on the transition to the transmittable and/or receivable state. In more detail, the C-SGN_A 95 may make the connection state for the UE_A 10 the idle mode, based on the transmittable and/or receivable state which is a destination of the transition being the first mode. In other words, in a case of transmitting the attach accept message for entering the transmittable and/or receivable state in the second mode, and/or the third mode, and/or the fourth mode, the C-SGN_A 95 may make the connection state for the UE_A 10 the active mode with the transmission of the message.

Note that, in a case that the transmittable and/or receivable state which is a destination of the transition is the first mode, the C-SGN_A 95 may establish the DRB, and/or the Default Bearer, and/or the PDN connection for acquisition of the IP address with the UE_A 10 and/or the eNB_A 45, based on the sixth identification information and/or the seventh identification information. In this case, based on the acquisition of the IP address of the UE_A 10, the C-SGN_A 95 may release the DRB, and/or the Default Bearer, and/or the PDN connection established with the UE_A 10 and/or the eNB_A 45 for the acquisition of the IP address.

The eNB_A 45 receives the attach accept message, and transmits the RRC message including the attach accept message to the UE_A 10 (S2308). Note that the RRC message may be an RRC connection reconfiguration request message.

The UE_A 10 receives the RRC message including the attach accept message. Furthermore, in a case that the second identification information and/or the fourth identification information and/or the seventh identification information is included in the attach accept message, the UE_A 10 acquires each piece of identification information.

In order to respond to the received RRC message, the UE_A 10 transmits the RRC message to the eNB_A 45 (S2310). The RRC message may be an RRC connection reconfiguration complete message.

The eNB_A 45 receives an RRC connection reconfiguration message, and transmits a bearer configuration message to the C-SGN_A 95 based on the reception (S2312).

Additionally, the UE_A 10 transmits the RRC message including an attach complete message to the eNB_A 45, based on the reception of the attach accept message (S2314).

Additionally, the UE_A 10 may transmit an Activate default EPS bearer context accept message with the attach complete message. Hereinafter, in the description of the present embodiment, the attach complete message is described as a message in which the attach complete message and the Activate default EPS bearer context accept message are combined. Furthermore, in the description of the present embodiment, in a case that an expression "identification information is included in the attach complete message" is used, the expression means that the identification information is included in the attach complete message and/or the Activate default EPS bearer context accept message.

Note that the RRC message to be transmitted while including the attach complete message may be a Direct Transfer message.

Whether the Activate default EPS bearer context request message is a message which requires to establish the DRB and/or the Default Bearer may be determined, based on whether the attach accept message includes the second identification information and/or the fourth identification information.

In more detail, in a case that the attach accept includes the second identification information and does not include the fourth identification information, the Activate default EPS bearer context request message may be a message not intended to establish the DRB and/or the Default Bearer.

In other cases, the Activate default EPS bearer context accept message may be a message intended to establish the DRB and/or the Default Bearer.

The UE_A 10 enters the transmittable and/or receivable state, based on the reception of the attach accept message and/or the transmission of the attach complete message.

The UE_A 10 may interpret and detect the changed transmittable and/or receivable state, based on the second identification information and/or the fourth identification information and/or the seventh identification information. In more detail, the UE_A 10 may interpret and detect whether the changed transmittable and/or receivable state is the first mode, the second mode, the third mode, or the fourth mode, based on the second identification information, and/or the fourth identification information, and/or the seventh identification information. Hereinafter, the recognition and determination process described above is referred to as a second determination and described.

In more detail, the UE_A 10 may enter the transmittable and/or receivable state in the first mode in a case that the attach accept includes the second identification information and does not include the fourth identification information.

The UE_A 10 may enter the transmittable and/or receivable state in the second mode in a case that the attach accept does not include the second identification information and includes the fourth identification information.

The UE_A 10 may enter the transmittable and/or receivable state in the third mode in a case that the attach accept includes the second identification information and includes the fourth identification information.

The UE_A 10 may enter the transmittable and/or receivable state in the fourth mode in a case that the attach accept does not include the second identification information and does not include the fourth identification information.

Note that the conditions of the transition to the transmittable and/or receivable state in each mode are not limited above.

The UE_A 10 may establish the DRB, and/or the Default Bearer, and/or the PDN connection, based on the reception of the attach accept message and/or the transmission of the attach complete message.

Note that in a case that the transmittable and/or receivable state is the first mode, the UE_A 10 and/or the eNB_A 45 and/or the C-SGN_A 95 may not establish the DRB and/or the Default Bearer and/or the PDN connection.

Even in the case that the transmittable and/or receivable state is the first mode, the UE_A 10 and/or the eNB_A 45 and/or the C-SGN_A 95 may establish the DRB and/or the Default Bearer and/or the PDN connection in a case that a procedure for acquiring an IP address of the UE_A 10 is required based on the sixth identification information and/or the seventh identification information.

The eNB_45 receives the RRC message including the attach complete message, and transmits the attach complete message to the C-SGN_A 95 (S2316).

Additionally, the UE_A 10 may transit to the idle mode with the transmission of the attach complete message based on the second determination.

Alternatively, the UE_A 10 may receive the RRC message from the eNB_A 45 as the response for the Direct Transfer message including the attach complete message, and may transit to the idle mode with the reception of the response message based on the second determination.

As a more detailed example, the UE_A 10 may transmit identification information indicating the transition to the idle mode included in the attach complete message and/or the Direct Transfer message.

Furthermore, the eNB_A 45 which receives the Direct Transfer message may transmit the RRC message to be a response to the UE_A 10 based on the received identification information. As described above, the RRC message to be the response may be a message for allowing the transition to the idle mode.

In other words, the UE_A 10 can select whether to transit to the idle mode or to maintain the active mode based on the second determination.

Alternatively, in a case that the changed transmittable and/or receivable state is the first mode, the UE_A 10 may establish a connection for IP address acquisition with the eNB_A 45 and/or the C-SGN_A 95, based on the sixth identification information and/or the seventh identification information. Note that the connection may be the DRB, and/or the Default Bearer, and/or the PDN connection.

For example, in a case that the changed transmittable and/or receivable state is the first mode, and the seventh identification information indicates that acquisition of the IP address is required after completion of the attach procedure, the UE_A 10 may establish a connection for IP address acquisition with the eNB_A 45 and/or the C-SGN_A 95.

In more detail, in a case that the established transmittable and/or receivable is the first mode, and the seventh identification information includes an IPv4 address with all elements indicated by zero such as 0.0.0.0, and/or any interface ID of the IPv6, the UE_A 10 may establish the connection for IP address acquisition.

Note that in a case that the IPv4 address field of the seventh identification information includes an IPv4 address with all elements indicated by zero such as 0.0.0.0, the UE_A 10 may initiate a DHCP procedure to acquire an IPv4 address.

Specifically, the UE_A 10 may transmit a message which requests an IPv4 address from a DHCP server, based on the above-described conditions. The UE_A 10 may acquire the IPv4 address by receiving a response message including an IPv4 address assigned to the UE_A 10 from the DHCP server.

In a case that the IPv6 address field of the seventh identification information includes any interface ID of the IPv6, the UE_A 10 may acquire the IPv6 prefix indicated by upper 64 bit information of the IPv6 address, and creates or acquires the IPv6 address by using the stateless address configuration procedure.

Specifically, the UE_A 10 may transmit a Router Solicitation (RS) message which requests the IPv6 prefix from a router and/or a server, based on the above-described conditions. The UE_A 10 may acquire the IPv6 prefix by receiving a Router Advertisement (RA) message including the assigned IPv6 prefix from the router and/or the server. Furthermore, the UE_A 10 may create or acquire the IPv6 from the acquired IPv6 prefix and the interface ID of the IPv6, based on the reception of the RA message, and/or the reception of the IPv6 prefix included in the RA message.

For example, in a case that the changed transmittable and/or receivable state is the first mode, and the sixth identification information indicates an IPv4 address, and the seventh identification includes an IPv4 address used by the UE_A 10, the IPv4 address not being an IPv4 address with all elements indicated by zero such as 0.0.0.0, and the seventh identification does not include an IPv6 interface ID, the UE_A 10 may not establish the connection for IP address acquisition.

Moreover, in a case that the changed transmittable and/or receivable state is the first mode, and the connection for IP address acquisition is established, the UE_A 10 may release the connection established with the eNB_A 45 and/or the C-SGN_A 95, based on the acquisition of IP address.

Hereinafter, a UE_A 10 initiated procedure for releasing the connection between the UE_A 10, and the eNB_A 45 and/or the C-SGN_A 95 will be described.

The UE_A 10 transmits a connection release request message to the eNB_A 45 and/or the C-SGN_A 95. The connection release request message may be a message for requesting the release of the connection.

The eNB_A 45 receives the connection release request message transmitted by the UE_A 10. The eNB_A 45, based on the reception of the connection release request message, transmits a connection release request message to the C-SGN_A 95.

The C-SGN_A 95 receives the connection release request message transmitted by the eNB_A 45 and/or the UE_A 10. The C-SGN_A 95, based on the reception of the connection release request message, transmits a connection release accept message to the eNB_A 45 and/or the UE_A 10, Here, the connection release accept message may be a response message to the connection release request message.

The C-SGN_A 95, based on the reception of the connection release request message and/or the transmission of the connection release accept message, releases the context of the C-SGN_A 95 for the connection, The context of the C-SGN_A 95 for the connection may be the context D and/or the context E illustrated in FIG. 19(*a*).

The eNB_A 45 receives the connection release accept message transmitted by the C-SGN_A 95. The eNB_A 45, based on the reception of the connection release accept message, transmits a connection release accept message to the UE_A 10.

The eNB_A 45, based on the reception of the connection release request message, and/or the reception of the connection release accept message, and/or the transmission of the connection release accept message, releases the context of the eNB_A 45 for the connection, The UE_A 10 receives the connection release accept message transmitted by the eNB_A 45 and/or the C-SGN_A 95.

The UE_A 10, based on the transmission of the connection release request message and/or the reception of the connection release accept message, releases the context of the UE_A 10 for the connection. The context of the UE_A 10 for the connection may be a UE context stored in the transmittable and/or receivable state illustrated in FIG. 21(*c*) and/or a UE context for each bearer illustrated in FIG. 21(*d*).

By the above-described procedures, the UE_A 10 and/or the eNB_A 45 and/or the C-SGN_A 95 releases the context for the connection, and the connection between the UE_A 10, and the eNB_A 45 and/or the C-SGN_A 95 is released.

The C-SGN_A 95 receives the attach complete message.

The C-SGN_A 95 may transit the connection state for the UE_A 10 to the idle mode based on the reception of the attach complete message.

In other words, the C-SGN_A 95 may manage the state of the UE_A 10 as the idle mode based on the transmission of the attach accept message or the reception of the attach complete message.

In more detail, in a case that the transmittable and/or receivable state which is the transition destination is the second mode and/or the third mode and/or the fourth mode, the C-SGN_A 95 may manage the state of the UE_A 10 as the idle mode based on the transmission of the attach accept message or the reception of the attach complete message.

Note that the UE_A 10 can acquire the UE context illustrated in FIG. 21 from the core network_A 90 by the attach procedure and store the context.

Additionally, the C-SGN_A 95 can acquire each of the contexts A to E illustrated in FIG. 19(*a*) from the UE_A 10, the eNB_A 45, or the HSS_A 50 by the attach procedure and store the contexts.

By the above-described steps, the UE_A 10 connects to the network, and completes the first attach procedure. Note that the UE_A 10 and/or the C-SGN_A 95 enter the transmittable and/or receivable state with the completion of the first attach procedure.

1.3.1.2. Second Attach Procedure Example

Figure 24:
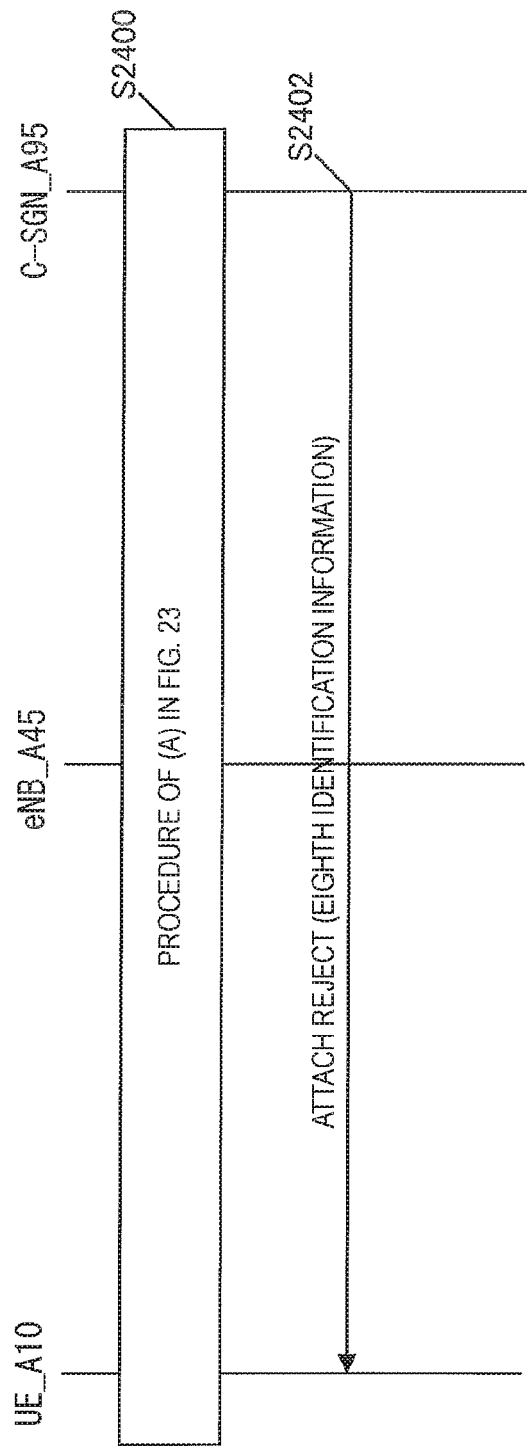
FIG. 24 is a diagram illustrating a second attach procedure.

Hereinafter, an example of the steps of a second attach procedure will be described using FIG. 24.

Figure 23:
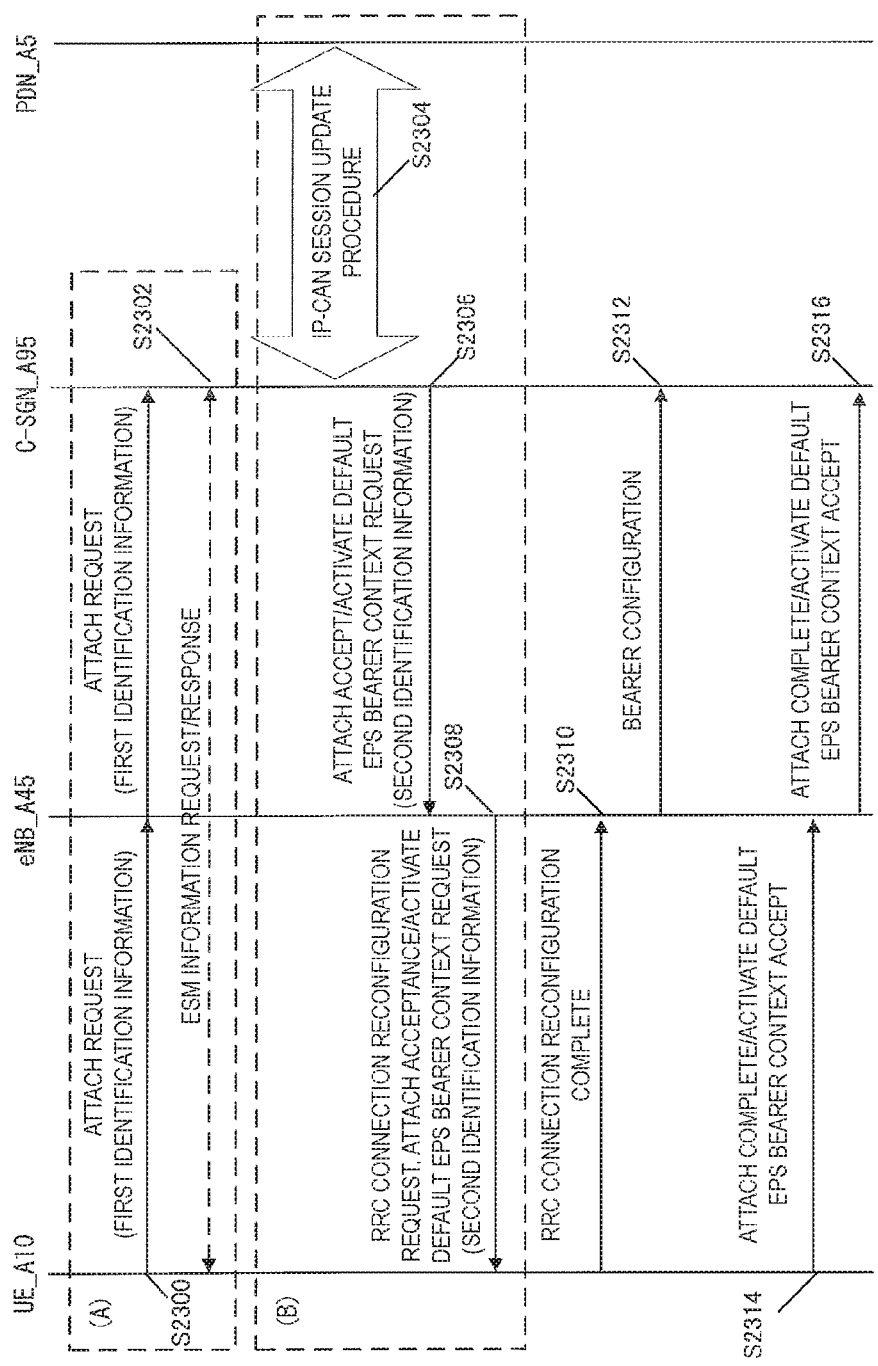
FIG. 23 is a diagram illustrating a first attach procedure.

Note that the steps from the transmission of an attach request message by the UE_A 10 to the reception of the attach request message by the C-SGN_A 95 may be the same as the steps in the procedure of (A) in FIG. 23 (S2400). Therefore, description of the steps will be omitted.

The C-SGN_A 95 receives the attach request message. Furthermore, the C-SGN_A 95 acquires the first identification information and/or the third identification information and/or the fifth identification information and/or the sixth identification information, based on the reception of the attach request message or the reception of the ESM response message.

The C-SGN_A 95 may determine not to enter the transmittable and/or receivable state for the UE_A 10, based on information included in the attach request message and the subscriber information. The C-SGN_A 95 may determine not to enter the transmittable and/or receivable state, based on the first identification information, and/or the third identification information, and/or the fifth identification information, and/or the sixth identification information, and/or the subscriber information. Hereinafter, the determination process described above is referred to as a thirteenth determination and described.

The C-SGN_A 95 transmits an attach reject message to the eNB_A 45, based on the thirteenth determination (S2402). The C-SGN_A 95 may transmit a PDN connectivity reject message with the attach reject message. Hereinafter, in the description of the present embodiment, the attach reject message is described as a message in which the attach reject message and the PDN connectivity reject message are combined. Furthermore, in the description of the present embodiment, in a case that an expression "identification information is included in the attach reject message" is used, the expression means that the identification information is included in the attach reject message and/or the PDN connectivity reject message.

The C-SGN_A 95 may include at least the second identification information and/or the eighth identification information in the attach reject message.

The eNB_A 45 receives the attach reject message, and transmits the RRC message including the attach reject message to the UE_A 10 (S2208). Note that the RRC message may be an RRC connection reconfiguration request message.

The UE_A 10 receives the RRC message including the attach reject message. The UE_A 10 may detect failure of transition to the transmittable and/or receivable state, based on the reception of the attach reject message, and/or the second identification information and/or the eighth identification information included in the attach reject message.

Furthermore, the UE_A 10 may detect that suspend processing cannot be performed in a case of receiving the attach reject message and/or each piece of identification information included in the attach reject message. In other words, the C-SGN_A 95 or the MME_A 40 may detect that suspend processing cannot be performed in a case of transmitting the attach reject message and/or each piece of identification information included in the attach reject message. Note that the suspend processing may be processing in which the UE_A 10 and/or the C-SGN_A 95 and/or the MME_A 40 enter the idle mode to keep the UE context and/or the bearer context in a case that a message for suspending an RRC connection is received from a base station device.

By the above-described steps, the UE_A 10 fails to connect to the network, and completes the second attach procedure.

The UE_A 10 may perform a new attach procedure, based on the failure of connecting to the network. In more detail, the UE_A 10 may perform the new attach procedure, based on the second identification information and/or the eighth identification information included in the attach reject message.

1.3.1.3. Third Attach Procedure Example

Figure 25:
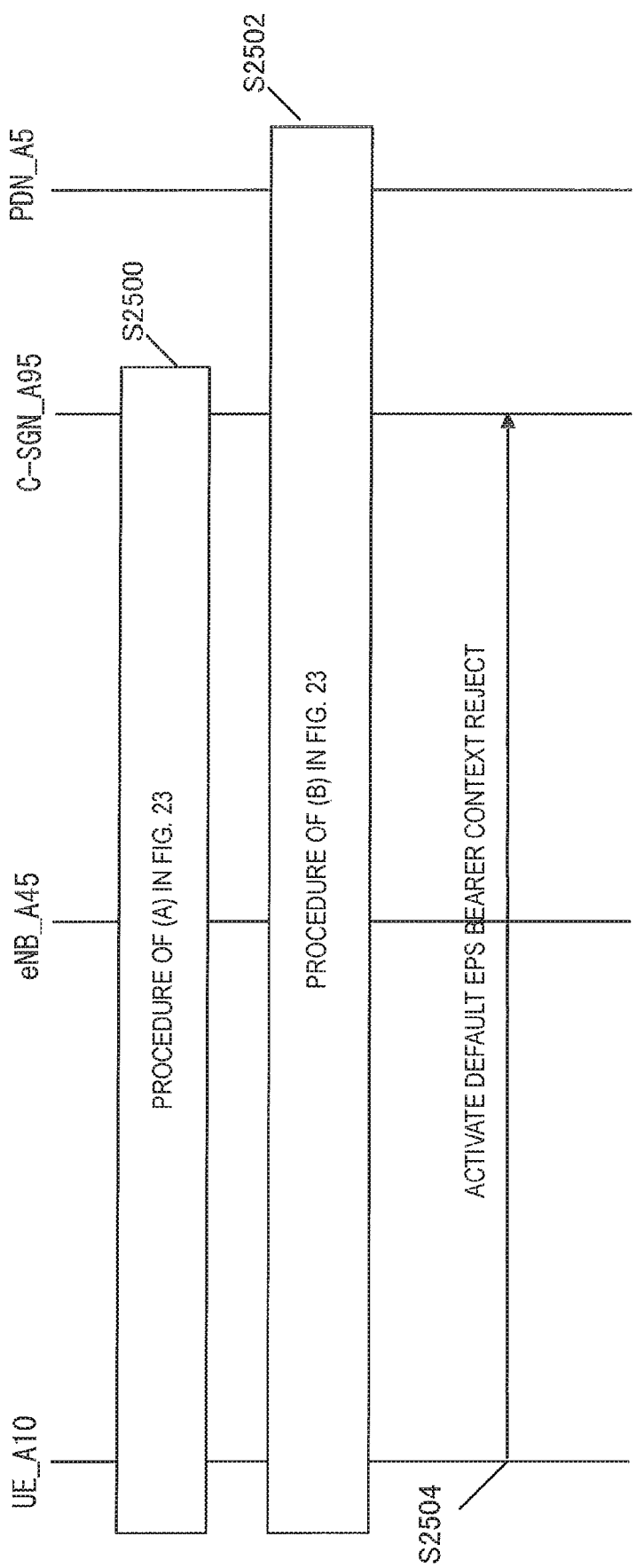
FIG. 25 is a diagram illustrating a third attach procedure.

Hereinafter, an example of the steps of a third attach procedure will be described using FIG. 25.

Note that the steps from the transmission of an attach request message to the reception of the attach accept message by the UE_A 10 may be the same as the steps in the procedures of (A) and (B) in FIG. 23 (S2500, S2502). Therefore, description of the steps will be omitted.

The UE_A 10 receives the RRC message including the attach accept message. Furthermore, in a case that the second identification information and/or the fourth identification information and/or the seventh identification information are included in the attach accept message, the UE_A 10 acquires each piece of identification information.

The UE_A 10 may interpret and detect the transmittable and/or receivable state allowed by the C-SGN_A 95, based on the second identification information and/or the fourth identification information and/or the seventh identification information. In more detail, the UE_A 10 may interpret and detect whether the transmittable and/or receivable state allowed by the C-SGN_A 95 is the first mode, the second mode, the third mode, or the fourth mode, based on the second identification information, and/or the fourth identification information, and/or the seventh identification information.

Furthermore, the UE_A 10 may determine to reject the transition to the transmittable and/or receivable state, based on the authentication and detection of the transmittable and/or receivable state allowed by the C-SGN_A 95. In more detail, in a case that a transmittable and/or receivable state different from a mode intended by the UE_A 10 is allowed by the C-SGN_A 95, the UE_A 10 may determine to reject the transition to the transmittable and/or receivable state. Hereinafter, the interpretation and determination process described above is referred to as a fourteenth determination and described.

In a case that the UE_A 10 determines to reject the transition to the transmittable and/or receivable state by the fourteenth determination, the UE_A 10 transmits an Activate default EPS bearer context reject message to the C-SGN_A 95 via the eNB_A 45 (S2504).

The UE_A 10 may include at least the ninth identification information in the Activate default EPS bearer context reject message. The UE_A 10 may reject the transition to the transmittable and/or receivable state by transmitting the attach request message including the ninth identification information.

The C-SGN_A 95 receives the Activate default EPS bearer context reject message. The C-SGN_A 95 may detect failure of transition to the transmittable and/or receivable state, based on the received Activate default EPS bearer context reject message, and/or the ninth identification information included in the Activate default EPS bearer context reject message.

In more detail, the C-SGN_A 95 may release the context for the UE_A 10 illustrated in FIG. 19(a), based on the received Activate default EPS bearer context reject message, and/or the ninth identification information included in the Activate default EPS bearer context reject message.

Furthermore, the UE_A 10 may notify that suspend processing cannot be performed by transmitting the Activate default EPS bearer context reject message or an EPS Session Management (ESM) DUMMY MESSAGE to the C-SGN_A 95 or the MME_A 40, even in the case of receiving the attach accept message and/or each piece of identification information included in the attach accept message. In other words, the C-SGN_A 95 or the MME_A 40 may detect that suspend processing cannot be performed by receiving the Activate default EPS bearer context reject message or the ESM DUMMY MESSAGE from the UE_A 10, even in the case of transmitting the attach accept message and/or each piece of identification information included in the attach accept message.

By the above-described steps, the UE_A 10 fails to connect to the network, and completes the third attach procedure.

The UE_A 10 may perform a new attach procedure, based on the failure of connecting to the network. In more detail, the UE_A 10 may perform the new attach procedure, based on the second identification information and/or the eighth identification information included in the attach reject message.

1.3.1.4. Modified Example of Attach Procedure

Note that although the attach procedure is described in a case that the core network_A 90 in the attach procedure example described above is a core network configured by including the C-SGN_A 95 described using FIG. 3(a), the core network_A 90 may be a core network configured by including the PGW_A 30, the SGW_A 35, the MME_A 40, or the like as described using FIG. 2.

In this case, the NAS message such as the attach request message, the attach complete message, or the like transmitted by the UE_A 10 described in this procedure is received by the MME 45, not by the C-SGN_A 95.

Accordingly, the reception and the processes of the NAS message by the C-SGN_A 95 in the above description can be replaced with those performed by the MME_A 40.

Furthermore, the transmission and the processes of the NAS message such as the attach accept message or the like by the C-SGN_A 95 in the above description can be replaced with those performed by the MME_A 40.

1.3.2. Selection Example of Transmission and/or Reception Means

Next, a method of selecting a transmission and/or reception procedure to be used at the time of transmitting the UL user data by the UE_A 10 which entered to the transmittable and/or receivable state will be described.

The UE_A 10 selects and determines a procedure to be used to transmit the UL user data among the first transmission and/or reception procedure, the second transmission and/or reception procedure, and the third transmission and/or reception procedure.

Here, the first transmission and/or reception procedure may be a procedure for performing transmission and/or reception with connectionless, and the second transmission and/or reception procedure and/or the third transmission and/or reception procedure may be a procedure for establishing a connection to perform transmission and/or reception. The third transmission and/or reception procedure may be a known transmission and/or reception procedure.

The UE_A 10 may detect and determine these, based on the transmittable and/or receivable state which is the transition destination. In other words, the UE_A 10 may select and determine these, based on the mode of the transmittable and/or receivable state determined in the second determination. The UE_A 10 may detect and determine these, based on the data size of the transmitted UL user data.

In more detail, the UE_A 10 may select and determine to use the first transmission and/or reception procedure, based on the transmittable and/or receivable state being the first mode and/or the third mode.

Moreover, the UE_A 10 may select and determine to use the second transmission and/or reception procedure, based on the transmittable and/or receivable state being the second mode and/or the third mode.

Furthermore, the UE_A 10 may select and determine to use the third transmission and/or reception procedure, based on the transmittable and/or receivable state being the fourth mode.

Furthermore, the UE_A 10 may select and determine to use the second transmission and/or reception procedure and/or the third transmission and/or reception procedure, based on UL user data of large data size to be transmitted. Note that the large data size may indicate that the data size is larger than a threshold.

The UE_A 10 may branch into the first transmission and/or reception procedure, the second transmission and/or reception procedure, and the third transmission and/or reception, regardless of these conditions.

Hereinafter, selection and determination of a procedure to be used to transmit the UL user data among the first transmission and/or reception procedure, the second transmission and/or reception procedure, and the third transmission and/or reception procedure are referred to as a third determination and described.

1.3.3. UL User Data Transmission and/or Reception Procedure Example

Next, steps in which the UE_A 10 having established the connection to the network transmits the UL user data will be described.

Hereinafter, transmission steps of the UL user data will be described.

The UE_A 10 transmits a first message to the eNB_A 45. The first message is a message for requesting at least transmission timing information and resource assignment information, and the UE_A 10 transmits the first message at least including a randomly selected preamble to the eNB_A 45.

Note that the first message is a control signal of a Physical layer, may be a Random Access Channel (RACH) Preamble message of Message 1. The first message may be transmitted using a Physical Random Access Channel (PRACH).

The eNB_A 45 receives the first message, and transmits a second message to the UE_A 10 as a response to the first message. The second message is transmitted while including at least the transmission timing information and the resource assignment information. To be more specific, the transmission timing information may be a Timing Advance, and the resource assignment information may be a UL Grant. The second message is a control signal in a Media Access Control (MAC) layer, and may be transmitted using a Medium Access Control Random Access Response (MAC RAR).

Note that the second message may be a RACH Response message of Message 2.

A communication procedure after the UE_A 10 receives the second message can branch into a first transmission and/or reception procedure example, a second transmission and/or reception procedure example, and a third transmission and/or reception example, which will be described later.

The UE_A 10 may branch into the first transmission and/or reception procedure example, and/or the second transmission and/or reception procedure example, and/or the third transmission and/or reception example, based on the third determination.

1.3.3.1. Description of First Transmission and/or Reception Procedure Example

The first transmission and/or reception procedure example is a procedure in which the UE_A 10 transmits and/or receives the user data without establishing any Data Radio Bearer (DRB). In other words, the first transmission and/or reception procedure example is a procedure for transmitting the user data by using a radio bearer for transmitting and/or receiving a control message.

Figure 26:
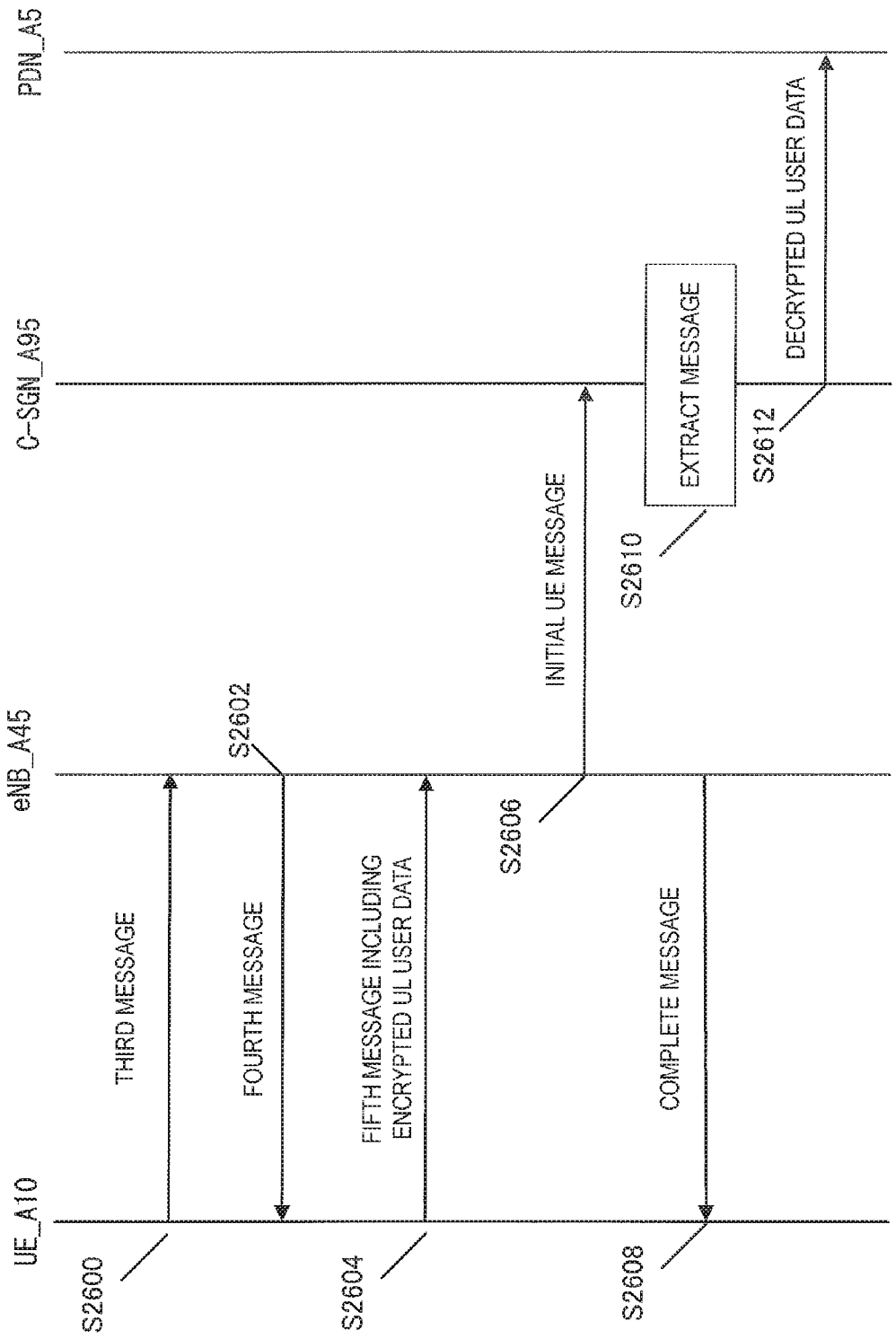
FIG. 26 is a diagram illustrating a first transmission and/or reception procedure.

Hereinafter, the first transmission and/or reception procedure example will be described in detail using FIG. 26.

The UE_A 10 transmits, based on the reception of the second message from the eNB_A 45, the third message to the eNB_A 45 (S2600).

The eNB_A 45 receives the third message transmitted by the UE_A 10. On the basis of the reception of the third message, the eNB_A 45 transmits a fourth message to the UE_A 10 (S2602).

The UE_A 10 transmits the fourth message transmitted by the eNB_A 45. On the basis of the reception of the fourth message, the UE_A 10 transmits a fifth message to the eNB_A 45 (S2604).

The UE_A 10 may transmit the NAS message including the UL user data while being included in the third message and/or the fifth message. Note that the UE_A 10 may encrypt the UL user data or the NAS message including the UL user data to transmit the encrypted UL user data or NAS message.

The eNB_A 45 receives the NAS message including the UL user data, based on the reception of the third message and/or the fifth message.

On the basis of the reception of the NAS message including the UL user data, the eNB_A 45 may transmit an Initial UE message of an S1 Application Protocol (S1AP) to the C-SGN_A 95 (S2606).

The eNB_A 45 may transmit the S1AP Initial UE message including at least the NAS message in which the UL user data is included.

The eNB_A 45 may transmit a complete message to the UE_A 10, based on the reception of the third message and/or the fifth message, and/or the transmission of the S1AP Initial UE message (S2608).

The UE_A 10 receives the complete message transmitted by the eNB_A 45.

The C-SGN_A 95 receives the S1AP Initial UE message transmitted by the eNB_A 45, and/or the NAS message including the UL user data included in the S1AP Initial UE message.

On the basis of the reception of the NAS message including the UL user data included in the S1AP Initial UE message, the C-SGN_A 95 decrypts the received NAS message and/or extracts the user data included in the received NAS message (S2610). Note that the C-SGN_A 95 may decrypt the extracted user data, as needed.

The C-SGN_A 95 transmits the user data to the PDN_A 5, based on the extraction and/or decryption of the user data included in the NAS message (S2612). The C-SGN_A 95 may transmit to the PDN_A 5 after decrypting the user data.

By the above-described procedures, the UE_A 10 can transmit the small data packet being the UL user data to the PDN_A 5 without establishing the Data Radio Bearer (DRB). Furthermore, after the completion of the first transmission and/or reception procedure example, the UE_A 10 can enter the idle state, or maintain the idle state.

Note that, in a case that the user data to be transmitted and/or received has a large size, the UE_A 10 and/or the C-SGN_A 95 do not transmit and/or receive the user data through the first transmission and/or reception procedure, and may transmit the user data through the second transmission and/or reception procedure.

1.3.3.2. Description of Second Transmission and/or Reception Procedure Example

The second transmission and/or reception procedure example is a procedure in which the UE_A 10 transmits and/or receives the user data after establishing a DRB.

Figure 27:
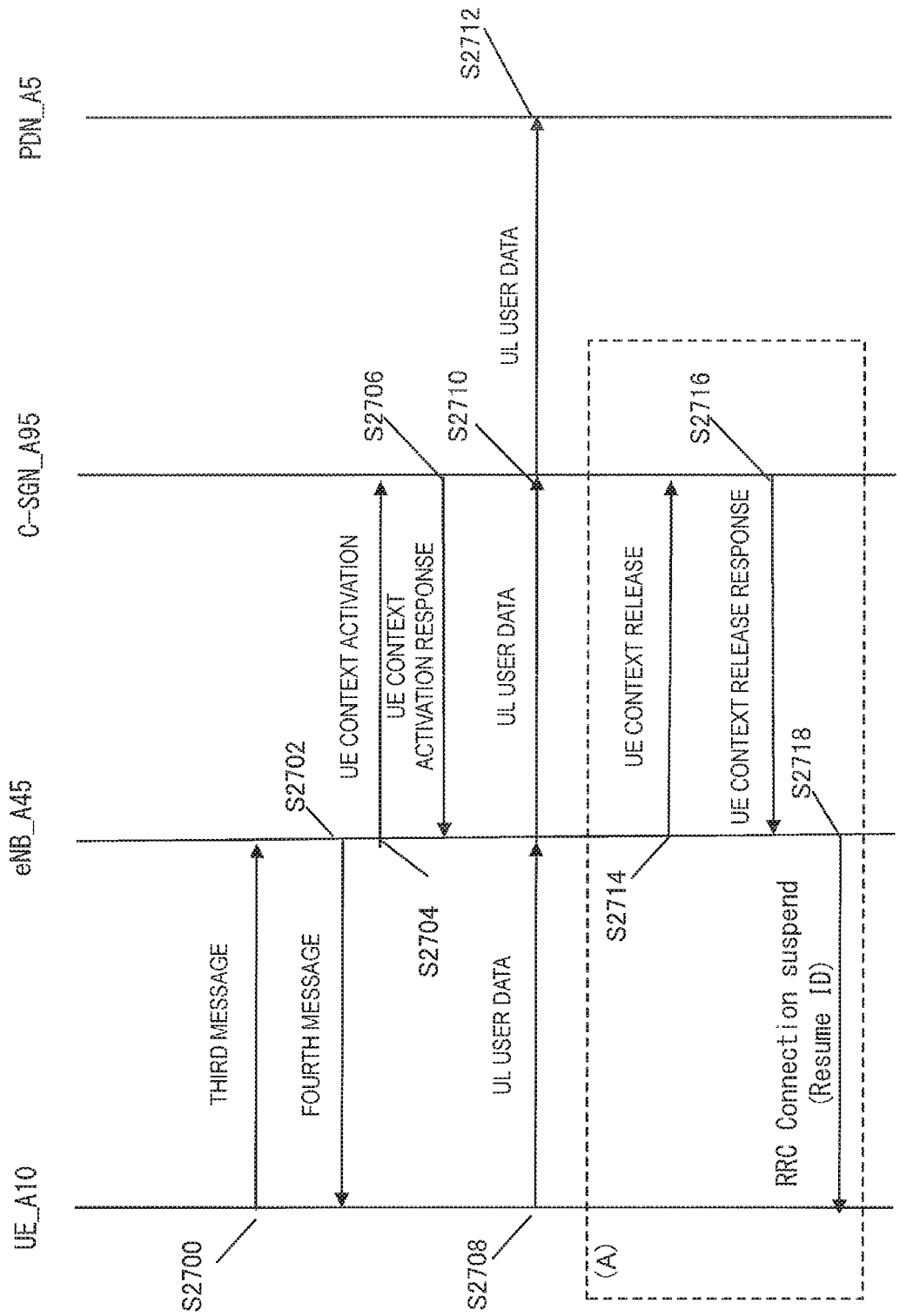
FIG. 27 is a diagram illustrating a second transmission and/or reception procedure.

Hereinafter, the second transmission and/or reception procedure example will be described in detail using FIG. 27.

The UE_A 10 transmits, based on the reception of the second message from the eNB_A 45, the third message to the eNB_A 45 (S2700).

The UE_A 10 may transmit at least the NAS message and/or the Resume ID while being included in the third message.

Note that the NAS message may be a message for re-establishing a DRB.

The Resume ID may be identification information for identifying the DRB to be re-established. Additionally/Alternatively, the Resume ID may be identification information for identifying the context held by the eNB_A 45, the context being associated with the DRB to be re-established. Additionally/Alternatively, the Resume ID may be identification information for indicating to make the CIoT terminal in the active state enter the idle state. Additionally/Alternatively, the Resume ID may be identification information for indicating to make the CIoT terminal in the idle state enter the active state.

For example, the eNB_A 45 may enter the idle state from the active state by transmitting the Resume ID to the UE_A 10. Moreover, the UE_A 10 may enter the idle state from the active state by receiving the Resume ID from the eNB_A 45.

The UE_A 10 may enter the active state from the idle state by transmitting the received Resume ID to the eNB_A 45.

Moreover, the eNB_A 45 may enter the active state from the idle state by receiving the Resume ID from the UE_A 10.

Note that the context used in the previous active state can be identified by using the same Resume ID for the Resume ID transmitted and/or received for the transition from the active state to the idle state and the Resume ID transmitted and/or received for the transition from the idle state to the active state. The UE_A 10 and the eNB_A 45 can re-establish a DRB, based on the identified context, or the like, to restore a communication state similar to the last active state.

In this way, each of the UE_A 10 and the eNB_A 45 can change its state between the active state and the idle state, based on the Resume ID. The eNB_A 45 receives the third message transmitted by the UE_A 10. The eNB_A 45 receives the NAS message and/or the Resume ID, based on the reception of the third message.

On the basis of the reception of the resume ID included in the third message, the eNB_A 45 re-establishes the DRB identified by the resume ID.

The eNB_A 45 transmits a fourth message to the UE_A 10, based on the reception of the third message and/or the re-establishment of the DRB identified by the Resume ID (S2702).

The eNB_A 45 may transmit at least the Resume ID for identifying the re-established DRB while being included in the fourth message.

The eNB_A 45 changes the state of the eNB_A 45 into the active mode, based on the reception of the third message, and/or the reception of the NAS message, and/or the re-establishment of the DRB identified by the Resume ID, and/or the transmission of the fourth message.

The eNB_A 45 transmits an S1 Application Protocol (S1AP) UE Context Active message to the C-SGN_A 95, based on the reception of the third message, and/or the reception of the NAS message, and/or the re-establishment of the DRB identified by the Resume ID, and/or the transmission of the fourth message, and/or the state transition of the eNB_A 45 to the active mode (S2704). The eNB_A 45 may transmit the S1AP UE Context Active message including the NAS message.

The C-SGN_A 95 receives the S1AP UE Context Active message. On the basis of the reception of the S1AP UE Context Active message, the C-SGN_A 95 changes the state of the C-SGN_A 95 into the active mode. On the basis of the reception of the S1AP UE Context Active message, and/or the reception of the NAS message, and/or the state transition of the C-SGN_A 95 to the active mode, the C-SGN_A 95 transmits an S1AP UE context active response message to the eNB_A 45 (S2706).

The UE_A 10 receives the fourth message transmitted by the eNB_A 45. The UE_A 10 changes the state of the UE_A 10 to the active mode, based on the reception of the fourth message and/or the reception of the Resume ID for identifying the re-established DRB included in the fourth message.

The UE_A 10 transmits the UL user data to the PDN_A 5 via the eNB_A 45 and/or the C-SGN_A 95, based on the reception of the fourth message, and/or the reception of the Resume ID for identifying the re-established DRB included in the fourth message, and/or the state transition of the UE_A 10 to the active mode (S2708) (S2710) (S2712).

The UE_A 10 continues transmitting the UL user data to the PDN_A 5 via the eNB_A 45 and/or the C-SGN_A 95, as long as the UL user data to be transmitted exists. Note that presence or absence of the data to be transmitted may be determined from a data residual amount of the buffer which accumulates the UL user data to be transmitted or the like.

By the above-described procedures, the UE_A 10 can transmit the UL user data. Furthermore, the UE_A 10 can also receive DownLink (DL) user data by the above-described procedures. Note that the DL user data is transmitted from the PDN_A 5, and can be received through the C-SGN_A 95 and the eNB_A 45.

The eNB_A 45 transfers the UL user data received from the UE_A 10 to the C-SGN_A 95.

Figure 5:
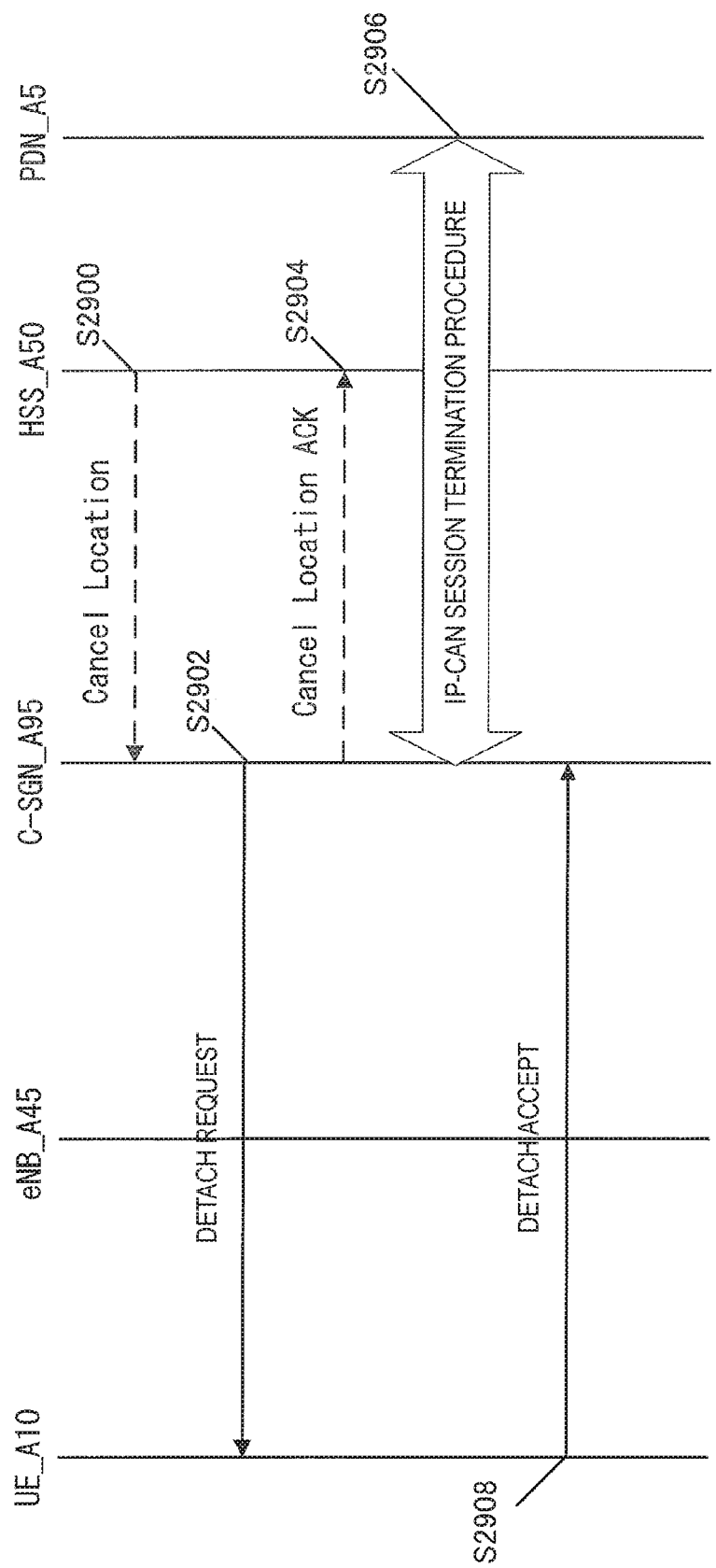
FIG. 5 is a diagram illustrating a network initiated detach procedure.

In a case of detecting no reception of the UL user data for a certain period of time, the eNB_A 45 starts the procedure for changing the state(s) of the UE_A 10, and/or the eNB_A 45, and/or the C-SGN_A 95 to the idle mode, as illustrated in FIG. 5. In other word, the eNB_A 45 does not perform a procedure like the procedure (A) in FIG. 27, as long as the eNB_A 45 continues receiving the UL user data.

The eNB_A 45 transmits the S1AP UE context release message to the C-SGN_A 95, based on the detection of no reception of the UL user data for a certain period of time (S2714).

The C-SGN_A 95 receives the S1AP UE context release message. On the basis of the reception of the S1AP UE context release message, the C-SGN_A 95 changes the state of the C-SGN_A 95 into the idle mode. On the basis of the reception of the S1AP UE context release message, and/or the state transition of the C-SGN_A 95 to the idle mode, the C-SGN_A 95 transmits an S1AP UE context release response message to the eNB_A 45 (S2716).

The eNB_A 45 transmits an RRC Connection Suspend message to the UE_A 10, based on the transmission of the UE context release message, and/or reception of the UE context release response (S2718).

The eNB_A 45 may transmit at least the Resume ID while being included in the RRC Connection Suspend message.

Here, the Resume ID may be identification information for identifying the DRB to be released. In more detail, the Resume ID may be identification information for identifying the context held by the UE_A 10 and/or the eNB_A 45, the context being associated with the DRB to be released.

On the basis of the transmission of the RRC Connection Suspend message the Resume ID, the eNB_A 45 releases the DRB identified by the Resume ID. Note that the eNB_A 45 releases the DRB identified by the Resume ID, but may continue to hold the context associated with the released DRB without deleting the context.

The eNB_A 45 changes the state of the eNB_A 45 into the idle mode, based on the release of the DRB identified by the Resume ID.

The UE_A 10 receives the RRC Connection Suspend message transmitted by the eNB_A 45.

On the basis of the reception of the RRC Connection Suspend message, and/or the reception of the Resume ID included in the RRC Connection Suspend message, the UE_A 10 releases the DRB identified by the Resume ID. Note that the UE_A 10 releases the DRB identified by the Resume ID, but may continue to hold the context associated with the released DRB without deleting the context.

The UE_A 10 changes the state of the UE_A 10 into the idle mode, based on the release of the DRB identified by the Resume ID.

By the above-described procedures, the UE_A 10 and/or the eNB_A 45 and/or the C-SGN_A 95 can release the DRB and enter the idle mode while holding the context for the UE_A 10 and/or the eNB_A 45.

1.3.3.3. Description of Third Transmission and/or Reception Procedure Example The third transmission and/or reception procedure example is a known transmission and/or reception procedure.

The third transmission and/or reception procedure example is a procedure in which the UE_A 10 transmits and/or receives the user data after establishing a DRB.

The third transmission and/or reception procedure may be a similar procedure to the second transmission and/or reception procedure. Therefore, detailed description of the procedure will be omitted.

In a case of the third procedure, the UE_A 10 may not include the NAS message and/or the Resume ID in the third message, and may transmit the NAS message while being included in the fifth message.

Furthermore, the S1AP message(s) transmitted and/or received between the eNB_A 45 and the C-SGN_A 95 is not limited to the UE Context Active message and/or the UE context active response message, and may be any message transmitting and/or receiving the NAS message.

Moreover, the UE_A 10 may transmit the UL user data, based on the reception of a response message to the fifth message.

1.3.3.4. Modified Example of UL User Data Transmission and/or Reception Procedure Note that although the attach procedure is described in a case that the core network_A 90 in the UL user data transmission and/or reception procedure example described above is a core network configured by including the C-SGN_A 95 described using FIG. 3(*a*), the core network_A 90 may be a core network configured by including the PGW_A 30, the SGW_A 35, the MME_A 40, or the like as described using FIG. 2.

In this case, the NAS message transmitted by the UE_A 10 described in this procedure is received by the MME 45, not by the C-SGN_A 95.

Accordingly, the reception and the processes of the NAS message by the C-SGN_A 95 in the above description can be replaced with those performed by the MME_A 40.

Furthermore, the transmission and the processes of the NAS message by the C-SGN_A 95 in the above description can be replaced with those performed by the MME_A 40.

1.3.4. Detach Procedure Example

Next, an example of a detach procedure will be described. Note that the detach procedure is a procedure which is started on the initiative of the UE_A 10 and/or the C-SGN_A 95 and/or the HSS_A 50, and a procedure for disconnecting the connection to the network. A trigger for starting the detach procedure by the UE_A 10, and/or the C-SGN_A 95, and/or the HSS_A 50 may be deterioration of a radio wave state of a 3GPP access system, detection of unstable connectivity, or the like.

Additionally, the UE_A 10 may start at an arbitrary timing in a case that the UE_A 10 is connected to the core network_A 90 regardless of the above. The C-SGN_A 95 and/or the HSS_A 50 may start at an arbitrary timing.

Note that the details of the detach procedure may be a procedure to be described as the UE initiated detach procedure example, and may be a procedure to be described as the network initiated detach procedure example.

1.3.4.1. Description of UE Initiated Detach Procedure Example

This procedure is a procedure initiated by the UE_A 10, in which a connection of the UE_A 10 to the network is disconnected.

Figure 28:
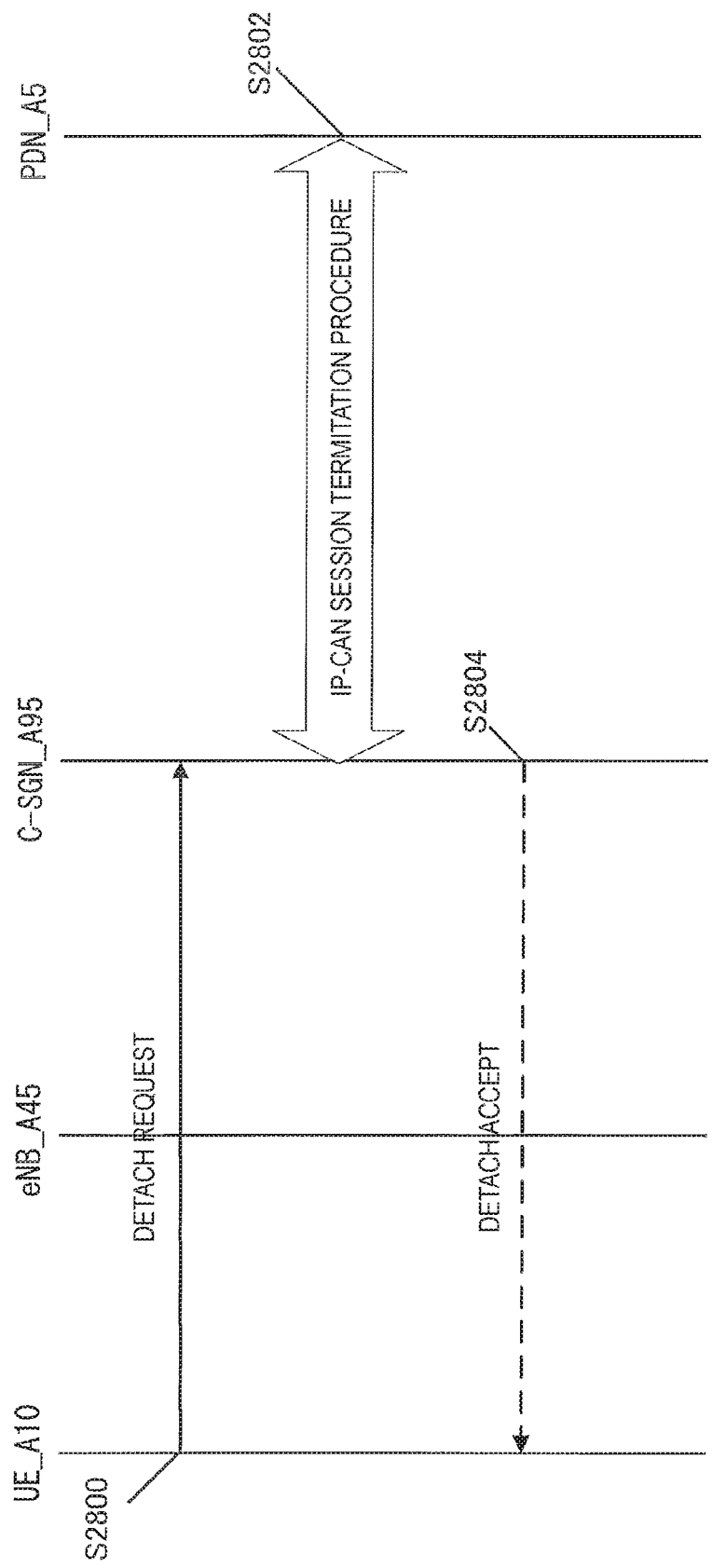
FIG. 28 is a diagram illustrating a UE initiated detach procedure.

Hereinafter, an example of the steps of the UE initiated detach procedure will be described using FIG. 28.

First, the UE_A 10 transmits a detach request message to the C-SGN_A 95 (S2800). Note that the UE_A 10 may transmit the detach request message to the eNB_A 45, and the transmitted detach request message may be transferred to the C-SGN_A 95 via the eNB 45.

The UE_A 10 may include at least the tenth identification information in the detach request message. The UE_A 10 may request disconnection of the connection to the network, by transmitting the detach request message including the tenth identification information.

The C-SGN_A 95 receives the detach request message. Furthermore, the C-SGN_A 95 acquires the tenth identification information, based on the reception of the detach request message.

On the basis of the reception of the detach request, and/or the tenth identification information included in the detach request, the C-SGN_A 95 may start the IP-CAN session termination procedure (S2802). The IP-CAN session termination procedure may be the same as the known procedure, and therefore detailed descriptions thereof will be omitted.

The C-SGN_A 95 transmits a detach accept message to the UE_A 10 via the eNB_A 45 with completion of the IP-CAN session termination procedure (S2804). Note that the detach accept message may be a response message to the detach request message.

On the basis of the reception of the detach request, and/or completion of the IP-CAN session termination procedure, and/or transmission of the detach accept, and/or the tenth identification information included in the detach request, the C-SGN_A 95 may disconnect the connection to the network. In more detail, the C-SGN_A 95 may release the context used for the connection to the network, and thus disconnect the connection to the network.

Note that the context used for the connection to the network to be released may be the context A, and/or the context B, and/or the context C. and/or the context D, and/or the context E which are illustrated in FIG. 19.

The UE_A 10 receives the detach accept transmitted by the C-SGN_A 95.

The UE_A 10 may disconnect the connection to the network, based on the reception of the detach accept. In more detail, the UE_A 10 may release the context used for the connection to the network, and thus disconnect the connection to the network.

Note that the context used for the connection to the network to be released may be the UE context stored in the transmittable and/or receivable state illustrated in FIG. 21(*c*), and/or the UE context for each bearer illustrated in FIG. 21(*d*).

Furthermore, the UE_A 10 may perform a signalling connection release procedure with the eNB_A 45, based on the reception of the detach accept. In other words, the eNB_A 45 may perform the signalling connection release procedure with the UE_A 10, based on the transmission of the detach accept.

By the above-described steps, the UE_A 10 and/or the C-SGN_A 95 disconnect the connection to the network and complete the detach procedure.

Figure 3:
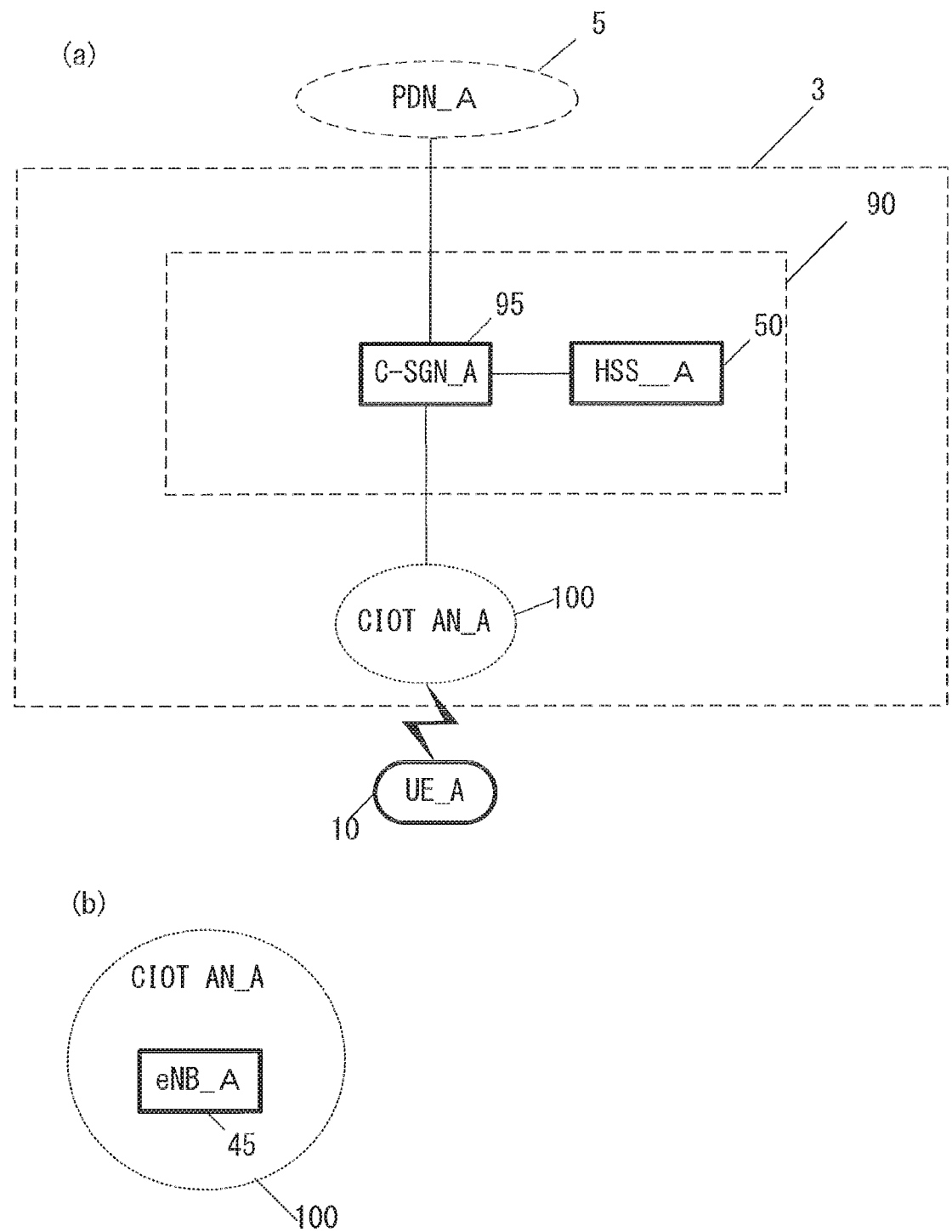

Note that although the detach procedure is described in a case that the core network_A 90 in the detach procedure example described above is a core network configured by including the C-SGN_A 95 described using FIG. 3(*a*), the core network_A 90 may be a core network configured by including the PGW_A 30, the SGW_A 35, the MME_A 40, or the like as described using FIG. 2.

In this case, the NAS message such as the detach request message or the like transmitted by the UE_A 10 described in this procedure is received by the MME 45, not by the C-SGN_A 95.

Accordingly, the reception and the processes of the NAS message by the C-SGN_A 95 in the above description can be replaced with those performed by the MME_A 40.

Furthermore, the transmission and the processes of the NAS message such as the detach accept message or the like by the C-SGN_A 95 in the above description can be replaced with those performed by the MME_A 40.

1.3.4.2. Description of Network Initiated Detach Procedure Example

This procedure is a procedure initiated by the C-SGN_A 95 and/or the HSS_A 50, in which a connection of the UE_A 10 to the network is disconnected.

Hereinafter, an example of the steps of the network initiated detach procedure will be described using FIG. 5.

First, the HSS_A 50 transmits a Cancel Location message to the C-SGN_A 95 (S2900). The HSS_A 50 may include the twelfth identification information in the Cancel Location message.

The C-SGN_A 95 receives the Cancel Location message. The C-SGN_A 95 transmits a detach request message to the UE_A 10 via the eNB_A 45, based on the Cancel Location message and/or the twelfth identification information included in the Cancel Location message (S2902).

Moreover, the C-SGN_A 95 may transmit the detach request message to the UE_A 10 via the eNB_A 45 at an arbitrary timing, not based on the reception of the Cancel Location message.

The C-SGN_A 95 may include at least the eleventh identification information and/or the twelfth identification information in the detach request message. The C-SGN_A 95 may request disconnection of the connection to the network, by transmitting the detach request message including the eleventh identification information and/or the twelfth identification information.

The C-SGN_A 95 transmits a Cancel Location ACK message to the HSS_A 50, based on the reception of the Cancel Location message, and/or the reception of the eleventh identification information included in the Cancel Location message, and/or the transmission of the detach request message (S2904). Note that the Cancel Location ACK message may be a response message to the Cancel Location message.

The C-SGN_A 95 may start the IP-CAN session termination procedure, based on the reception of the Cancel Location message, and/or the reception of the eleventh identification information included in the Cancel Location message, and/or the transmission of the detach request message, and/or the transmission of the Cancel Location ACK message (S2906). The IP-CAN session termination procedure may be the same as the known procedure, and therefore detailed descriptions thereof will be omitted.

The UE_A 10 receives the detach request message transmitted by the C-SGN_A 95. Furthermore, the UE_A 10 acquires the eleventh identification information and/or the twelfth identification information, based on the reception of the detach request message.

The UE_A 10 transmits a detach accept message to the C-SGN_A 95 via the eNB_A 45, based on the reception of the detach request message, and/or the eleventh identification information and/or the twelfth identification information included in the detach request message (S2908). Note that the detach accept message may be a response message to the detach request message.

On the basis of the reception of the detach request, and/or transmission of the detach accept, and/or the eleventh identification information and/or the twelfth identification information included in the detach request, the UE_A 10 may disconnect the connection to the network. In more detail, the UE_A 10 may release the context used for the connection to the network, and thus disconnect the connection to the network.

Note that the context used for the connection to the network to be released may be the UE context stored in the transmittable and/or receivable state illustrated in FIG. 21(c), and/or the UE context for each bearer illustrated in FIG. 21(d).

The C-SGN_A 95 receives the detach accept transmitted by the UE_A 10.

The C-SGN_A 95 receives the detach accept. Additionally/Alternatively, the C-SGN_A 95 may disconnect the connection to the network, based on the completion of the IP-CAN session termination procedure, and/or the transmission of the Cancel Location ACK message. In more detail, the C-SGN_A 95 may release the context used for the connection to the network, and thus disconnect the connection to the network.

Note that the context used for the connection to the network to be released may be the context A, and/or the context B. and/or the context C, and/or the context D, and/or the context E which are illustrated in FIG. 19.

Furthermore, the UE_A 10 may perform the signalling connection release procedure with the eNB_A 45, based on the transmission of the detach accept. In other words, the eNB_A 45 may perform the signalling connection release procedure with the UE_A 10, based on the reception of the detach accept.

By the above-described steps, the UE_A 10 and/or the C-SGN_A 95 disconnect the connection to the network and complete the detach procedure.

1.3.4.3. Modified Example of Detach Procedure

Note that although the detach procedure is described in a case that the core network_A 90 in the detach procedure example described above is a core network configured by including the C-SGN_A 95 described using FIG. 3(a), the core network_A 90 may be a core network configured by including the PGW_A 30, the SGW_A 35, the MME_A 40, or the like as described using FIG. 2.

In this case, the NAS message such as the detach request message or the like transmitted by the UE_A 10 described in this procedure is received by the MME 45, not by the C-SGN_A 95.

Accordingly, the reception and the processes of the NAS message by the C-SGN_A 95 in the above description can be replaced with those performed by the MME_A 40.

Furthermore, the transmission and the processes of the NAS message such as the detach accept message or the like by the C-SGN_A 95 in the above description can be replaced with those performed by the MME_A 40.

2. Modified Example

A program running on each of the mobile station device and base station device according to the present invention is a program that controls CPU and the like (a program for causing a computer to operate) in such a manner as to realize the functions according to the above-described embodiment of the present invention. The information handled by these devices is temporarily held in a RAM at the time of processing, and is then stored in various types of ROMs, HDDs, and the like, and read out by the CPU as necessary to be edited and written. Here, a semiconductor medium (ROM, a non-volatile memory card, or the like, for example), an optical recording medium (DVD, MO, MD, CD, BD, or the like, for example), a magnetic recording medium (magnetic tape, a flexible disk, or the like, for example), and the like can be given as examples of recording media for storing the programs. In addition to realizing the functions of the above-described embodiments by executing loaded programs, the functions of the present invention are realized by the programs running cooperatively with an operating system, other application programs, or the like in accordance with instructions included in those programs.

In a case of delivering these programs to market, the programs can be stored in a portable recording medium, or transferred to a server computer connected via a network such as the Internet. In this case, the storage device serving as the server computer is also included in the present invention. Furthermore, some or all portions of each of the mobile station device and the base station device according to the above-described embodiment may be realized as LSI that is a typical integrated circuit. The functional blocks of each of the mobile station device and the base station device may be individually realized as a chip, or some or all of the functional blocks may be integrated into a chip. The circuit integration technique is not limited to LSI, and the integrated circuits for the functional blocks may be realized as dedicated circuits or a multi-purpose processor. Furthermore, in a case where with advances in semiconductor technology, a circuit integration technology with which an LSI is replaced appears, it is also possible to use an integrated circuit based on the technology. Additionally, although, for the above-described embodiments, LTE and WLAN (IEEE 802.11a/b/n, for example) have been described as examples of the radio access network, the connections may be made with WiMAX instead of WLAN. The embodiments of the invention have been described in detail thus far with reference to the drawings, but the specific configuration is not limited to the embodiments. Other designs and the like that do not depart from the essential spirit of the invention also fall within the scope of the patent claims.

REFERENCE SIGNS LIST

1 Communication system
5 PDN_A
10 UE_A
20 UTRAN_A
22 eNB (UTRAN)_A
24 RNC_A
25 GERAN_A
26 BSS_A
30 PGW_A
35 SGW_A
40 MME_A
45 eNB_A
50 HSS_A
55 AAA_A
60 PCRF_A
65 ePDG_A
70 WLAN ANa
72 WLAN APa
74 TWAG_A
75 WLAN ANb
76 WLAN APb
80 LTE AN_A
90 Core network_A
95 C-SGN_A
100 CIOT AN_A

The invention claimed is:

1. A User Equipment (UE) comprising:
transmission and/or reception circuitry configured to perform a procedure which is initiated by the UE; and
a controller,
wherein
in the procedure, the transmission and/or reception circuitry is further configured to:
transmit a REQUEST message to a control device, and
receive an ACCEPT message from the control device,
the UE indicates that, based on transmitting the REQUEST message, the UE requests to use a first processing,
the ACCEPT message includes network capability information indicating that performing for a second processing, among the first processing and the second processing, is supported,
the controller is configured to:
interpret that performing for the second processing is accepted, based on receiving the network capability information, and
perform at least the second processing after completion of the procedure,
the first processing is a processing that the UE transmits and/or receives user data via the control device by using a communication path for transmitting and/or receiving a control message, and
the second processing is a processing that the UE enters an idle mode with keeping a UE context, in a case that a message to suspend a Radio Resource Control (RRC) connection is received from a base station device.

2. The UE according to claim 1, wherein
the UE indicates that, based on transmitting the REQUEST message, the UE supports to perform the first processing.

3. A control device comprising:
transmission and/or reception circuitry configured to perform a procedure which is initiated by a User Equipment (UE); and
a controller,
wherein
in the procedure, the transmission and/or reception circuitry is further configured to:
receive a REQUEST message from the UE, and
transmit an ACCEPT message to the UE,
the control device acquires that, based on receiving the REQUEST message, the UE requests to use a first processing,
the ACCEPT message includes network capability information indicating that performing for a second processing, among the first processing and the second processing, is supported,
the network capability information is used by the UE for interpreting that performing for the second processing is accepted,
the controller is configured to perform at least the second processing after completion of the procedure,
the first processing is a processing that the control device forwards user data between the UE and a DN by using a communication path for transmitting and/or receiving a control message, and
the second processing is a processing that the control device enters an idle mode with keeping a context for a connection, in a case that a control message is received from a base station device.

4. The control device according to claim 3, wherein
the control device acquires that, based on receiving the REQUEST message, the UE supports to perform the first processing.

5. A communication control method performed by a User Equipment (UE), the communication control method comprising:
performing a procedure which is initiated by the UE;
in the procedure,
transmitting a REQUEST message to a control device;
receiving an ACCEPT message from the control device; and
indicating that, based on transmitting the REQUEST message, the UE requests to use a first processing, wherein
the ACCEPT message includes network capability information indicating that performing for a second processing, among the first processing and the second processing, is supported,
the UE interprets that performing for the second processing is accepted, based on receiving the network capability information,
the UE is configured to perform at least the second processing after completion of the procedure, based on acceptance of performing of the second processing,
the first processing is a processing that the UE transmits and/or receives user data via the control device by using a communication path for transmitting and/or receiving a control message, and
the second processing is a processing that the UE enters an idle mode with keeping a UE context, in a case that a message to suspend a Radio Resource Control (RRC) connection is received from a base station device.

6. The communication control method according to claim 5, wherein
the UE indicates that, based on transmitting the REQUEST message, the UE supports to perform the first processing.

7. A communication control method performed by a control device, the communication control method comprising:
performing a procedure which is initiated by a User Equipment (UE):
in the procedure,
receiving a REQUEST message from the UE;
transmitting an ACCEPT message to the UE; and
acquiring that, based on receiving the REQUEST message, the UE requests to use a first processing, wherein
the ACCEPT message includes network capability information indicating that performing for a second processing, among the first processing and the second processing, is supported,
the network capability information is used by the UE for interpreting that performing for the second processing is accepted,
the control device is configured to perform at least the second processing after completion of the procedure,
the first processing is a processing that the control device forwards user data between the UE and a DN by using a communication path for transmitting and/or receiving a control message, and
the second processing is a processing that the control device enters an idle mode with keeping a context for a connection, in a case that a control message is received from a base station device.

8. The communication control method according to claim 7, wherein
the control device acquires that, based on receiving the REQUEST message, the UE supports to perform the first processing.

* * * * *